United States Patent
Pryor

(10) Patent No.: US 9,934,334 B2
(45) Date of Patent: Apr. 3, 2018

(54) DESIGNING AND INSTALLATION QUOTING FOR SOLAR ENERGY SYSTEMS

(71) Applicant: Sungevity, Inc., Oakland, CA (US)

(72) Inventor: Adam Pryor, Sydney (AU)

(73) Assignee: SOLAR SPECTRUM HOLDINGS LLC, Oakland, CA (US)

( * ) Notice: Subject to any disclaimer, the term of this patent is extended or adjusted under 35 U.S.C. 154(b) by 660 days.

(21) Appl. No.: 14/471,181

(22) Filed: Aug. 28, 2014

(65) Prior Publication Data

US 2015/0066442 A1  Mar. 5, 2015

Related U.S. Application Data

(60) Provisional application No. 61/871,419, filed on Aug. 29, 2013.

(51) Int. Cl.
*G06F 17/50* (2006.01)
*G06Q 30/02* (2012.01)
(Continued)

(52) U.S. Cl.
CPC .......... *G06F 17/50* (2013.01); *G06F 17/5004* (2013.01); *G06F 17/5009* (2013.01);
(Continued)

(58) Field of Classification Search
CPC ....................................................... G06F 17/50
(Continued)

(56) References Cited

U.S. PATENT DOCUMENTS

| 5,583,977 A | 12/1996 | Seidl |
| 6,047,274 A | 4/2000 | Johnson et al. |

(Continued)

FOREIGN PATENT DOCUMENTS

| CN | 101294793 A | 10/2008 |
| EP | 1 986 154 | 10/2008 |

(Continued)

OTHER PUBLICATIONS

Subsequent Substantive Examination Report received in connection with Philippine Application No. 1/2010/500721; dated Jul. 22, 2015.

(Continued)

*Primary Examiner* — Timothy A Mudrick
(74) *Attorney, Agent, or Firm* — The Marbury Law Group PLLC

(57) ABSTRACT

Methods, non-transitory processor-readable storage media, devices, and systems for improving the designing of solar energy systems. An embodiment method may include receiving, by a processor of a solar energy system design computing system, at least one of lead data or inquiry data related to a property, querying predefined data related to the property using the received at least one of lead data or inquiry data, evaluating the queried predefined data to qualify the received at least one of lead data or inquiry data, and performing at least one action related to the solar energy systems based on the evaluation of the queried predefined data using the received at least one of lead data or inquiry data. The method may include rendering a solar energy system design and/or transmitting to third-party devices marketing information related to at least one of a solar energy system price, a design, and installation.

21 Claims, 32 Drawing Sheets

(51) Int. Cl.
- *G06Q 50/06* (2012.01)
- *G06Q 10/04* (2012.01)
- *G06Q 10/10* (2012.01)
- *G06Q 50/16* (2012.01)

(52) U.S. Cl.
CPC ............ *G06Q 10/04* (2013.01); *G06Q 10/10* (2013.01); *G06Q 30/0277* (2013.01); *G06Q 50/06* (2013.01); *G06Q 50/16* (2013.01); *Y04S 50/14* (2013.01)

(58) Field of Classification Search
USPC .......................................................... 703/1
See application file for complete search history.

(56) References Cited

U.S. PATENT DOCUMENTS

| | | | |
|---|---|---|---|
| 6,065,255 | A | 5/2000 | Stern et al. |
| 6,111,188 | A | 8/2000 | Kurokami et al. |
| 6,426,745 | B1 | 7/2002 | Isaacs et al. |
| 6,525,262 | B1 | 2/2003 | Makita et al. |
| 6,534,702 | B1 | 3/2003 | Makita et al. |
| 6,546,535 | B1* | 4/2003 | Nagao ................. G06F 11/2035 136/243 |
| 6,549,200 | B1 | 4/2003 | Mortlock et al. |
| 6,628,279 | B1 | 9/2003 | Schell et al. |
| 6,636,803 | B1 | 10/2003 | Hartz et al. |
| 6,858,826 | B2 | 2/2005 | Mueller et al. |
| 6,875,914 | B2 | 4/2005 | Guha |
| 7,133,551 | B2 | 11/2006 | Chen et al. |
| 7,238,879 | B2 | 7/2007 | Matsushita |
| 7,271,377 | B2 | 9/2007 | Mueller et al. |
| 7,303,788 | B2 | 12/2007 | Kataoka |
| 7,305,983 | B1 | 12/2007 | Meder et al. |
| 7,324,666 | B2 | 1/2008 | Zoken et al. |
| 7,343,268 | B2 | 3/2008 | Kishikawa |
| 7,376,284 | B2 | 5/2008 | Tao et al. |
| 7,500,391 | B2 | 3/2009 | Woro |
| 7,529,794 | B2 | 5/2009 | Dorai et al. |
| 7,534,956 | B2 | 5/2009 | Kataoka |
| 7,733,342 | B2 | 6/2010 | Kim et al. |
| 7,749,351 | B2 | 7/2010 | Kataoka |
| 7,787,659 | B2 | 8/2010 | Schultz et al. |
| 7,832,267 | B2 | 11/2010 | Woro |
| 7,844,499 | B2 | 11/2010 | Yahiro et al. |
| 7,873,239 | B2 | 1/2011 | Yamaai |
| 7,904,382 | B2 | 3/2011 | Arfin |
| 7,991,226 | B2 | 8/2011 | Schultz et al. |
| 8,078,436 | B2 | 12/2011 | Pershing et al. |
| 8,145,578 | B2 | 3/2012 | Pershing et al. |
| 8,160,400 | B2 | 4/2012 | Snavely et al. |
| 8,249,902 | B2 | 8/2012 | Arfin et al. |
| 8,315,912 | B2 | 11/2012 | Yahiro et al. |
| 8,326,021 | B2 | 12/2012 | Kobayashi et al. |
| 8,417,061 | B2 | 4/2013 | Kennedy et al. |
| 8,543,716 | B1* | 9/2013 | Rashidi ................. G06Q 10/10 709/226 |
| 2003/0071194 | A1 | 4/2003 | Mueller et al. |
| 2004/0153371 | A1 | 8/2004 | Razumov |
| 2006/0061566 | A1 | 3/2006 | Verma |
| 2006/0137736 | A1 | 6/2006 | Nishitani et al. |
| 2006/0232605 | A1 | 10/2006 | Imamura |
| 2006/0265287 | A1 | 11/2006 | Kubo |
| 2007/0110338 | A1 | 5/2007 | Snavely et al. |
| 2007/0150198 | A1 | 6/2007 | MacDonald |
| 2007/0150366 | A1* | 6/2007 | Yahiro .................... G06Q 10/10 705/14.34 |
| 2008/0162380 | A1 | 7/2008 | Suga et al. |
| 2008/0262789 | A1 | 10/2008 | Pershing et al. |
| 2008/0267454 | A1 | 10/2008 | Kobayashi et al. |
| 2009/0032436 | A1 | 5/2009 | Pershing |
| 2009/0132210 | A1 | 5/2009 | Royan et al. |
| 2009/0132436 | A1 | 5/2009 | Pershing |
| 2009/0177458 | A1 | 7/2009 | Hochart et al. |
| 2009/0234692 | A1* | 9/2009 | Powell .............. G06F 17/30241 705/26.4 |
| 2009/0304227 | A1 | 12/2009 | Kennedy et al. |
| 2010/0110074 | A1 | 5/2010 | Pershing |
| 2010/0114537 | A1 | 5/2010 | Pershing |
| 2010/0217565 | A1 | 8/2010 | Wayne |
| 2010/0217724 | A1 | 8/2010 | Wayne |
| 2011/0016017 | A1 | 1/2011 | Carlin |
| 2011/0047048 | A1 | 2/2011 | Yahiro |
| 2011/0205245 | A1 | 8/2011 | Kennedy et al. |
| 2014/0015924 | A1 | 1/2014 | Pryor |
| 2014/0032178 | A1 | 1/2014 | Kicinski et al. |
| 2014/0289168 | A1* | 9/2014 | Wayne ............... G06Q 30/0283 705/400 |

FOREIGN PATENT DOCUMENTS

| | | |
|---|---|---|
| JP | 11-183172 | 7/1999 |
| JP | 2000-236737 | 9/2000 |
| JP | 2001-209680 | 8/2001 |
| JP | 2001-229262 | 8/2001 |
| JP | 2002-163640 | 6/2002 |
| JP | 2002-520969 | 7/2002 |
| JP | 2005-196321 | 7/2005 |
| WO | WO 00/04508 | 1/2000 |
| WO | WO 2000/029806 | 5/2000 |
| WO | WO 2005/068935 A1 | 7/2005 |
| WO | WO 2007/127864 A2 | 8/2007 |
| WO | WO2009/046459 | 8/2010 |
| WO | WO 2012/048304 | 4/2012 |
| WO | WO 2013/040016 A1 | 3/2013 |

OTHER PUBLICATIONS

Pryor, A., U.S. Appl. No. 61/391,069, "Rapid 3D Modeling", filed Oct. 7, 2010.
Japanese Patent Office, Office Action, Japanese Application No. 2010-528219, 5pgs., dated Aug. 25, 2014, with translation.
Bartesaghi, Alberto, Three-dimensional shape rendering from multiple images, Graphical Models 2005 pp. 1-15, Elsevier, online at www.science direct.com.
Hudson, Thomas R. , 'Merging VRML Models: Extending the Use of Photomodeller' Mar. 23, 1998, Thesis, School of Engineering and Applied Science, University of Virginia.
Oliver Faugeras "The Geometry of Multiple Images" 2001 United States ISBN 0-262-06220-8 (Table of contents).
International search report and written opinion received in connection with international application No. PCT/US2014/053121; dated Dec. 10, 2014.
Mexican Office action, Mexican Application No. MX/a/2014/008214 dated Nov. 27, 2014, with informal translation dated Feb. 6, 2015 (redacted letter).
Mexican Office action, Mexican Application No. MX/a/2013/003853; dated Apr. 25, 2014 with informal translation dated Jun. 30, 2014 (redacted letter).
Mexican Office Action received in connection with Mexican Application No. MX/a/2014/008214; dated Apr. 24, 2015 (with redacted letter as informal translation).
Canadian Office Action and search report received in connection with Canadian Application No. 2,701,645; dated Mar. 19, 2015.
Invitation to respond to the written opinion and search report received in connection with Singapore patent application No. 2013025572; dated Jun. 27, 2014.
Patent Examination Report received in connection with Australian Patent Application No. 2011312140, dated Sep. 17, 2014.
Examination report received in connection with Philippine Application No. 1/2010/500721; dated Sep. 17, 2014.
Letter re Mexican Office Action received in connection with Mexican Application No. MX/a/2010/003682; dated Mar. 12, 2014 (redacted).
Notice of Allowance received in connection with U.S. Appl. No. 12/681,375; dated Aug. 25, 2015.
GeoTango Releases SilverEye 2.3, webpage found at http://www.directionsmag.com/pressreleases/geotango-releases-silvereye153-23/107384; downloaded Sep. 18, 2015.

(56) References Cited

OTHER PUBLICATIONS

GeoTango International, "GeoTango International Releases SilverEye V2.0", Design, CMS, Hosting & Web Development: ePublishing, Mar. 31, 2004.
Woro, "Solar Census", U.S. Appl. No. 60/796,033, filed Apr. 27, 2006.
Powell et al., "Method and System for Configuring Solar Panel Systems", U.S. Appl. No. 61/069,279, filed Mar. 13, 2008.
International Preliminary Report on Patentability and written opinion received in connection with international application No. PCT/US2014/053121; dated Mar. 10, 2016.
Korean Office Action received in connection with Korean Patent Application No. 10-2010-7008197; dated Jul. 17, 2015.
English Translation of Korean Office Action received in connection with Korean Patent Application No. 10-2010-7008197; dated Jul. 17, 2016.
Non-final office action received in connection with U.S. Appl. No. 13/878,106; dated Feb. 1, 2016.
Philippine Office Action received in connection with Philippine Application No. 1/2013/500647; dated Jan. 11, 2016.
Canadian Office Action for Canadian Application No. 2,701,645, 3 pages, dated Feb. 29, 2016.
Chinese Office Action received in connection with Chinese Application No. 201180048808.1; dated Mar. 20, 2015 (with partial English translation).
Japanese Office Action received in connection with related Japanese Application No. Tokugan2010-528219; dated Sep. 11, 2013 (3 pgs.).
English translation of Japanese Office Action received in connection with related Japanese Application No. Tokugan2010-528219; dated Sep. 11, 2013 (4 pgs.).
European search report received in connection with European application No. EP08836170.4, dated Jan. 15, 2014.
Australian office action received in connection with Australian Application No. AU appln. 2008309133, dated Apr. 20, 2012.
International Preliminary Report on Patentability and written opinion received in connection with international application No. PCT/US2008/079003; dated Dec. 5, 2008.
International Search Report received in connection with international application No. PCT/US2008/079003; dated Dec. 5, 2008.
Letter re Mexican Office Action received in connection with Mexican application No. MX/a/2010/003682; dated Nov. 20, 2013 (redacted).
Hendrickx et al., "3D Reconstruction of House Roofs from Multiple Awrial Images of Urban Areas" IAPRS, vol. 32, Part 3-4W2, pp. 88-95 (1997).
Matthews, N. A., "Aerial and Close-Range Photogrammetric Technology: Providing Resource Documentation, Interpretation, and Preservation" (2008).
Written Opinion received in connection with international application No. PCT/US2011/055489; dated Feb. 8, 2012.
International Search Report received in connection with international application No. PCT/US2011/055489; dated Feb. 8, 2012.
Pershing et al., U.S. Appl. No. 60/925,072, "Aerial roof estimation system and method", filed Apr. 17, 2007.
Extended European Search Report, Rule 62 EPC and Supplementary European Search Report (Art. 153(7) EPC) and European Search Opinion, dated Apr. 18, 2017, 10 pages.
Connolly, D. et al., "A Review of Computer Tools for Analysing the Integration of Renewable Energy Into Various Energy Systems," Applied Energy, vol. 87, pp. 1059-1082, (2009).

* cited by examiner

FIG. 10F

DESIGNING AND INSTALLATION QUOTING FOR SOLAR ENERGY SYSTEMS

RELATED APPLICATIONS

The present application claims the benefit of priority to U.S. Provisional Application No. 61/871,419, entitled "Method and System for Providing Instant Solar System Installation Quote" filed Aug. 29, 2013, the entire contents of which are hereby incorporated by reference.

BACKGROUND

Solar (photovoltaic) power systems (or "solar energy systems") are an increasingly important source of electricity for businesses, municipalities, and personal installations. Such solar energy systems may provide significant energy supplies to offset or even replace traditional sources of electricity, such as utilities utilizing non-renewable energy resources (e.g., coal, gas, etc.). Giving the greatest exposure to the sun, solar energy systems are often installed on roof tops, such as in rows of solar panels attached to a residential building roof. However, in order to accommodate various installation requirements, such as irregular roof shapes and shading, solar energy systems must often be custom-designed for particular installation sites.

Various techniques for determining custom solar energy systems and their potential at installation sites currently exist. In particular, automated systems may utilize various data, such as aerial imagery, LiDAR, and/or parcel data, to accurately estimate three-dimensional properties (e.g., geometry, azimuth, slope, surface faces, etc.) of rooftops as well as shading from nearby objects (e.g., trees, other buildings, etc.). Based on estimated or collected data, such techniques may identify the potential of installation sites to house components of solar energy systems as well as the potential to generate energy (or save energy) by such systems.

SUMMARY

Various embodiments provide systems, methods, devices, and non-transitory processor-readable storage media for improving the designing and installation quoting of solar energy systems by a computing system (e.g., a solar energy system design computing system). An embodiment method, performed by a processor of a solar energy system design computing system, may include receiving at least one of lead data or inquiry data related to a property, querying predefined data related to the property using the received at least one of lead data or inquiry data, evaluating the queried predefined data to qualify the received at least one of lead data or inquiry data, and performing at least one action related to the solar energy systems based on the evaluation of the queried predefined data using the received at least one of lead data or inquiry data. In some embodiments, the method may further include obtaining additional data from at least one additional data source relevant to the property, wherein the at least one additional data source may include third-party web servers, GIS, social networking services, data warehouses, and utility computing devices.

In some embodiments, performing at least one action related to the solar energy systems based on the evaluation of the queried predefined data may include at least one of rendering a solar energy system design and transmitting to third-party devices marketing information related to at least one of a solar energy system price, a design, and installation.

In some embodiments, the method may further include presenting e-signable solar energy system installation contract information to a customer associated with the property based on performing the at least one action. In some embodiments, the method may further include auto-determining a best-fit solar energy system for the property based on the evaluating of the queried predefined data, and performing at least one action related to the solar energy systems based on the evaluation of the queried predefined data using the received at least one of lead data or inquiry data may include presenting the auto-determined best-fit solar energy system to a customer by rendering the solar energy system on a screen.

In some embodiments, the method may further include presenting information describing the predefined data used to design the best-fit solar energy system. In some embodiments, the method may further include presenting a plurality of options or characteristics for designs of a solar energy system relevant to the property, receiving user selection inputs related to the presented plurality of options or characteristics, and designing the solar energy system for the property using the received user selection inputs, and performing at least one action related to the solar energy systems based on the evaluating of the queried predefined data using the received at least one of lead data or inquiry data may include presenting the designed solar energy system by rendering the designed solar energy system on a screen.

In some embodiments, the predefined data may include real-world data related to the property obtained from a plurality of data sources, and the real-world data may include at least one of parcel data, aerial imagery, LiDAR data, pitch, azimuth, longitude/latitude, buildable area data, electricity usage data, utility rates, tariff rates, structural data corresponding to the property, and characteristics of an area related to the property.

In some embodiments, the method may further include identifying an optimal size set of solar energy system design constraint sets for the property using the predefined data, arranging solar panels for each solar energy system design constraint set in the identified optimal size set to generate a plurality of solar energy system designs, and storing the generated plurality of solar energy system designs in relation to the predefined data related to the property.

In some embodiments, arranging solar panels for each solar energy system design constraint set in the identified optimal size set to generate solar energy system designs may include calculating and pre-caching potential module output values for each solar energy system design constraint set in the identified optimal size set using the predefined data related to the property, and placing solar modules based on the calculated and pre-cached potential module output values.

In some embodiments, the method may further include iteratively placing modules on a roof indicated in the predefined data to generate a solar energy system design, wherein placing may include placing the modules in regions of the roof with a next-best solar generation potential based on at least one of shading and orientation, determining whether the generated solar energy system design is buildable based on electrical engineering rules, and storing the generated solar energy system design.

In some embodiments, the at least one of lead data or inquiry data may be received via a website or an app associated with the solar energy system design computing system. In some embodiments, the app associated with the solar energy system design computing system may be executed on a tablet mobile device within a store. In some embodiments, performing at least one action related to the solar energy systems based on the evaluation of the queried predefined data using the received at least one of lead data or inquiry data may include using the predefined data with remote solar design (RSD) processes that utilize aerial photos and other raw data to generate roof models and estimate shading.

In some embodiments, performing at least one action related to the solar energy systems based on the evaluation of the queried predefined data using the received at least one of lead data or inquiry data may include automatically prioritizing leads based on the evaluation of the predefined data, and the leads may be qualified based on information within the predefined data including at least one of house square footage, income level, house style, area regulations, purchasing trends, savings information, solar potential output, potential financial impacts of installing solar, shading, and tax incentives.

In some embodiments, the method may further include transmitting marketing materials based on the prioritized leads, and the marketing materials may include solar energy system price quote information based on the evaluation of the predefined data that may include savings information. In some embodiments, the marketing materials may be transmitted to a device associated with a third-party that may include at least one of a mobile device, a server, a point-of-sale device, and a scheduling device, and the third-party may be at least one of a contractor, a solar energy system installing company, a handy-man, a utility company, a roofer, a builder, a power plant owner/manager, an architect, a non-profit organization, and a product delivery service.

In some embodiments, the third-party may be at least one of the utility company or the power plant owner/manager, and the marketing materials may include at least one of solar incentives or offers to customers calculated to optimize infrastructure deployment, upgrades, and maintenance related to at least one of a power plant, a substation, or transmission equipment.

In some embodiments, performing actions based on the evaluation of the queried predefined data using the received at least one of lead data or inquiry data may include one of generating promotional content that include solar energy system price quote information related to the property, or generating data which can be used to generate the promotional content. In some embodiments, the solar energy system design computing system may include at least one of a server and a mobile device.

Further embodiments include a computing device (e.g., a solar energy system design computing system, a server, etc.) configured with processor-executable instructions for performing operations (or steps) of the various embodiment methods described above. Further embodiments include a non-transitory processor-readable medium on which is stored processor-executable instructions configured to cause a computing device (e.g., a solar energy system design computing system, a server, etc.) to perform operations of the various embodiment methods described above. Further embodiments include a communication system including one or more computing devices (e.g., a solar energy system design computing system, a server, a mobile device, etc.) configured with processor-executable instructions to perform operations of the various embodiment methods described above.

In some embodiments, a method may include operations for installations of solar energy systems on building structures (e.g., real-world structures) that include receiving, at a computing device from a solar energy system design computing system, data corresponding to a solar energy system design for a building structure, wherein the received data is generated by the solar energy system design computing system based on at least one of lead data and inquiry data related to the building structure used to query predefined data related to the property that is in turn evaluated by the solar energy system design computing system to qualify the received at least one of lead data or inquiry data, determining whether the received data includes an agreement for an installation of a solar energy system based on the solar energy system design, rendering instructions for acquiring components of the solar energy system based on the solar energy system design in response to determining the received data includes the agreement, and rendering instructions for installing the components at the building structure.

In some embodiments, a solar energy system may include at least a solar panel mounted to a building structure, wherein the solar energy system is installed by a third-party entity in response to a computing device associated with the third-party entity performing a method that comprises receiving, at the computing device from a solar energy system design computing system, data corresponding to a solar energy system design for the building structure, wherein the received data is generated by the solar energy system design computing system based on at least one of lead data and inquiry data related to the building structure used to query predefined data related to the property that is in turn evaluated by the solar energy system design computing system to qualify the received at least one of lead data or inquiry data, determining whether the received data includes an agreement for an installation of a solar energy system based on the solar energy system design, rendering instructions for acquiring components of the solar energy system based on the solar energy system design in response to determining the received data includes the agreement, and rendering instructions for installing the components at the building structure.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 3A, 3A-2, 3A-3, 3A-4, and 3A-5 are a component block diagram of an embodiment database schema used by a solar energy system design computing system.

FIGS. 3B, 3B-2, 3B-3, 3B-4, 3B-5, 3B-6, 3B-7, and 3B-8 are a component block diagram of another embodiment database schema that may be used by a solar energy system design computing system.

FIG. 5 is a diagram illustrating an exemplary optimal size evaluation by the solar energy system design computing system when an objectives variable relates to max power consumption for a particular property.

FIG. 6 is a diagram illustrating an exemplary optimal size evaluation by the solar energy system design computing system when an objectives variable relates to max savings.

FIG. 8 is a process flow diagram of a simplified method for the solar energy system design computing system to use data related to solar energy systems.

FIGS. 10A-F are diagrams illustrating an embodiment application for generating solar energy system price quote information and solar energy system design information in an interactive, fast manner with a tablet mobile device.

DETAILED DESCRIPTION

Figure 1:
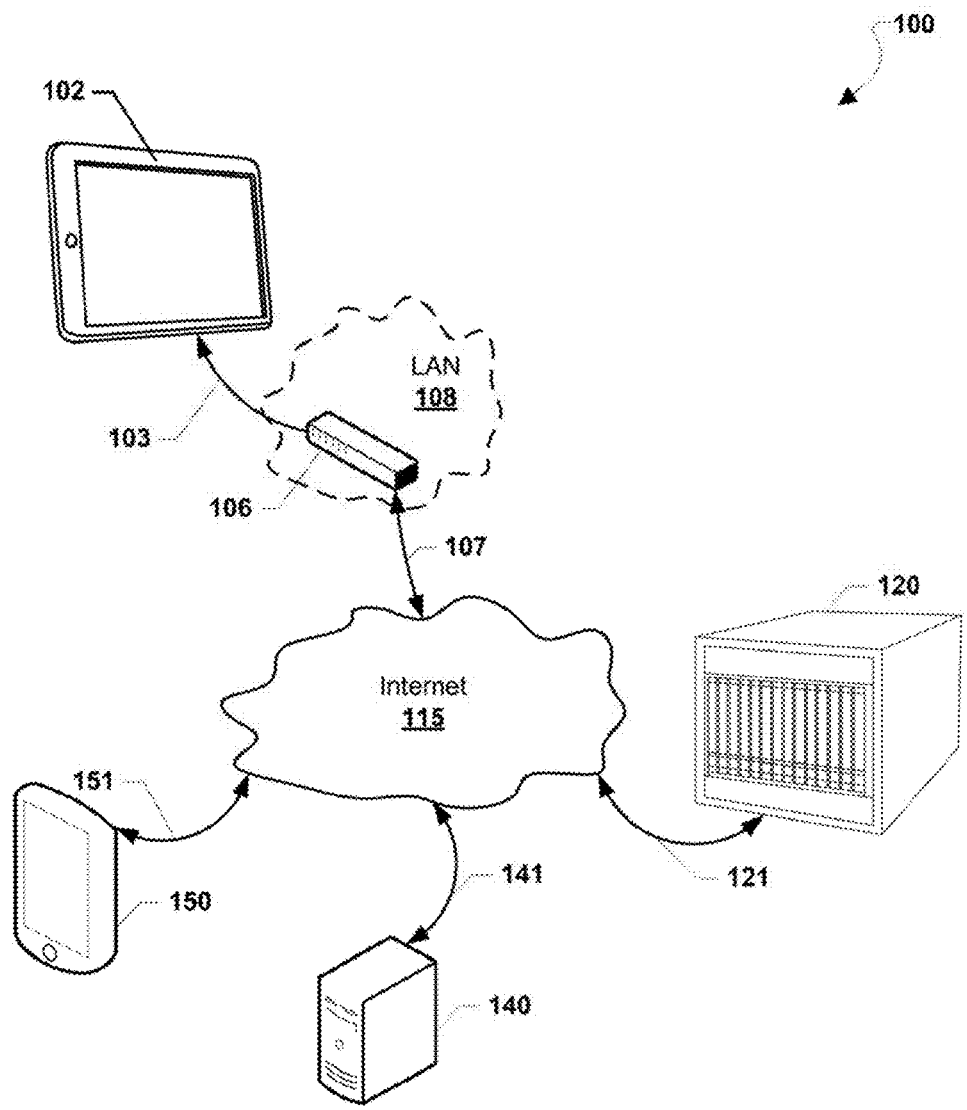
FIG. 1 is a diagram of a communication network suitable for the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any electronic device equipped with at least a processor capable of performing routines, software, instructions, and/or any other operations. The terms "mobile computing device" or "mobile device" are used herein to refer to any one or all of cellular telephones, smart-phones (e.g., iPhone®), web-pads, tablet computers, Internet enabled cellular telephones, Wi-Fi enabled electronic devices, personal data assistants (PDA's), laptop computers, personal computers, and similar computing devices equipped with at least a processor. In various embodiments, such devices may be configured with a network transceiver(s) to establish a wide area network (WAN) and/or local area network (LAN) connection (e.g., a Long Term Evolution (LTE), 3 G or 4 G wireless wide area network transceiver, a wired connection to the Internet, or Wi-Fi).

The term "solar energy system design computing system" is used herein to refer to any one or more computing devices configured to perform software for receiving, transmitting, calculating, rendering, updating, and otherwise processing data relevant to generating and distributing solar energy system information, such as solar energy system installation designs and/or price quote information for solar energy designs. For example, a solar energy system design computing system may include a mobile device with a processor configured to execute software for receiving address information of a property (e.g., house, warehouse, etc.), identifying information indicating a set of potential best-fit solar energy system designs using predefined data stored locally (or remotely), and presenting the identified information to customers (e.g., transmit an email, render an image on a touch screen, etc.). As another example, an embodiment solar energy system design computing system may include a server with a processor configured to execute operations for receiving address information of a property, identifying information indicating a set of potential best-fit solar energy system designs using stored predefined data, and transmitting an email or proprietary message describing the identified information via Internet protocols to another device (e.g., a mobile device executing solar energy system quote software, a computer accessing a solar energy system quote website, a third-party server, etc.).

The term "solar energy system design constraint set" is used herein to refer to any predefined dataset indicating relationships, configurations, constraints, rules, and/or other predefined restrictions used by a solar energy system design computing device when performing operations for developing solar energy system designs. For example, a solar energy system design constraint set may be a solar energy system template. As another example, a solar energy system design constraint set may be a dataset indicating compatible combinations of modules for various types of inverters.

Known techniques for providing quotes to prospective customers may be slow, often a day or more to produce, inaccurate, and lacking interactive inputs that finely-tune solar energy systems to particular characteristics, objectives, and scenarios for the customers. Various embodiments are presented that improve the systems, devices, and processes for designing and/or providing quote information for the installation of solar energy systems. In various embodiments, the functioning of a solar energy system design computing system may be improved by being configured to utilize data related to solar energy systems, potential customers, and other factors to efficiently render, transmit, and otherwise provide information related to custom solar energy system designs. In particular, the solar energy system design computing system may access and apply predefined data, such as pre-calculated solar energy system designs, roof models/measurements (e.g., pitch, azimuth, etc.), customer demographics information, census data, utility usage information, and/or shading estimates, to efficiently and quickly generate solar energy system designs and related quote information to be delivered to various parties. Such embodiments of this disclosure may benefit the functioning of solar energy system design computing systems (and quotation/installation procedures) by improving the speed-to-presentation and content of design and quote information that may be communicated between computing devices, allowing parties to more quickly receive robust information about potential solar energy systems.

In various embodiments, the solar energy system design computing system may receive lead data and/or inquiry data (e.g., a residence address from a website inquiry, a street address from a partner entity, etc.), query a known data set (e.g., pre-calculated system designs, census database information, GIS data, etc.), and qualify the lead/inquiry data based on the known data set. For example, the solar energy system design computing system may receive a lead based on an Internet protocol message including a residential address, and in response, may perform a look-up operation on various databases to identify the property at the address, as well as the owner. Based on such lead/inquiry data qualifying operations, the solar energy system design computing system may perform various actions to provide "instant" solar energy system quote information (or solar energy system price quote information), such as generating a proposal correspondence (e.g., email, flyer, text message, etc.) that indicates a solar energy system design related to the address. In some embodiments, the solar energy system design computing system may perform qualifying operations in order to identify whether the lead/inquiry data is valid (e.g., is the prospective customer a scammer or is not actually associated with the property).

In general, the term "lead/inquiry data" may refer to various information that may be received and used by the solar energy system design computing system to provide information relevant to solar energy systems to various parties, such as vendors, partners, potential customers, etc. Lead/inquiry data received by the solar energy system design computing system, such as a potential customer request or address(es) from a third-party, may or may not be used by the solar energy system design computing system to generate information relevant to sales or marketing applications, but may also be used to provide information in situations not directly sales focused. For example, lead/inquiry data may include addresses (e.g., street addresses of residences, etc.) that may be received by the solar energy system design computing system to generate and transmit free, branded solar estimates for real-estate agents to promote solar benefits for a particular house. Lead/inquiry data may be received from various sources, such as customers, partner entities, and referrals.

In one embodiment, in response to receiving a customer input (e.g., a potential customer's residential address information), the solar energy system design computing system may look-up a set of stored pre-calculated solar energy system designs relevant to the input, as well as other data relevant to the customer (e.g., income/salary information, neighborhood characteristics, etc.), to identify a best-fitting solar energy system. For example, in response to detecting a street address input, the solar energy system design computing system within a home improvement store may render a solar energy system design that not only fits the rooftop for the house at the street address, but is also configured to have the cheapest monthly cost. In some embodiments, the solar energy system design computing system may identify the best-fitting solar energy system by analyzing financial information related to pre-calculated solar energy system designs. For example, the solar energy system design computing system may estimate an annual utility bill savings based on a pre-calculated solar energy system design and data indicating a potential customer's average monthly utility bill.

In some embodiments, the solar energy system design computing system may be configured to render or otherwise present relevant information to a user and re-calculate best-fitting solar energy system designs based on subsequently received inputs. In other words, the solar energy system design computing system may be configured to support an interactive solar energy system application process. For example, the solar energy system design computing system may render (or otherwise display to a customer) a set of factors, options, characteristics, and/or conditions (e.g., best term savings, best bill reduction, biggest system, system made in a particular country, such as the United States of America, etc.) and may identify and present a solar energy system and related quote information based on received customer selection inputs of the elements in the set. In various embodiments, the solar energy system design computing system may utilize user customizations indicated by potential customers during an application process, such as manufacturer preferences (e.g., use equipment from Company X, etc.), country-of-manufacture (e.g., equipment made in the United States of America), system size (e.g., large, small, etc.), preferred installation areas of a roof (e.g., sections of a roof to keep clear of solar cells/equipment, etc.), and updates of source data (e.g., indicate that a certain tree has been chopped down or grown taller, a new building is now at an address, an old building has been demolished from an address, etc.).

In some embodiments, the solar energy system design computing system may utilize the predefined data to evaluate a plurality of prospective installation sites and generate a prioritized list of potential customers (e.g., those houses with best roofs, houses with best incomes/credit history, etc.). The solar energy system design computing system may transmit such prioritized lists to devices associated with various partner entities, such as utilities and businesses with large customer bases, and may include contact information. In some embodiments, the solar energy system design computing system may identify the prioritized list based on a received customer list from a device associated with a partner entity. For example, the solar energy system design computing system may scan roof data for all customers listed within a received customer address list (or a particular neighborhood) to determine the customers linked to roofs having the greatest amount of roof space usable for solar energy systems. In some embodiments, the solar energy system design computing system may obtain system designs for all customers in received customer lists, generate proposal information (e.g., design specifications, estimated savings, etc.) and transmit the proposal information (e.g., via email) to partner entities and/or directly to customer devices.

In some embodiments, the solar energy system design computing system may generate information for transmission to power plant operators. For example, the solar energy system design computing system may use the predefined data to estimate how reduced power consumption based on potential solar energy systems within an area (e.g., a neighborhood, a city, etc.) might reduce the need to build a new substation/power plant in the area or upgrade an existing substation/power plant or transmission equipment. In other words, the quote system may evaluate whether power plant operators, or alternatively utility companies, should upgrade substations/equipment or provide solar incentives or offers to avoid such costly upgrades. In some embodiments, quote information (or marketing information) may be generated that includes or does not include solar incentives or offers to customers calculated so that the power plant may avoid power plant upgrades (e.g., substation upgrades).

In some embodiments, the solar energy system design computing system may generate promotional content, such as digital banner ads, that include information based on assessments of the predefined data. For example, the solar energy system design computing system may generate a banner ad that includes solar energy system design information for display in combination with a particular website (e.g., Zillow®, Google® maps, etc.) in response to receiving a message that includes an address or other location information (e.g., GPS coordinates, etc.). In some embodiments, the solar energy system design computing system may generate and transmit information to third-parties (e.g., web servers, social media servers, etc.) that may be used by the third-parties to generate and render such promotional content. For example, the solar energy system design computing system may generate data related to the solar potential of a certain house or customer, transmit that data to a third-party computing device which in turn may generate and display personalized digital content (e.g., embedded content of a third-party website, app, device, etc.) to customers that describes opportunities for "going solar" (or installing/using solar energy systems) based on the data.

The various embodiments provide systems, devices, and methods for providing instant, automated, and interactive experiences for receiving solar energy system design quotes from a solar energy system design computing system. The various embodiments may improve the functioning of a solar energy system design computing system by configuring such a system to perform operations in an efficient manner to automatically generate accurate, personalized quotes for buildable, e-signable solar energy systems in response to receiving lead data (e.g., an address of a prospective customer). Such quotes may be efficiently presented, rendered, and/or transmitted to various devices by the solar energy system design computing system. For example, the solar energy system design computing system may be a tablet mobile device that renders best-fit solar energy system designs and related information for consumption by sales people and other parties using the tablet mobile device. The various embodiments may provide fast, automated experiences for solar energy system design computing systems that may be valuable in removing the need for manual intervention by parties during the course of receiving solar energy system quotations, reducing costs and personnel demands regarding sales by qualifying lead data (e.g., identify high-value leads, etc.), encouraging customers to provide more information due to the instant automated, interactive experiences, increasing efficiency of processing prospective customers by performing qualifying operations (e.g., a qualification funnel that utilizes multiple steps to elicit information from customers, such as address, roof type, electricity usage estimate, utility provider, contact information, etc.), reducing error by using a deterministic, predictable, constantly improving algorithm, and facilitating targeted marketing. As such, such efficient and improved design and quoting features may be well-suited for inclusion and use in various computing devices that may have limited resources and that may be accessible to various entities, especially solar energy system vendors and consumers.

FIG. 1 illustrates a communication network 100 that may be suitable for the various embodiments. The communication network 100 may include various computing devices that are connected or otherwise in communication with each other, such as via various networking (e.g., Internet) protocols. In particular, a server 120 may have a wired or wireless connection 121 to the Internet 115, a mobile device 102 (i.e., a tablet device) may have a wired or wireless connection 103 to a wireless router 106 that in turn utilizes a connection 107 to the Internet 115, and a third-party computing device 140 may have a wired or wireless connection 141 to the Internet 115. Accordingly, the devices 102, 120, 140 may each utilize one or more networking interfaces, communication protocols, and other means of transmitting messaging with the Internet 115. For example, the mobile device 102 may include transceivers for exchanging data with the server 120. In some embodiments, the wireless router 106 may be associated with a local area network 108, such as a Wi-Fi LAN. In various embodiments, the server 120 and/or the third-party computing device 140 may also be within or otherwise connected to the local area network 108. Via the various connections, the devices 102, 120, 140 may all be configured to transmit communications, such as emails, text messages, proprietary messages, and other signals to one another. For example, the server 120 may be configured to transmit request messages to the third-party computing device 140 (e.g., a third-party server) for downloading data, such as 3D models of houses in an area, census data, utility usage/billing information, and other data. As another example, the mobile device 102 may transmit requests to receive solar energy system design information from the server 120. In various embodiments, the devices may be configured to exchange data via various wide area networks using various protocols. For example, the mobile computing device 102 may be configured to communicate over the Internet 115 via a cellular network (not shown).

In various embodiments, the server 120 may be associated with a solar energy system quoting service. For example, the server 120 may execute software, applications, and routines for collecting measurable information about properties (e.g., houses, buildings, etc.) within an area (e.g., a city, town, state, country, etc.), generating/estimating data related to potential solar energy systems for prospective customers, and transmitting information related to quotes for solar energy systems (e.g., email estimated designs and electricity savings to a prospective customer's smartphone, a computing device associated with a utility, and/or a tablet used to present information, etc.). The third-party computing device 140 may be associated with various third-parties, such as a vendor (e.g., solar cell/panel vendor, etc.), a utility (e.g., a power company, a billing service for a power company), an installation entity (e.g., a contractor), and/or a data source (e.g., a Geographic Information System (GIS) service, a 3D model service, a government census source, a social networking service, etc.). In some embodiments, the third-party computing device 140 may be a web server associated with a web service. In various embodiments, the server 120 may be configured to request and collect data from the third-party computing device 140 or alternatively distribute generated data to the third-party computing device 140. For example, the server 120 may download survey land information and/or historical solar activity data from the third-party computing device 140 (e.g., the third-party may be a data source). As another example, the server 120 may transmit data to the third-party computing device 140 representing solar energy system designs for properties within an area.

In some embodiments, the server 120 may also be configured to transmit data, such as solar energy system designs, part lists, and/or contract information, to third-parties for use in provisioning and installing solar energy systems. For example, the server 120 may be configured to transmit work order information (e.g., solar system design specifications, part lists, measurements, etc.) to a computing device 150 (e.g., a mobile device carried by a contractor, a personal computer within an office, etc.) connected to the Internet 115 via wired or wireless connections 151 (e.g., a cellular network connection, Wi-Fi local area network connection, etc.). In response to receiving such data (e.g., work order information, etc.), users of the computing device 150 may be enabled to physically acquire, place, install, and otherwise implement solar system equipment and systems for particular real-world structures (or building structures), such as residential or commercial buildings, without having to physically measure the structure and/or design aspects of the system before commencing with installation. In some embodiments, data transmitted from the server 120 to the computing device 150 may include various information that may be attractive to prospective customers, such as proposed installation layouts/schematics, promotions/offers, survey information, costs/savings projections information, etc. For example, the computing device 150 may be carried by a product delivery professional (e.g., mail/package delivery man, etc.) and may receive data about potential solar system installations relevant to the house the professional is delivering products to at a given time.

In some embodiments, the mobile device 102 may be configured to execute software or applications for generating solar energy system quotations, estimates, and/or designs. For example, the mobile device 102 may be a tablet computing device within a sales location, such as a big-box store, that is used by a sales associate to generate quotation information for nearby customers. In various embodiments, such a tablet mobile device 102 may be configured to receive data from the server 120 for generating solar energy system information (e.g., receive raw data and/or solar energy system design constraint set data (e.g., template data, etc.) to process with customer inputs, etc.). Alternatively, the mobile device 102 may be configured to act as a terminal or client that merely transmits inputs (e.g., touch screen inputs on a user interface, text information entered into text fields, etc.) and receives information for presentation to customers (e.g., renders a webpage or application that shows images related to solar energy system designs related to customer inputs).

Figure 2:
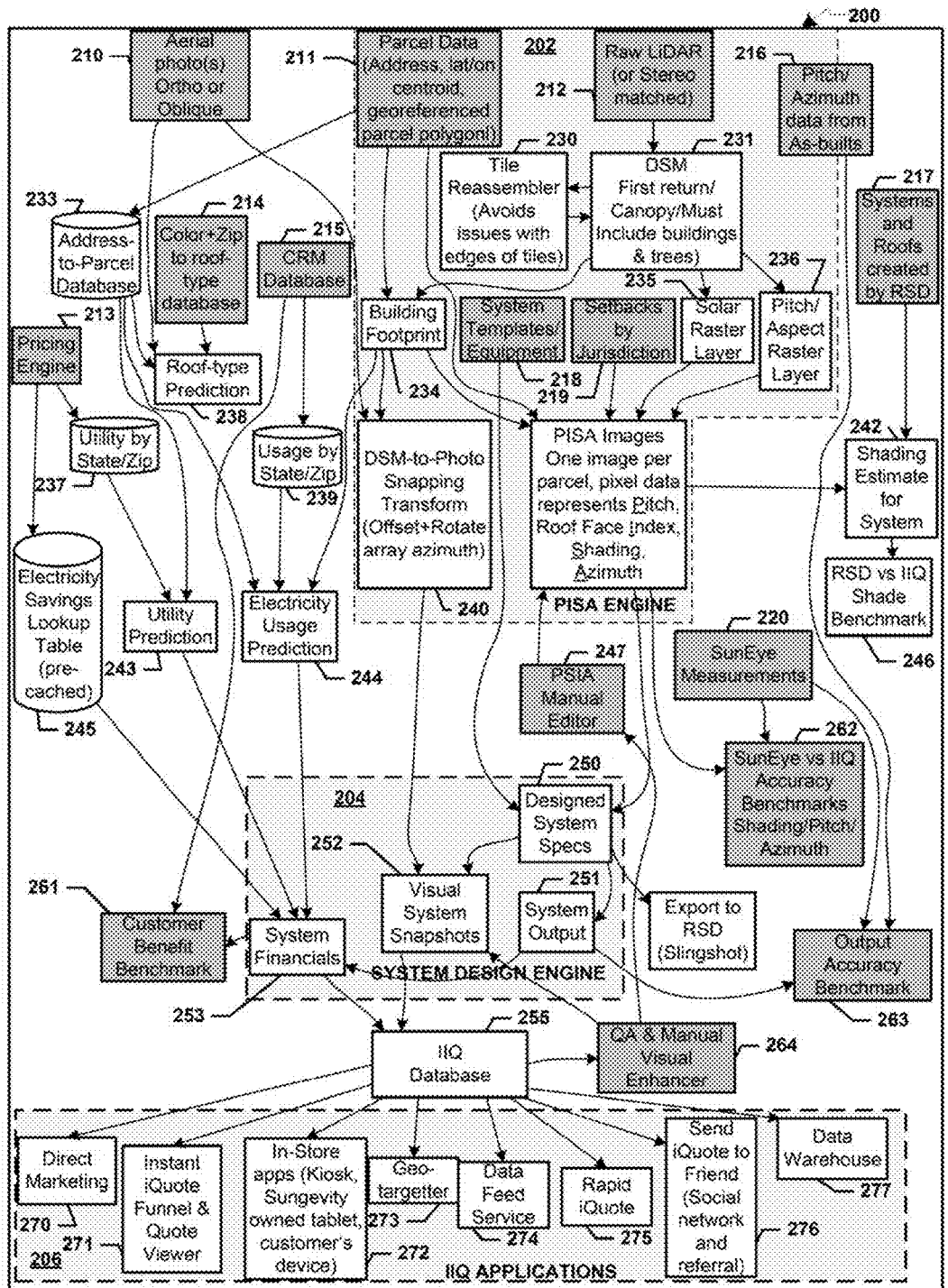
FIG. 2 is a component block diagram of an embodiment architecture of a solar energy system design computing system.

FIG. 2 illustrates an embodiment architecture 200 of a solar energy system design computing system. In various embodiments, the server 120 described above may be configured to include the circuitry, processing units, logic, software/instructions/routines/applications, storage components, and other elements for enabling a solar energy system design computing system having the architecture 200. In other embodiments, the architecture 200 may be distributed within the components, modules, and elements of a plurality of devices. For example, a mobile device 102 in a big box store and the server 120 may individual include any combination or all of the modules and functionalities of the solar energy system design computing system architecture 200. Additionally, any of the various modules, components, or functionalities of the solar energy system design computing system architecture 200 may be connected via wired, wireless, networked, or other means. For example, the solar energy system design computing system may access database units that are within a local device or alternatively that are within the cloud accessible via the Internet. In various embodiments, the various functionalities, components, engines, modules of the architecture 200 described below may be combined together, or alternatively may be optional.

In general, the solar energy system design computing system architecture 200 may include various engines, modules, components, applications, routines, software, and other units performed or controlled by one or more processors for processing data relevant to solar energy systems (and solar energy system quotes). In various embodiments, such elements may be coupled together in logical ways based on their required inputs/control information and datasets. In particular, the architecture 200 may include a data collection engine 202 (referred to as a "PISA Engine" in FIG. 2) that may use data that represents the structure of roofs, such as by creating roof models or geometry from raw data (e.g., aerial and/or terrestrial LIDAR, aerial photos, parcel data, etc.). LiDAR data may include data from aerial and/or terrestrial sources. In various embodiments, raw data may include data derived from raw data. For example, the solar energy system design computing system may store and use data derived from raw data that is never directly received, such as by receiving/storing digital surface models or elevation or point-cloud data that are created from multiple aerial photos that are not received by the solar energy system design computing system. Additionally, raw data may include data that represents real-world data but that is not actually derived directly from sensing the real world, such as architectural plans, blueprints, or schematics (e.g., CAD files). The data collection engine 202 may include, access, or otherwise be coupled to various modules, such as modules that acquire and/or process raw data from third-party data sets or devices, including modules for aerial photos data 210 (e.g., orthogonal or oblique photos), parcel data 211 (e.g., address, latitude/longitude, centroid, geo-referenced parcel polygon, etc.), and raw aerial and/or terrestrial LIDAR 212 (or stereo matched) data. The data collection engine 202 may also include modules for processing and/or storing proprietary or local raw data, including modules for pricing information 213 (e.g., pricing for vendors, equipment, labor, etc.), color and zip code to roof-type databases 214 (e.g., conversions logic for image processing to determine roof compositions, etc.), customer relationship management 215 (or "CRM"), pitch/azimuth data 216, systems and roofs created by a remote solar design (RSD) process 217, solar energy system design constraint sets 218 (e.g., system templates, predetermined building area configurations, etc.), setbacks by jurisdiction data 219, and data identifying shading obstructions 220 at various locations allowing predictions of shading/sun at dates/times over a year (referred to as "SunEye measurements" in FIG. 2). In some embodiments, the solar energy system design computing system may utilize the data identifying shading obstructions to predict shade profiles of roofs at various times over the course of a year, such as by performing operations to identify shaded areas of a skyline within imagery related to such roofs (e.g., photographs, etc.) and calculate the position of the sun relative to the shaded areas at any day/time. The data collection engine 202 may also include modules for processing intermediate routines and associated data, such as modules for assembling or re-assembling tiles 230 (e.g., avoid issues with edges of tiles), digital surface models 231 (e.g., data that includes canopies, building, trees, etc.), elevation or point-cloud data, address-to parcel databases 233, building footprints 234, solar raster layer data 235, pitch/aspect raster layer data 236, utility by state/zip code 237, roof-type predictions 238, power usage by state/zip code 239, DSM-to-photo snapping transform 240 (offset+ rotate array azimuth), PISA images 241 (one image per parcel, pixel data represents pitch, roof face index, shading, azimuth), shading estimate for system 242, utility prediction 243, electricity usage prediction 244, and electricity savings lookup tables 245 (pre-cached). The data collection engine 202 may also include modules for processing quality assurance issues, such as modules for RSD vs. instant quotation shade benchmarking 246 and PISA manual editor 247.

The architecture 200 may also include a system design engine 204 (referred to as System Design Engine in FIG. 2). The system design engine 204 may include, access, or otherwise be coupled to various modules, such as modules for processing intermediate routines and associated data, including modules for designed system specifications 250 and system outputs 251. The system design engine 204 may include modules for handling and generating key system outputs, such as modules for visual system snapshots 252, system financials 253, exporting data for expediting, supporting, and loading information (e.g., quote information) into another system used to manually design and simulate solar energy systems 254 (referred to as "Remote Solar Design (RSD) Slingshot" in FIG. 2), and instant quote databases 255. The system design engine 204 may include modules for processing quality assurance issues, such as modules for customer benefit benchmarks 261, for comparing data identifying shading obstructions at location and associated predictions of shading/sun at dates/times over a year to instant quote accuracy benchmarks 262 (using shading/pitch/azimuth) (referred to as "SunEye vs. IIQ" in FIG. 2), output accuracy benchmarks 263, and quality assurance and manual visual enhancer 264.

In some embodiments, the architecture 200 may also include modules, components, software, or other units for assessing the quality of raw data (or input data), the correspondence (or alignment) between various raw data sets, and providing tools for improving the accuracy of raw data. For example, the architecture 200 may include tools (e.g., threads, modules, etc.) configured to detect inaccurate parcel data and flag this parcel data for review or manual and/or automatic correction. As another example, the architecture 200 may include tools that assess correspondences between aerial photography and underlying LiDAR data and apply a correction if they are not perfectly aligned.

The architecture 200 may also include instant quote applications 206 (referred to as 'HQ Applications' in FIG. 2). The instant quote applications 206 may include various applications that utilize the various data managed and processed by the solar energy system design computing system, such as applications for direct marketing 270 (e.g., a module for generating quotes and/or contacting customers with proposals or quote information), instant quote funneling and quote viewing 271, in-store apps 272 (kiosk, iPad®/tablet, customer clients, etc.), geo-targeting 273, providing data to third-parties via a data feed service 274 (e.g., for displaying customized solar potential information in Zillow®, Google® maps, etc.), providing rapid instant quotes 275 (or "iQuotes"), sending instant quotes to friends 276 (i.e., a social network and referral system), and data warehousing for use in querying raw data 277. In various embodiments, the instant quote applications 206 may be performed, accessed, executed, and otherwise processed by various processors, modules, functionalities, and/or components of the architecture 200, or alternatively by other devices coupled or in communication with the solar energy system design computing system.

In some embodiments, the architecture 200 may include an administration module that allows administrators (or other authorized users) to maintain and access the various aspects of the solar energy system design computing system. For example, the administration module may include routines or tasks for performing trouble-shooting tasks on processes and/or data stored in association with the system (e.g., predefined data within local databases).

In some embodiments, the architecture 200 may also include a privacy or authentication module for ensuring the privacy of data. For example, the solar energy system design computing system may include procedures, software, or units dedicated to ensuring any transmission of data to third-parties (e.g., friends forwarding solar energy system price quote information, collaborating on instant quotes, etc.) is authorized for distribution. The privacy module may also be used to save passwords or other sensitive information related to solar energy system price quote information used by the solar energy system design computing system.

In some embodiments, the solar energy system design computing system may utilize an application programming interface (API) that includes various commands for accessing various modules, processes, applications, and data accessed or otherwise utilized by the solar energy system design computing system. For example, the solar energy system design computing system may utilize API commands configured to update real-world data, update potential data, re-calculate solar energy system designs for a particular address/customer using new inputs, and transmit emails with quotation information (e.g., solar energy system specifications, projected savings information, etc.). In some embodiments, a remote computing device executing software for accessing the solar energy system design computing system may execute API commands to communicate with the solar energy system design computing system (e.g., transmit new real-world data, request a quote for solar energy systems for an address, update census information stored in a database, etc.). For example, a tablet mobile device may call an API command that transmits an Internet protocol (IP) communication to be transmitted to a server requesting solar energy system designs to be returned.

In various embodiments, the solar energy system design computing system may utilize predefined data relevant to providing solar energy system quotation information to potential customers. The predefined data may include both "real-world" data and "potential" data. The real-world data may include information that is measured, collected, immutable, or estimated by the solar energy system design computing system or other devices/systems. The real-world data may also include historical information of events, actions, bills, usages, and other conditions that have occurred (or are certain to occur). For example, the real-world data may include property measurements, utility bill values, tax assessments, resident or owner information for a property (e.g., demographics information, etc.), census information, and almanac data related to a region. In general, the real-world data may be used to generate, pre-calculate, or calculate in real-time information relevant to potential solar energy system sales. Various types of real-world data are further described below.

Potential data may include information that is generated by the solar energy system design computing system based on the real-world data within the predefined data. In general, potential data may include various solar energy system designs for particular properties defined within the real-world data, as well as savings or "value-to-customer" information related to solar energy system designs in light of the various real-world data. In other words, the potential data may be dependent upon the real-world data and further may be the information transmitted or presented by the solar energy system design computing system to a potential customer to encourage the purchase of a solar energy system. In various embodiments, the potential data may be adjusted based on updates to the real-world data and/or received preference information received from potential customers. For example, solar energy system designs for a particular property address may be updated when new real-world data indicates the property now has a larger roof or different roof composition (e.g., ceramic tile, etc.). As another example, the solar energy system designs available for a property and/or the annual projected savings for these designs may change in response to the solar energy system design computing system receiving a customer preference selection that indicates only equipment made in a particular country (e.g., U.S.) should be included in solar energy system designs for a particular property. The generation of potential data, such as solar energy system designs, is further described below.

In various embodiments, the predefined data may be obtained or generated by the solar energy system design computing system in advance and/or may be obtained/retrieved/received from various sources (e.g., a third-party data source, a GIS data source, web servers, social networking sites, etc.). For example, the solar energy system design computing system may periodically receive data tables including information on roofs, neighborhood incomes values, shading estimates, census data, and other data relevant to solar energy systems from a third-party data provider, aggregator, broker, or agent. As another example, the solar energy system design computing system may generate real-world data that includes pitch and azimuth information for a property's roof in response to receiving aerial imagery from a remote data source.

In various embodiments, any combination or all of the predefined data may be stored locally by a computing device and/or on devices associated with the solar energy system design computing system (e.g., client terminals/mobile devices executing solar energy system quotation software, third-party computing devices/servers, etc.). For example, a computing device may be configured to package and transmit real-world data (e.g., pitch, azimuth, 3D model information, etc.) and/or potential data (e.g., pre-calculated solar energy system designs and projected annual financial or energy savings data, etc.) to a tablet mobile device executing client software configured to communicate with the solar energy system design computing system.

In various embodiments, the predefined data may be organized as a database so that the solar energy system design computing system may utilize (or access) real-world data of the predefined data and/or potential data of the predefined data in relation to addresses of properties. For example, the solar energy system design computing system may utilize a database or dataset that includes records for all property parcels in an area, such that the records are accurately geo-coded with latitude and longitude information related to the individual property parcels. The database may be optionally filtered by various information, such as street address, town, state, zip, country, and utility (e.g., electricity provider for the area). The database may be configured to so that predefined data may be referenced, looked-up, or otherwise accessed using latitude/longitude information for a particular address, which may be equivalent to a rooftop-accuracy geo-coding service that may or may not be more accurate than general indexing or searching services (e.g., Bing® and Google®) that utilize best-guess referencing between geo-coding and property parcels. In some embodiments, the solar energy system design computing system may determine whether the database includes latitude and/or longitude information that may be used to reference property parcels with 100% accuracy ("roof-top" level accuracy), and may perform look-ups to return best-guess data that may be coded as approximate (e.g., a metadata, flag, indicator, etc.).

In some embodiments, the solar energy system design computing system may access the database to find the nearest address for a given latitude/longitude. For example, the solar energy system design computing system may query the database with a particular latitude/longitude and obtain results that indicate a level of accuracy (e.g., "roof-top" level accuracy or "approximate"), whether the latitude/longitude point is within an address parcel, and/or a distance from a recorded latitude/longitude of the parcel.

In some embodiments, the solar energy system design computing system may include and/or be configured to execute with a processor a module (a "quality assurance module") for compiling a test framework and dataset ("test fixtures") which may be used to refine the various algorithms described in this disclosure and thus iteratively improve accuracy, such as the accuracy of solar energy system designs. Further, the solar energy system design computing system may use such a quality assurance module may utilize benchmark data, such as averages or data metrics supplied by third-parties, to evaluate potential data produced at various times. The solar energy system design computing system may use the quality assurance module to identify cases, data, communications, and other operations associated with providing quotes to customers that may warrant human intervention. For example, based on periodic evaluations of generated potential data and/or transmitted quote messages to various entities, the solar energy system design computing system may identify situations where the quality/fidelity/accuracy of available 3D data within the real-world data of the predefined data is too low, and thus may determine that new 3D data should be obtained and/or perform operations to initiate manual processes (e.g., transmit a notification message to start a manual RSD process).

In some embodiments, the solar energy system design computing system may also include and/or be configured to execute with a processor a module, software, or a component for processing feedback (or implementing feedback loops) regarding solar energy system design data and/or obtained real-world data. In some embodiments, such feedback functionality may be part of the quality assurance module described above. The solar energy system design computing system may establish feedback loops to compare real data with quoted data (e.g., quote data transmitted to prospective customers and/or third-parties, channel partners, etc.). For example, the solar energy system design computing system may use such a feedback module to automatically or periodically perform operations for various accounts/customers/users for comparing outputs of parameters estimation against obtained, real data, such as data related to customer relationship management or data representing insights into customer requirements and/or preferences.

The solar energy system design computing system may also be configured to stored accounts for various prospective customers, such as accounts created at the time of receiving a web site inquiry for a solar energy system quote. The solar energy system design computing system may store account data that indicates specification of a particular goal for each account (or user associated with a property/address), which may be important because each customer may have individual objectives when entertaining the installation of a solar energy system that may not be similar to default variables for optimizing solar energy system designs. For example, a solar energy system design goal or objective may be set by default as "maximize monthly savings," but may be changed to power generated based on received lead data or customer input information (e.g., information within a received inquiry). In some embodiments, the solar energy system design computing system may utilize feedback loops to identify a final monthly savings related to data representing insights into customer requirements and/or preferences versus a savings on a "recommended" system (which may be affected by customer goals), or the solar energy system design computing system may utilize feedback loops to identify a final system output related to data representing insights into customer requirements and/or preferences versus savings on a "recommended" system (affected by customer goals). In various other embodiments, the solar energy system design computing system may utilize feedback loops to identify a largest buildable system related to data representing insights into customer requirements and/or preferences versus largest IIQ system, pitch and azimuth of faces used in solar energy system designs (e.g., designs transmitted to customers in quotes, designs chosen by customers, etc.), pitch and azimuth matches (e.g., the solar energy system design computing system may match any faces and then compare pitch and azimuth measurements), and to provide summary appraisals of quote performance relative to data representing insights into customer requirements and/or preferences (e.g., level of accuracy as a percentage where 100% is perfect, 0% is terrible, list of errors, warnings, notices to identify any potential issues for review, etc.).

In some embodiments, the solar energy system design computing system may also include and/or be configured to execute with a processor other mechanisms, modules, software, etc. for supporting, maintaining, and improving its operations, such as by performing efficient processes for keeping data and processes up-to-date, upfront and ongoing quality assurance, ongoing enhancements to models/calculations, and expansion of coverage areas. The functionality of such a support module may be part of the quality assurance module described above. In particular, the solar energy system design computing system may perform operations to generate and evaluate test cases, such as by re-running already performed quotation calculations and solar energy system designs for particular addresses/properties. Such test cases may be used to interactively give feedback to developers, such as during the development of new features or functionality or alternatively during the regular processes of providing solar energy system price quote information to prospective customers, etc. The solar energy system design computing system may run such tests individually or all-at-once, such as a batch test operations, and the results of such diagnostic test may be saved (e.g., within logs, etc.) to provide summary and detailed test results information for further analysis, such as by human operators or quote system programmers.

In some embodiments, the solar energy system design computing system via the support module may be configured to periodically communicate with third-party data providers and update real-world data, such as buildable area data, utility rates information (e.g., average costs/consumption for areas, etc.), and rebate programs and levels. In response to such periodic updates, the solar energy system design computing system may be configured to partially re-calculate portions of stored lookup tables, such as by using utility and tariff information, or totally re-calculate data to handle changes, such as changes to utility rates or savings estimates. In some embodiments, the solar energy system design computing system may calculate lookup tables offline and may import these tables into production systems. In various embodiments, the solar energy system design computing system may be configured to fail gracefully when the lookup table values are requested, such as by a prospective customer, but are not yet populated or the related data has not been updated/obtained by the solar energy system design computing system. In some embodiments, the solar energy system design computing system may re-process system designs for existing parcels to add/remove/update solar energy system design constraint sets (e.g., templates) since original system designs were performed. For example, when solar energy system design constraint sets (e.g., templates) have been abrogated due to newly received data from utilities, etc., the solar energy system design computing system may update pre-calculated solar energy system designs for addresses to remove designs that utilize the abrogated solar energy system design constraint sets (e.g., templates). The solar energy system design computing system may remove or add a small set of additional solar energy system design constraint sets (e.g., templates) for designing as the solar energy system design constraint sets (e.g., templates) are added to or removed from the solar energy system design constraint sets database based on updated data. This may allow existing quotes or pre-calculated solar energy system designs to be updated much more quickly than attempting a complete redesign, which may throw away many system designs which are still valid.

In some embodiments, the solar energy system design computing system may also include and/or be configured to execute with a processor software, modules, circuitry, and components for processing customer relationship management (or CRM) operations. Such a CRM integration module may be used by the solar energy system design computing system to export selected automated system designs to selected accounts (e.g., database records associated with particular users, address, customers, etc.), export selected automated system designs to a RSD for selected accounts (e.g., perform operations for pre-populating the RSD workspace by synthesizing and loading data that may be used to expedite the design process for a solar energy system. In some embodiments, data generated or otherwise calculated by such a CRM integration module may not be used in generating instant solar energy system price quote information, except for solar energy system design constraint sets (e.g., templates) (which may be loaded and cached for use in generating quotes), real-time feedback loops as described above, and periodically extracted data to support the creation of test cases that may or may not be performed manually.

FIGS. 3A, 3A-2, 3A-3, 3A-4, and 3A-5 illustrate an embodiment database schema 300 used by a solar energy system design computing system. The various data defined throughout the disclosure may be stored and organized such that the solar energy system design computing system may access and process, via a processor, data in relation to addresses/properties or customers associated with the properties. In general, the solar energy system design computing system may utilize a database (or databases) having a schema 300 that enables quick and detailed modeling for generating accurate solar energy system quotes. The database schema 300 may be based on or utilize various database technologies (e.g., structured query language or SQL) and the solar energy system design computing system may access the data using various querying languages, scripts, and other techniques, such as MySQL statements In some embodiments, the database schema 300 may include datasets or data tables, such as a data table regarding utilities 302, a data table regarding electricity savings lookup tables 304, a data table regarding solar energy system design constraint sets (e.g., templates) 306 (as described below), a data table regarding solar energy system design constraint sets products 308, a data table regarding equipment related to solar energy systems 310, a data table regarding a primary system with attributes 312, a data table regarding applied system adders 314, where an adder may be an addition to costs or prices based on individual circumstances of the customer and the installation requirements, a data table regarding applied system adder settings 316, a data table regarding parcels 320, a data table regarding optimal system data 322, a data table regarding jurisdiction concerns 324, a data table regarding tax data 326, a data table regarding parcel datasets 328, a data table regarding parcel servers 330, a data table regarding data identifying shading obstructions at various locations 332 (e.g., data that enables predictions of shading/sun at dates/times over a period, such as a year), a data table regarding tile data 334 (i.e., tile data as a catalog for LiDAR data), a data table regarding dependency type 342, a data table regarding dependency data 344, and a data table regarding dependable data 346. In some embodiments, the data tables 342-346 may be associated or used by a dependency engine module within the solar energy system design computing system.

Each of the data tables may include various data fields that include data (e.g., double numeric values, string text, etc.). Further, the various data tables (and/or the data fields within the data tables) may be functionally or logically connected, linked, or used by the solar energy system design computing system in conjunction with one another as shown in FIGS. 3B, 3B-2, 3B-3, 3B-4, 3B-5, 3B-6, 3B-7, and 3B-8. In various embodiments, each of the data tables may include data specific to particular addresses/properties, or alternatively the database schema 300 may include individual copies of each of the data tables for all known properties/addresses. In some embodiments, the database schema 300 may include or enable a detailed solar output calculator and financial modeling system (e.g., "Ongrid," etc.), a detailed output modeling system (e.g., PVWatts), equipment lists (e.g., modules/inverters/racking, etc.), setbacks and design rules by jurisdiction, and solar energy system design constraint sets (e.g., electrical engineering or system templates).

FIGS. 3B, 3B-2, 3B-3, 3B-4, 3B-5, 3B-6, 3B-7, and 3B-8 illustrate another embodiment database schema 350 that may be used by a solar energy system design computing system. The schema 350 may be similar to the schema 300, except that the schema 350 may include different connections, data, and organization of data than the schema 300. In particular, the schema 350 may include various datasets/data tables within certain logical groupings, such as a settings and configurations grouping 362 (including data related to adder settings, etc.), a systems grouping 364 (including data related to systems, systems financial data, instant quote adders applied, systems data output, system equipment, systems adders applied, snapshots of systems, etc.), a static datasets grouping 352 (including data related to solar energy system design constraint sets (e.g., templates), system equipment rebate programs, tax rates, and jurisdictions, etc.), an external services grouping 356 (including data related to parcels, 3D surfaces, 3D data providers, utility plans, utilities, etc.), a mass pre-cached simulations grouping 354 (including data related to simulated systems, electricity savings lookup, panel configurations, etc.), a dependency engine grouping 360 (including data related to dependency types, dependencies, dependables, etc.), a solar energy system price quote information grouping 358 (including data related to instant quotes, instant quote permissions, notes, customer data, user data, area exclusions data, RSD jobs, transactions, etc.), and a 3D model grouping 366 (including data related to data points, aerial images, lines, line relationships, objects, faces, cameras, etc.). In some embodiments, quote data associated with the solar energy system price quote information grouping 358 may include a plurality of quotes for any one particular address/property, as different quotes may be associated with different users affiliated with the same address/property. In various embodiments, the various groupings may be associated with certain data, data tables, modules, logic, circuitry, applications, or other software for the solar energy system design computing system to perform related look-ups, processing, and data retrieval when generating solar energy system price quote information for prospective solar energy system customers.

In various embodiments, the real-world data of the predefined data may include elevation data and/or point-cloud data which are used to describe the attributes of roofs and shading obstructions within an area. For example, elevation data and/or point-cloud data may include information that facilitates calculation of the pitch, azimuth, number of planar faces, height, shading patterns of a particular roof of a building. Elevation data and/or point-cloud may be data stored within databases accessible by the quote computing system and may be used to create three-dimensional (3D) models of roofs as well as objects or surfaces surrounding the roofs. The real-world data of the predefined data may include digital surface models of buildings generated using aerial photos (e.g., high-resolution aerial photography from multiple perspectives/views, etc.), parcel information (e.g., latitude/longitude, centroid, geo-referenced parcel polygon, etc.), and/or LIDAR data (e.g., aerial and/or terrestrial LIDAR data). For example, the solar energy system design computing system (or another third-party device) may compile, compare, assess, and otherwise process aerial and/or terrestrial LIDAR and/or utilize photogrammetry operations with aerial photos in order to generate a 3D model of a house's roof represented in the real-world data of the predefined data.

The real-world data of the predefined data may further include other measurable information relevant to solar energy systems for buildings. In particular, the real-world data of the predefined data may include data from various sources, such as social networks (e.g., LinkedIn®, Facebook®, Google+®, etc.), municipal databases (e.g., department of motor vehicles (DMV) records, state/local property assessment records, court records, etc.), GIS databases, etc. For example, the solar energy system design computing system may perform web-crawling routines or transmit request messages to remote servers to obtain real-world data of the predefined data that indicates the salary or income-level of a household associated with a particular address. As another example, the real-world data of the predefined data may include data indicating the number of houses within an area with installed solar energy systems, the average education level of the area, the number of hybrid cars within the area, the number of subscriptions to environmental periodicals in the area, etc. In some embodiments, the real-world data may also include preferences, shopping behaviors, and other information related to the consuming habits, opinions, and tastes of individuals associated with properties. This other measurable data may be used by the solar energy system design computing system to determine whether a certain address (or building/house) may relate to a higher or lower priority prospective customer. For example, when the designing solar energy systems, the solar energy system design computing system may identify a cheaper or more expensive solar energy system dependent upon the real-world data of the predefined data that indicates the level of annual income associated with the address of a particular lead/inquiry/prospective customer.

In some embodiments, the real-world data may also include equipment information related to solar energy systems. For example, the real-world data may include specification information (e.g., weights, dimensions, pricing, etc.) for brackets, solar panels, construction materials, and other components that may be used when installing and/or maintaining solar energy systems. The real-world data may include information for different types of brands, place of manufacture, styles, and/or configurations for such equipment as well, such as including prices for solar panel units built by Manufacturer A and prices built by Manufacturer B. In some embodiments, the real-world data may also include labor costs, such as hourly rates for tradesmen relevant to installing or maintaining solar energy systems. In various embodiments, equipment and/or labor information may be dependent upon region, season, or other temporal conditions, and thus the real-world data may include different prices and characteristics for such different conditions.

As described above, in various embodiments, for each property in an area, the real-world data of the predefined data may define or include various parameters for using in solar energy system design calculations. In particular, the real-world data of the predefined data may include buildable area data (or applicable installation area) corresponding to particular properties. Such buildable area data may include polygons (or other 3D geometric information) defining buildable areas with non-buildable areas removed from the polygon area (e.g., a vent on which no solar panels may be installed may appear as a hole in a buildable area polygon of a roof). Such polygons may represent a standard top-down mapping projection and may be associated with a known pitch and azimuth in order to calculate real-world dimensions like height and length, due to foreshortening effect of pitch (i.e., steep surfaces may appear skinnier). The buildable area data may not include polygons and/or surface information for surfaces that may not be considered useable for solar energy systems. For example, a section of roof may not be represented in the buildable area data when smaller than a threshold value (e.g., a few square inches, feet, etc.). In some embodiments, the buildable area data may only include polygons or other surface information that may be used to design solar energy systems that comply with safety/fire codes or other building codes. For example, the buildable area data may not include polygons representing sections of a roof that may not be used for solar energy systems per a local ordinance. Additionally, the buildable area data may include measurements and/or calculated information for individual roof sections/planar surfaces, including pitch, azimuth, and shading texture (available as both annual and monthly values). In some embodiments, the buildable area data may include shading information that is measured as a percentage of sun hours which are non-shaded and that may be equivalent to a PVWatts shading parameter. In another an embodiment, shading information may include regular samples of shade or no-shade conditions over a period (e.g., the day, year, etc.). For example, each pixel in a texture may store data for whether shading is in effect at each hour of the day on one day per month. Further, buildable area data may include a plurality of different sections, installation sites, polygons, or other areas for any individual address/property, all of which may be indexed with a unique value. The buildable area data may also include information related to equipment requirements for solar energy systems relative to the buildable area for a property. In particular, the buildable area data may include requirements for tilt racks or ground mounts that may be derived directly from pitch data. For example, the buildable area data may indicate a condition for a particular roof section of within a property that requires a tilt rack or ground mount due to the section's pitch being lower than a threshold value (i.e., the section's pitch may be less than a predefined number of degrees and thus may be assumed to be flat). In some embodiments, the solar energy system design computing system may also be configured to generate elevation data and/or point-cloud data or digital surface models (DSMs) or DSM maps from buildable area data (e.g., imagery) or other information within the real-world data.

Techniques for calculating/generating buildable area data, such as pitch, azimuth, shading information, and 3D models/polygons for roofs, are described at least in U.S. Provisional Patent Application 60/977,592 (filed Oct. 4, 2007), U.S. Provisional Patent Application 61/025,431 (filed Feb. 1, 2008), U.S. Provisional Patent Application 61/047,086 (filed Apr. 22, 2008), U.S. Pat. No. 8,417,061 (issued on Apr. 9, 2013), and U.S. Non-Provisional patent application Ser. No. 12/681,375 (filed Apr. 13, 2011), the contents of all of which are incorporated herein.

The real-world data of the predefined data may also include location data corresponding to particular properties. In particular, for each property, the location data may include the latitude/longitude of the property address (and/or the address of a latitude/longitude), property boundary information (e.g., property lines, polygons, shapes of a lot, etc.), and applicability of location-specific adders. A location-specific adder may be an extra cost or price surcharge that is applied based on the installation location. For example, some cities (e.g., City of San Francisco, Fremont, etc.) may have higher permit fees for installing solar energy systems that may typically be passed on to the customer. As another example, other areas or cities may have higher labor costs that may typically affect the price charged to the customer. A location-specific adder may also be negative (e.g., there may be a discount in certain locations based on aggressive competition in an area). The location data may further include requirements, conditions, and other factors that are based on the area in which the property is located. For example, the location data may include information describing applicable rebate program(s) and restrictions (e.g., max kW for rebate calculations, etc.), applicable regulatory requirements and/or costs (e.g., permit fees for solar energy system installations, etc.), bird netting requirements for the town/city/state/region/country where a particular building is located. The location data may also include information indicating the distance from a property to certain conditions, events, buildings, phenomenon, resources, and other things that may have an effect on solar energy systems. For example, the location data may include the distance from the property to the nearest golf course, as the distance may be used in predicted cost calculations due to expected damage from errant golf balls. As another example, the location data may include the distance from the property to the nearest salt-water body, as the distance may be used to calculate corrosion rates that may affect costs of solar energy systems.

The real-world data of the predefined data may also include structural data corresponding to particular properties. In particular, the structural data corresponding to a property may include information indicating the property's roof type (or roof type information) that may be used to calculate additional costs for installation/maintenance related to solar energy systems. The roof type may indicate the composition of a roof, such as whether a property's roof is covered with asphalt shingles, ceramic tiles, tin, copper, etc. In some embodiments, the roof type information within the structural data may indicate a likelihood or probability (e.g., a percentage likelihood) that a particular property may have a certain roof type based on the area (e.g., town, state, zip code, etc.). For example, when the exact roof type of a particular property is not known, the solar energy system design computing system may determine a likely roof type based on the average type of roof on the same street, neighborhood, town, etc. Alternatively, the roof type information may indicate the various likelihood values that a property may have different types of roof types (e.g., the roof type information may include a first percentage value for the likelihood that a house has a ceramic roof and a second percentage value for the likelihood that the house has a tin roof). In an optional embodiment, the roof type information may indicate a level of confidence that a property has various types of roof type, enabling the solar energy system design computing system to sort by the most likely roof type. Roof type information may be based on data sourced either through ad-hoc research, a third-party database (e.g., a roofing contractor database), etc. In some embodiments, the solar energy system design computing system may generate the roof type information for properties based on image recognition, such as by performing recognition routines that process aerial imagery to identify roof types based on colors, textures, and/or other features represented in the imagery. In some embodiments, the solar energy system design computing system may utilize various data sources and/or recognition routines to identify a likely roof type for a property.

The structural data of the real-world data of the predefined data may also include information indicating the construction type of a property, such as whether the property is a warehouse, a single family detached (i.e., free-standing), a townhouse, a block unit, a cabin, etc. In some embodiments, the construction type information may be used by the solar energy system design computing system to identify how suitable a property may be for various solar energy systems and/or any structural enhancements or additions (e.g., mounting products/fixtures, wiring, etc.) that may be required for installing such solar energy systems. The construction type information may also indicate the number of stories for a property (e.g., a two-story house, etc.). In various embodiments, the construction type information may be useful to the solar energy system design computing system when calculating access difficulty for installation and maintenance purposes (e.g., cost of repair/installation may increase when a property is not a free-standing house, when there are multiple stories, and/or when the property is a unit that has limited/blocked access). In some embodiments, the construction type information may further include indications of other relevant characteristics and requirements of the property regarding potential solar energy systems and their associated installation/maintenance costs, such as whether the property may need an additional power (e.g., AC/DC) disconnect, an additional meter, a sub panel, a grounding rod, trenching, etc.

In some embodiments, the real-world data of the predefined data may include reliability information that indicates the accuracy, freshness, confidence level, and/or viability of any of the information within the predefined data. In particular, each variable, record, assessment, value, image, and/or conclusion represented within the predefined data may be associated with a bit, flag, tag, or other metadata that indicates whether that information is confirmed or still accurate. For example, an image of a house roof top stored within the predefined data (i.e., a data table within the predefined database) may be associated with a value that estimates the accuracy of the image due to recent construction or tree growth.

The real-world data of the predefined data may also include electricity usage data corresponding to particular properties. In particular, the electricity usage data corresponding to a property may include information indicating electricity consumption that may be used by the solar energy system design computing system to estimate potential bill savings for the property. Other factors associated with the electricity consumption information of a property that may be stored within the predefined data and assessed by the solar energy system design computing system may include square footage of the property, the number of stories/levels in the property, neighborhood average electricity usage (e.g., weekly, monthly, annually, etc.), presence of power-hungry assets (e.g., a heated pool, electric vehicle, large appliances, etc.), presence of existing solar energy system (e.g., photovoltaic (PV) or solar thermal), average temperatures within the property, average ambient temperatures, and monthly power consumption averages (per square foot) within the same/similar area as the property. The electricity usage data may also include information describing relevant utility rates and/or tariff rates for various customer types and baseline territories. For example, the electricity usage data may include utility company identifiers based on the zip code of the property, the region (e.g., whole state utility), or based on the most likely utility when a plurality of utilities may service a particular area/zip code. In some embodiments, the electricity usage data for a building may be primarily calculated by the solar energy system design computing system using square footage information for the building (including multiple stories within the building) and information indicating the average monthly usage per square foot values for an applicable region (e.g., town, city, state, etc.).

In some embodiments, the solar energy system design computing system may generate the electricity usage data by performing operations that utilize a statistical model. Such a statistical model may be used to determined electricity usage using regression/factor analysis and may include refinement regarding significant factors (or variables) with appropriate weightings, such as weightings based on region. The solar energy system design computing system may apply the statistical model via operations that utilize the various predefined data, including datasets of customer electricity usage (e.g., from proprietary databases, tables, or other data sources with customer information that are accessible by the solar energy system design computing system) as well as datasets for all potential factors (e.g., building square footage for individual buildings, etc.). In some embodiments, the solar energy system design computing system may use building floor area data that is extracted from LiDAR and/or parcel data, as well as historical electricity usage information (e.g., information describing electricity fees/charges/bills over a 12-month period that is supplied by customers via website inquiry, etc.).

As a non-limiting illustration of a solar energy system design computing system using an embodiment statistical model to identify electricity usage data: the solar energy system design computing system may perform a primary analysis using a multivariate linear regression model for estimating annual electricity usage for a certain property (e.g., a residential building, house, commercial building, etc.). Using the model, the solar energy system design computing system may calculate or otherwise identify annual electricity usage information associated with the property (i.e., a dependent variable of the modeling). During the creation of such a model, the solar energy system design computing system may assess the significance of various independent variables (or factors) including a building floor area (square meters) value (e.g., a value that may account for multiple stories within the property, and thus may be more valuable in the model than a building footprint area), a value that indicates whether the property is associated with a pool that employs electric heating (e.g., a Boolean variable with a 'yes' or 'no' value), a value representing an average minimum winter temperature at the location of the property (i.e., a proxy value for electric heating usage), a value representing an average maximum summer temperature at the location of the property (i.e., a proxy value for electric air conditioning usage), a value indicating whether the property is associated with an electric vehicle that is recharged at the property (e.g., a Boolean variable), a value representing the age of the property (e.g., build date/year of construction of a house, date of renovations, etc.), information indicating whether any work or building permits have been associated with the property for a period (e.g., construction permits with a municipality over the last ten (10) years, etc.). The solar energy system design computing system may also utilize the model to perform to determine electricity usage information that is segmented by region (e.g., town, state, zip code, etc.). In particular, the solar energy system design computing system may perform the analysis separately for individual towns, such as by calculating the combined electricity usage information for all properties within each town. Further, the solar energy system design computing system may also create a secondary model for estimating monthly fluctuations over the year, wherein the secondary model may utilize twelve (12) monthly coefficients for distributing usage over months, based on known annual kWh usage, and the solar energy system design computing system may calculate simple average monthly coefficients that may or may not be segmented by region (e.g., town).

In some embodiments, the predefined data may include a database or data source that includes buildable solar energy system configurations. The buildable solar energy system configurations may be solar energy system design constraint sets (e.g., templates) (or system templates) that are fixed combinations of specific modules and inverters. Such buildable solar energy system configurations may be static information that may be used to generate solar energy system designs for various properties; however, not all configurations may be applicable to particular properties. For example, certain configurations may include components that require more structural elements (e.g., square footage, weight supports, etc.) than a particular house may have. The buildable solar energy system configurations in the predefined data may be updated or adjusted over time based on data from customer feedback and other information received in response to presenting solar energy system quotations for customers. For example, a certain buildable solar energy system configuration may be adjusted, deleted, or invalidated after the solar energy system design computing system determines that it is not viable for a certain number of customers over a period of time. In some embodiments, the buildable solar energy system configurations may be transmitted to remote devices (e.g., tablet mobile devices, etc.) for local caching to avoid undue network transfers.

As described above, potential data of the predefined data may include information generated by the solar energy system design computing system using the real-world data of the predefined data. In particular, the potential data of the predefined data may include various solar energy system designs for the properties (or addresses) related to or indicated within the real-world data of the predefined data. The solar energy system design computing system may design solar energy systems for various customers by combining, evaluating, and assessing the various real-world data within the predefined data related to customers and/or their property (e.g., provided addresses). The solar energy system design computing system may utilize various equations, rule sets, weighting schemes, algorithms, and routines for processing the real-world data to generate the potential data. In some embodiments, the solar energy system design computing system may update potential data (e.g., calculated solar energy system designs, energy savings projections for each design, money savings projections, etc.) as additional data becomes available (e.g., subsequent quotation requests with preferences from a similar or the same customer, etc.).

In some embodiments, the solar energy system design computing system may perform operations for estimating various parameters pertaining to a particular customer, their property, and their preferences to maximize the accuracy and relevance of solar energy system designs and calculations for output, installation cost, financials etc. In other words, the solar energy system design computing system may design solar energy systems using the real-world predefined data, even when typical, expected, or likely inputs from prospective customers are missing. For example, in response to only receiving an address input from a prospective customer, the solar energy system design computing system may use information within the predefined data to estimate parameters for calculating solar energy system designs relevant to the known conditions associated with that customer (e.g., income level, neighborhood trends, purchasing habits, etc.). As another example, the solar energy system design computing system may access average utility costs for houses on a certain street or of a certain square footage/structure-type when receiving a quotation request only including an address input. Thus, the solar energy system design computing system may use the real-world data for generating potential data and designing solar energy systems using minimal input from prospective customers. In some embodiments, the solar energy system design computing system may include a "customer parameters estimator" module to determine (or guess) variables, thresholds, and parameters to use when generating potential data.

Based on the real-world data of the predefined data, the solar energy system design computing system may calculate potential data and design many different solar energy systems for any particular property (or address) known to the solar energy system design computing system. For example, the solar energy system design computing system may generate a solar energy system design for a certain house for each type of component manufacturer, various different pricing specifications, savings goals, solar energy system design constraint sets (e.g., templates), and other variables. In various embodiments, the solar energy system design computing device may generate solar energy system designs in advance so that when in receipt of an inquiry from a customer associated with a property known (or represented within) the real-world data, the solar energy system design computing system may instantly retrieve solar energy system designs that account for various conditions and parameters relevant to the property (and its owner). In other embodiments, the solar energy system design computing device may generate the solar energy system designs on-the-fly, such as in response to receiving user input data, such as customer selections of filtering parameters (e.g., power savings is more important than money savings, etc.) or in response to receiving new real-world data for a previously unknown property (e.g., a customer inquiry may include new utility bill information, etc.).

Figure 4A:
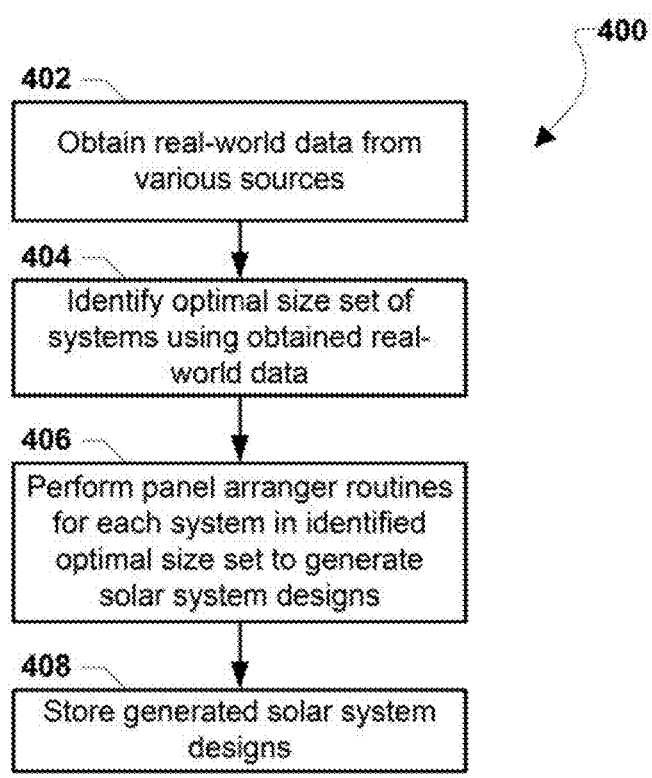
FIG. 4A is a process flow diagram of an embodiment method for a solar energy system design computing system to generate solar energy system designs and data for distribution to potential customers.

FIG. 4A illustrates an embodiment method 400 for the solar energy system design computing system to generate solar energy system designs and data for distribution to potential customers. In block 402, a processor of the solar energy system design computing system may obtain real-world data from various sources. This may be done periodically, such as once an hour, day, week, etc. For example, the solar energy system design computing system may contact GIS systems for location and spatial information every day for updated information. In block 404, the processor of the solar energy system design computing system may identify an optimal size set of systems (or system designs) using obtained real-world data. As described below, optimal size designs may indicate the best size system for any particular property (e.g., the best fitting number of units, power output, etc.). In various embodiments, the optimal size designs may be solar energy system design constraint sets (e.g., templates, buildable area configurations, etc.) predefined and stored within the solar energy system design computing system.

To generate potential data (and solar energy system designs) that are more feasible for particular customers and/or properties, in various embodiments, the solar energy system design computing system may be configured to perform routines, instructions, or software for determining an optimal size (or range of sizes) for solar energy system designs for the properties. The processor of the solar energy system design computing system may execute routines, software, or instructions to perform an algorithm that determines the optimal system size (e.g., number of solar panels, square footage of the solar energy system, number of discrete sections of the solar energy system, type/brand of components in the solar energy system, etc.) in order to deliver the best financial outcome for the customer. Such an optimal size algorithm (or calculator) may utilize various information within the real-world data of the predefined data to determine a subset of the predefined buildable solar energy system configurations (or solar energy system design constraint sets (e.g., templates)) that are most appropriate for a particular address/property/customer. In other words, the solar energy system design computing system may utilize the optimal size algorithm to reduce the range of solar energy system design constraint sets (e.g., templates) to be simulated and subsequently stored as potential data within the predefined data. In some embodiments, the solar energy system design computing system may also perform the optimal size calculations to rank and select optimal designed systems for presentation to the customer. In various embodiments, the solar energy system design computing system may store any identified solar energy system design constraint sets (e.g., templates, buildable system configurations, etc.) in association with properties, such as within database records for particular houses. For example, in response to perform optimal size operations for a customer's house, the solar energy system design computing system may store codes, identifiers, or descriptive information for the identified solar energy system design constraint sets (e.g., templates) in data fields within the database record of the house/customer.

In some embodiments, the solar energy system design computing system may utilize other considerations when identifying optimal size solar energy system design constraint sets (e.g., templates). In particular, the solar energy system design computing system may utilize threshold values that regard pricing disparities in order to avoid identifying solar energy system design constraint sets (e.g., templates) that may not be feasible in comparison to other similar solar energy system design constraint sets (e.g., templates). The solar energy system design computing system may utilize "hybrid" conditions (or objectives) for comparing solar energy system design constraint sets (e.g., templates) that may be applicable to a particular property or customer, such as evaluating power consumption as well as price for solar energy system design constraint sets (e.g., templates) that may be applicable to the property. Such hybrid conditions may ensure that optimal size systems are identified when their overall value is better than other solar energy system design constraint sets (e.g., templates) (i.e., an optimal solar energy system design constraint set may be identified when it may produce slightly less power, but may have a significantly cheaper cost to install and/or maintain).

In some embodiments, the solar energy system design computing system may use a rule or equation that indicates that for a first solar energy system design constraint set (e.g., a first template) that has X % (e.g., 1%) lower kWh power production than a second first solar energy system design constraint set (e.g., a second template), the solar energy system design computing system may identify the first solar energy system design constraint set as optimal (or better) than the second solar energy system design constraint set when the first solar energy system design constraint set costs Y % (e.g., 10%) less than the second solar energy system design constraint set. For example, a first solar energy system design constraint set that can produce 99% of the electricity needed for a property and that costs $50 may be identified as an optimal solar energy system design constraint set over a second solar energy system design constraint set that can produce 100% of the electricity needed for the property but that costs $100. The solar energy system design computing system may first identify a solar energy system design constraint set that produces less than 100% of the required annual power for a certain property, and then identify whether another solar energy system design constraint set exists that has a similar power production with a cheaper price such that the cost-benefit calculation favors the another solar energy system design constraint set.

As an non-limiting illustration: when a first solar energy system design constraint set (e.g., a first system template) is available with a max power consumption of 99% and a cost of $1,000,000, and a second solar energy system design constraint set (e.g., a second system template) is available with a max power consumption of 98% and a cost of $10,000, the solar energy system design computing system may determine that the first solar energy system design constraint set may not be feasible (or sensible) because of the significant cost per additional consumption improvement (i.e., the extra 1% consumption over the second solar energy system design constraint set).

In various embodiments, the solar energy system design computing system may use certain objectives variables, such as defined within customer preference information within the predefined data or received via an interactive process, to identify a relevant set of solar energy system design constraint sets (e.g., system templates) for a certain residence using optimal size calculations. This identified set of solar energy system design constraint sets (e.g., system templates) may be used by the solar energy system design computing system to perform simulations and generate potential solar energy system designs for the customer, such as in response to receiving an inquiry (or lead) from that customer. The solar energy system design computing system may utilize objectives variables to evaluate and select solar energy system design constraint sets (e.g., templates) that may reflect a customer's own value system. Typically, such objectives variables may relate to max power consumption (i.e., maximizing the amount of a customer's electricity usage that is met with electricity generated by a solar energy system, capped at 100% of usage), and max savings (i.e., maximizing the customer's net monthly savings, calculated as monthly electricity savings minus lease payments). In other embodiments, the objective variables may also include other customer goals, such as payment method (e.g., lease, upfront, prepay, etc.), timeframe (e.g., year 1 savings, years 1 to 10 savings, years 1 to 25 savings, etc.), blended objectives (e.g., a certain percentage, such as 75%, importance on max power consumption and the remainder percentage, such as 25%, importance placed on max savings, etc.), and/or custom objectives variables set by customers that may reduce the set of available solar energy system design constraint sets (e.g., templates) under consideration by the solar energy system design computing system (e.g., maximum/minimum system size kWh, only systems which are cash-flow positive from day-1, etc.). It should be noted that objectives variables may not be the same as solar energy system design constraint sets, such as not being able to place solar panels on a garage roof/on a vent, etc., which may be applied by the solar energy system design computing system when preparing potential solar energy system designs, before evaluation and selection.

Returning to FIG. 4A, in block 406, the processor of the solar energy system design computing system may perform panel arranger routines for each system in the identified optimal size set to generate solar energy system designs, such as solar energy system designs for each address known to the system. In other words, the solar energy system design computing system may arrange solar panels on roofs represented in the predefined data. Panel arranging methods are described below with reference to FIG. 7A-7B. In block 408, the solar energy system design computing system may store the generated solar energy system designs. For example, a plurality of pre-calculated solar energy system designs for a certain residence, each having different panel arrangements, power consumption values, and other characteristics, may be stored for use when the associated home owner requests a quote, or alternatively for transmission to third-parties for marketing purposes (e.g., a utility that may deliver the quote along with electricity bills, etc.). In various embodiments, the method 400 may be performed by various computing devices, such as a tablet mobile device used by a sales associate in a store and/or a server within the cloud. Further, the method 400 may be performed in advance prior to the solar energy system design computing system receiving any leads or solar energy system inquiries from prospective customers, or alternatively, the method 400 may be performed in response to receiving either lead data or inquiries from customers. For example, the solar energy system design computing system (via a tablet computing device) may generate solar energy system designs for a particular address in response to receiving the address (and other input data) from a prospective customer within a big-box store.

Figure 4B:
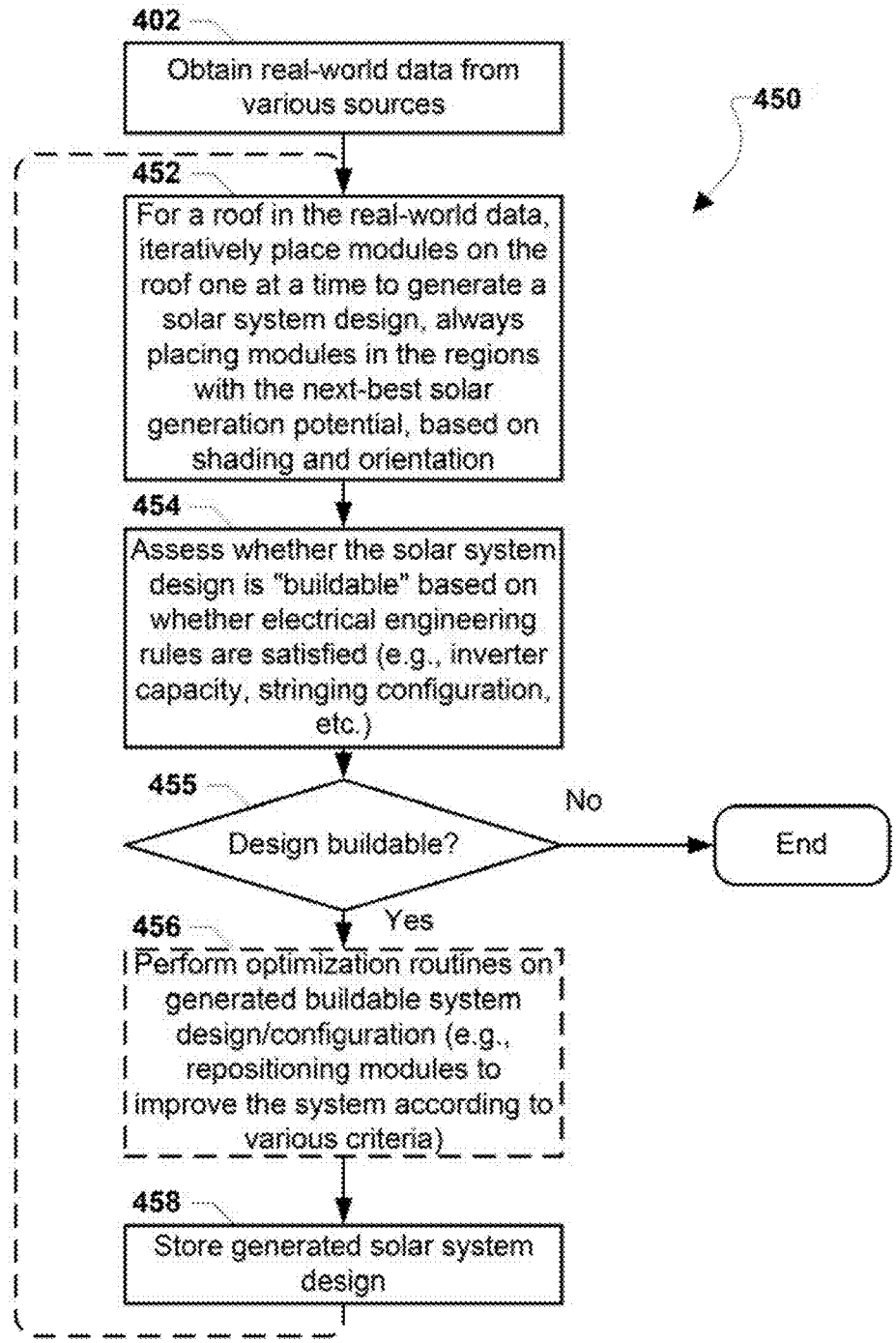
FIG. 4B is a process flow diagram of an embodiment method for a solar energy system design computing system to generate solar energy system designs without using solar energy system design constraint sets (e.g., templates).
Figure 5:
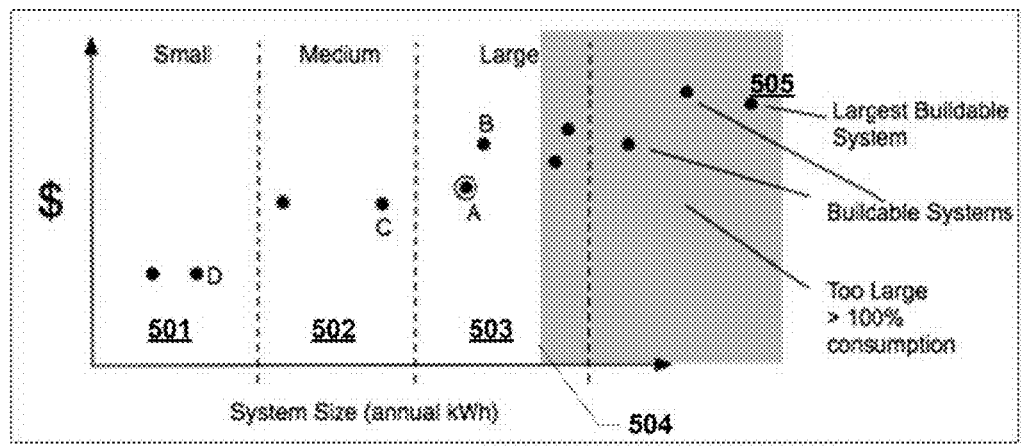
Figure 6:
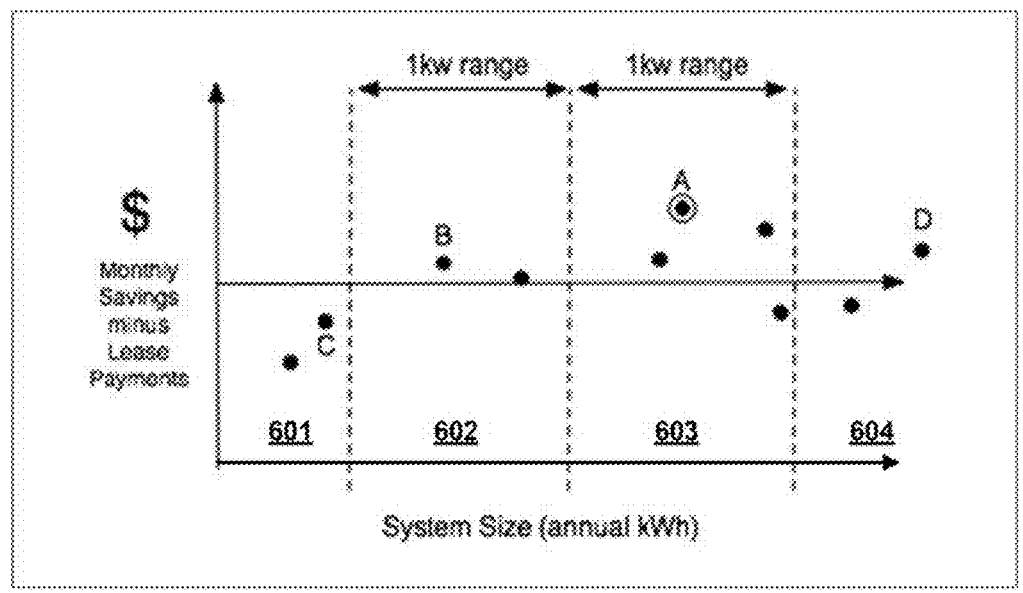

In some embodiments, the solar energy system design computing system may not utilize solar energy system templates when generating solar energy system designs. For example, the solar energy system design computing system may be configured to execute the optimal size algorithm described above with reference to the operations in block 404 of FIG. 4A to output more generalized constraints or goals, such as a system size target or range that may be used to guide subsequent system-design or system-selection steps. FIG. 4B illustrates an embodiment method 450 for the solar energy system design computing system to generate solar energy system designs without using system templates. In block 402, a processor of the solar energy system design computing system may obtain real-world data from various sources as described above. In block 452, for a roof represented in the obtained real-world data (e.g., a certain house roof represented by aerial and/or terrestrial LiDAR, elevation point data, etc.), the processor of the solar energy system design computing system may iteratively place modules on the roof one at a time to generate a solar energy system design, always placing modules in the regions with the next-best solar generation potential, based on shading and orientation. In block 454, as more modules are added, the processor of the solar energy system design computing system may assess whether the solar energy system design is "buildable" based on whether electrical engineering rules are satisfied, including inverter capacity, stringing configuration, etc. In determination block 455, the processor of the solar energy system design computing system may determine whether the solar energy system design is buildable, such as based on the assessment operations in block 454. If the solar energy system design is not determined to be buildable (i.e., determination block 455="No"), the solar energy system design computing system may end the method 450. However, if the solar energy system design is determined to be buildable (i.e., determination block 455="Yes"), in optional block 456, the processor of the solar energy system design computing system may perform optimization routines for the generated buildable system design/configuration. Such optimization operations may include repositioning modules and determining whether the repositioned modules results in improvements to various criteria, such as cost effectiveness, power output, aesthetics, installation cost, etc. . . . In block 458, the processor of the solar energy system design computing system may store (or record) the generated solar energy system design (or buildable system configuration). In some embodiments, the solar energy system design computing system may continue with the operations in block 452, such as by placing modules for other roofs represented in the obtained real-world data.

Figure 3A:
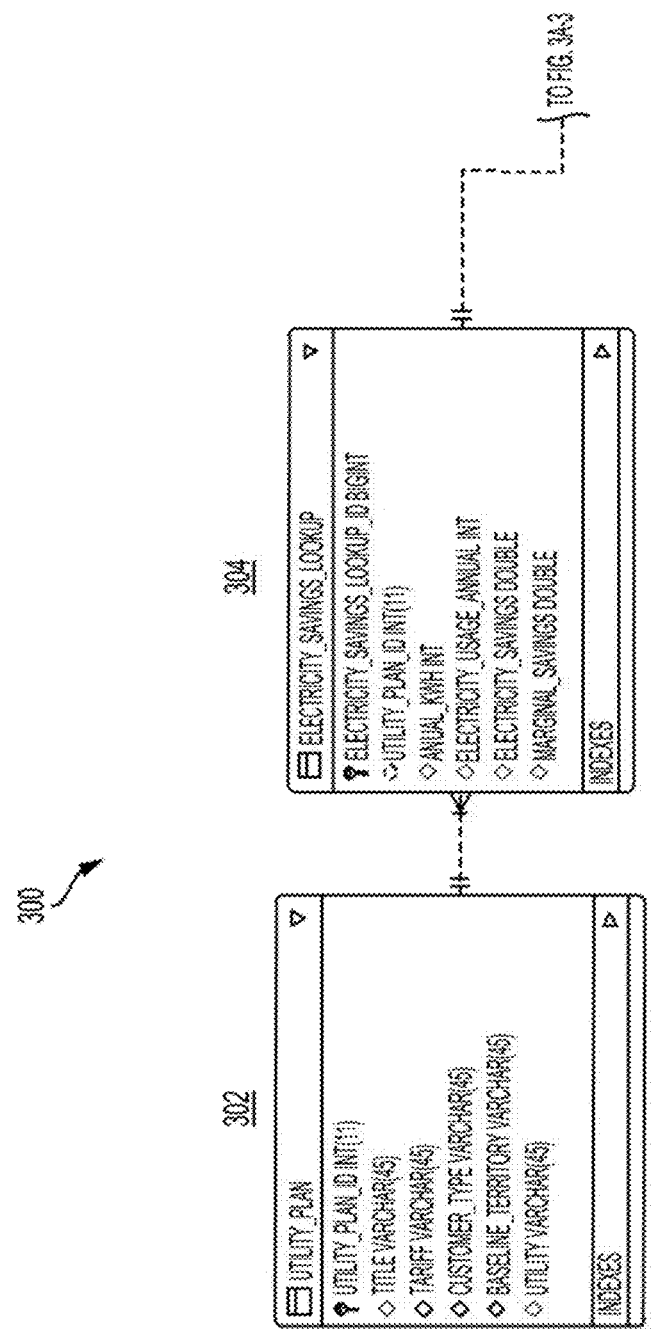
Figures 2, 3A:
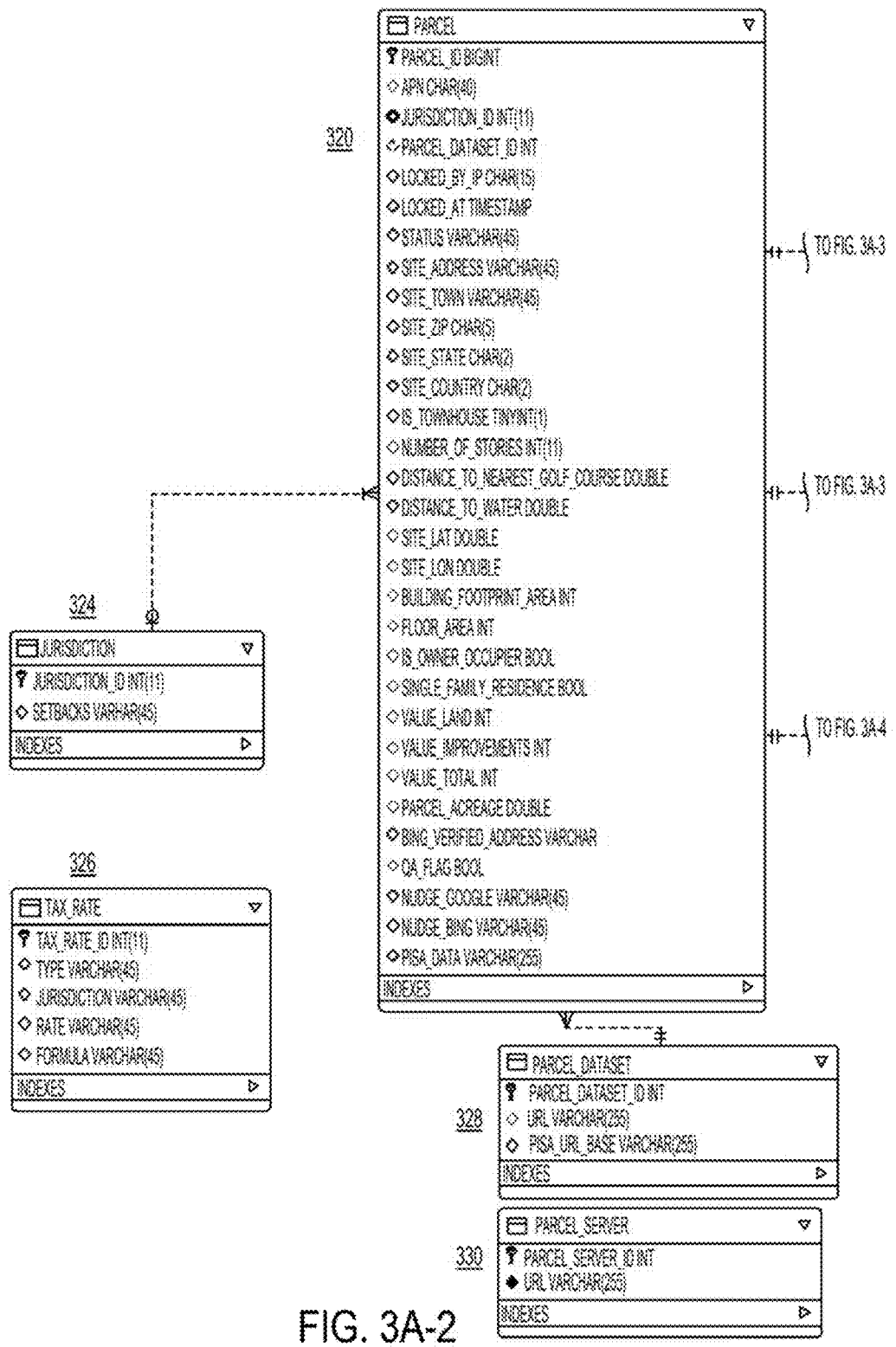
Figures 3, 3A:
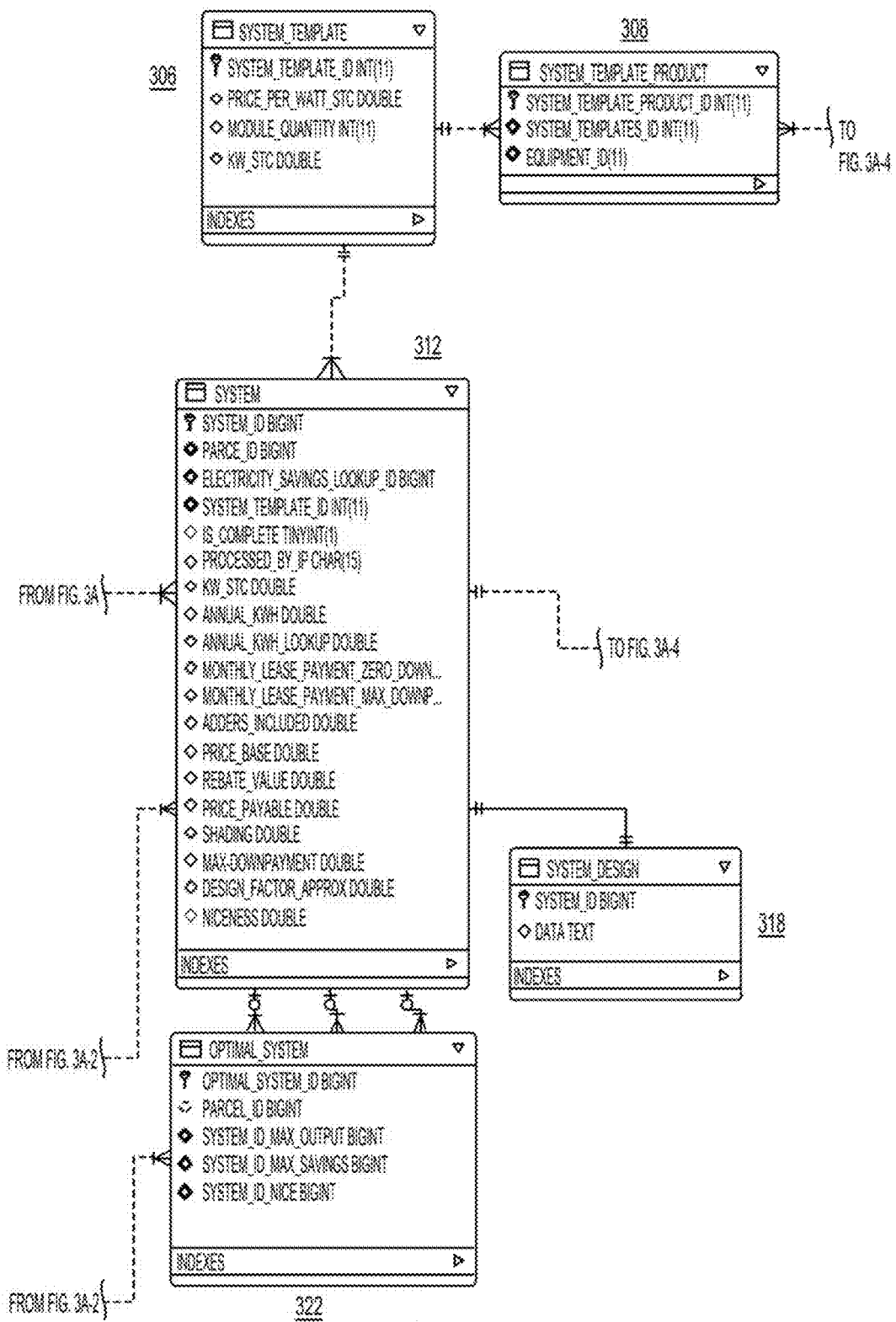
Figures 3, 3A, 4:
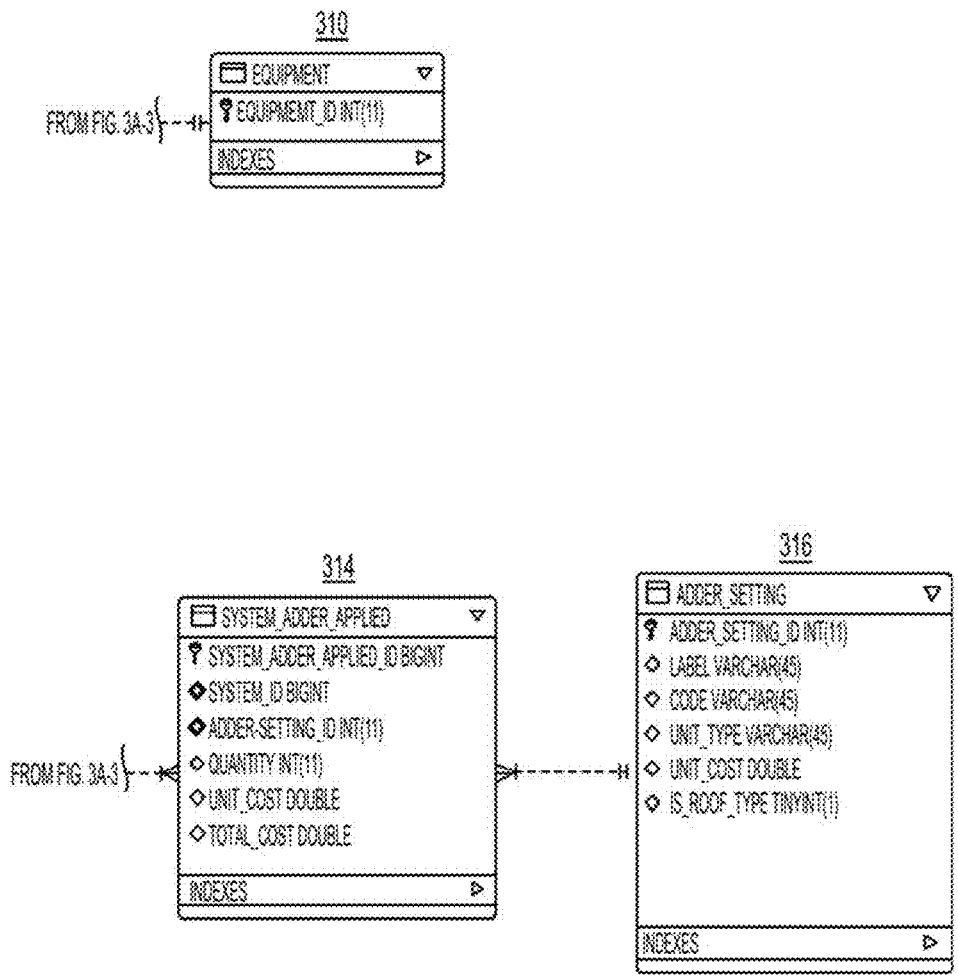
Figures 3, 3A, 4, 5:
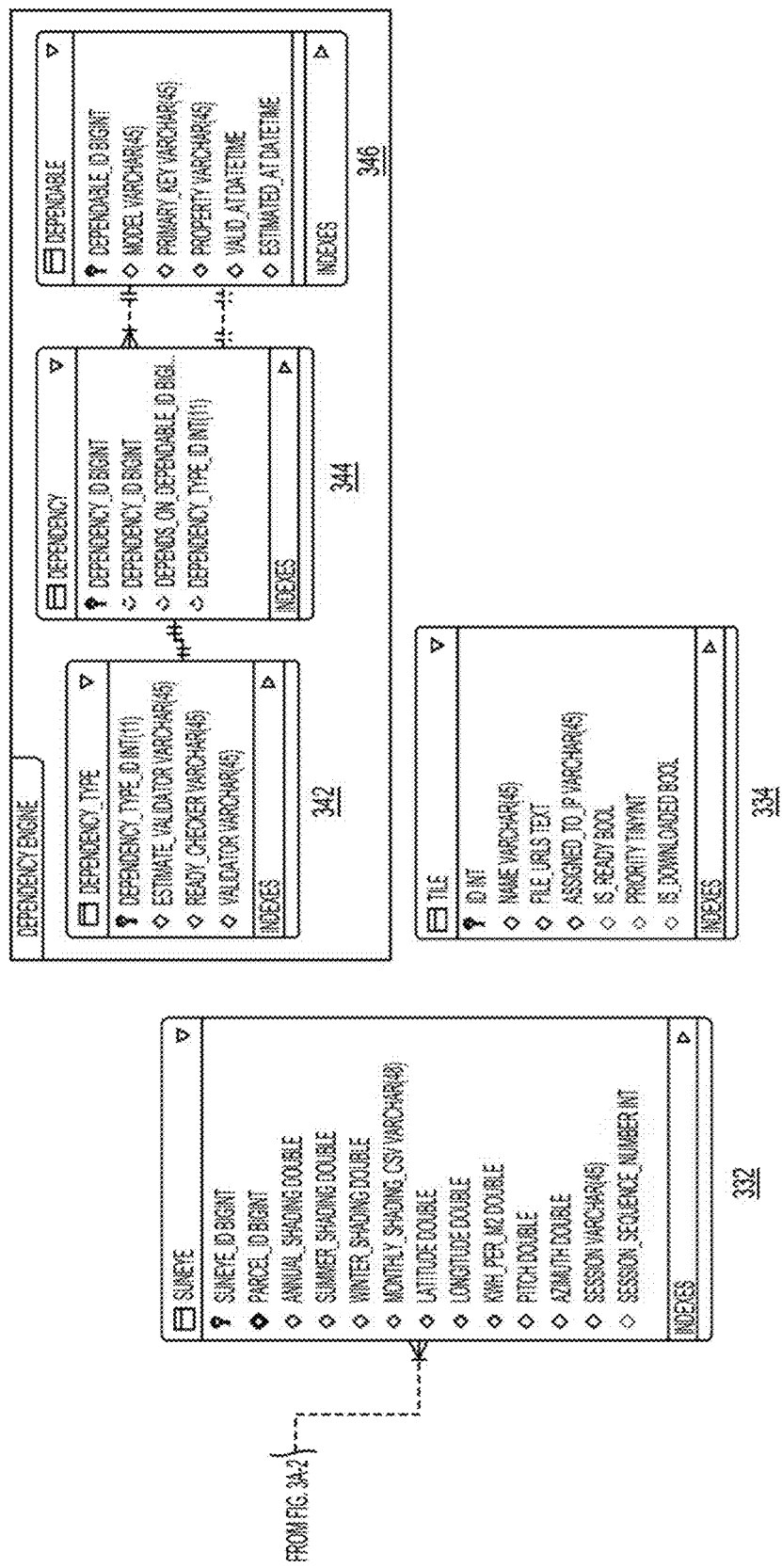
Figure 3B:
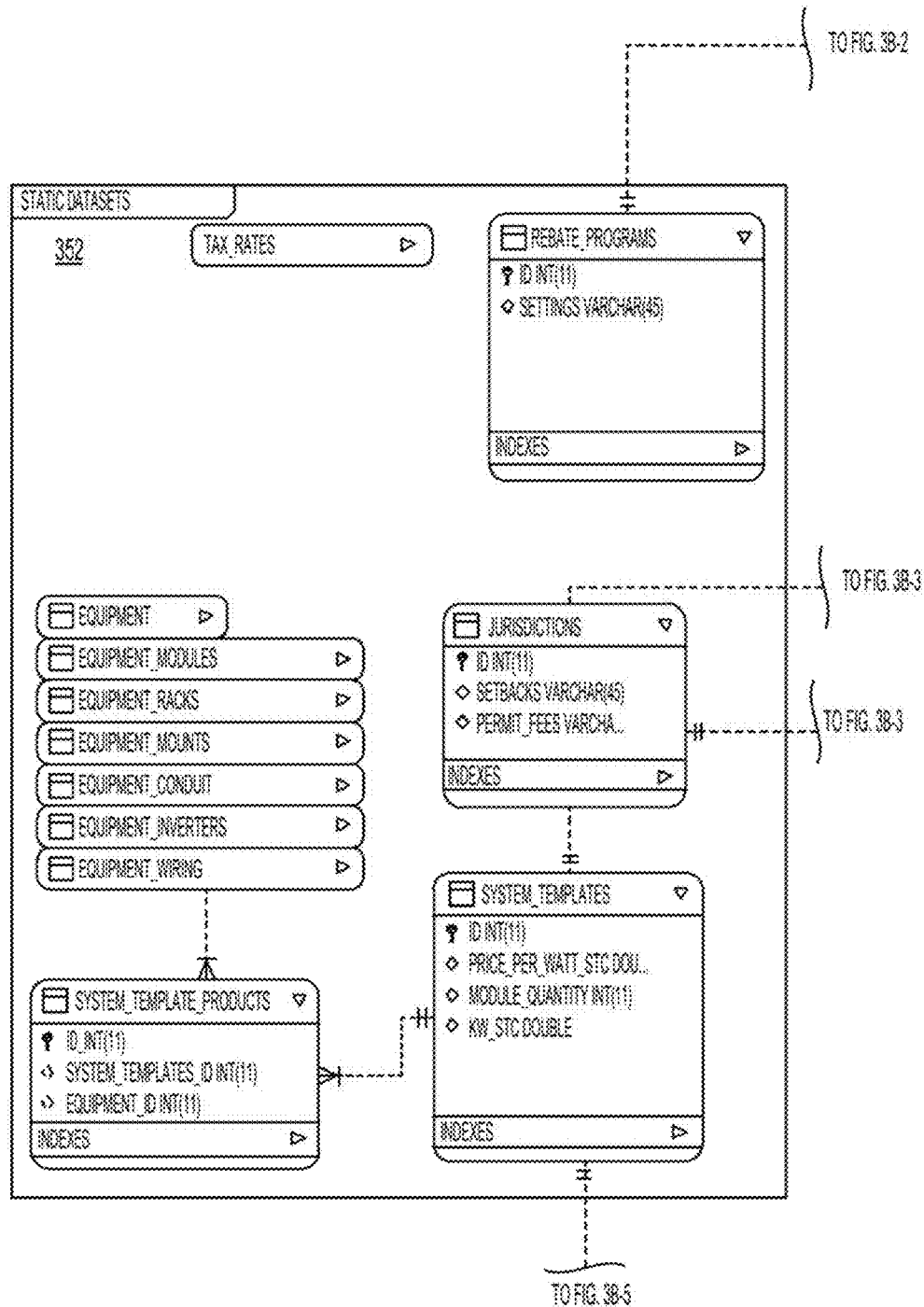
Figures 2, 3B:
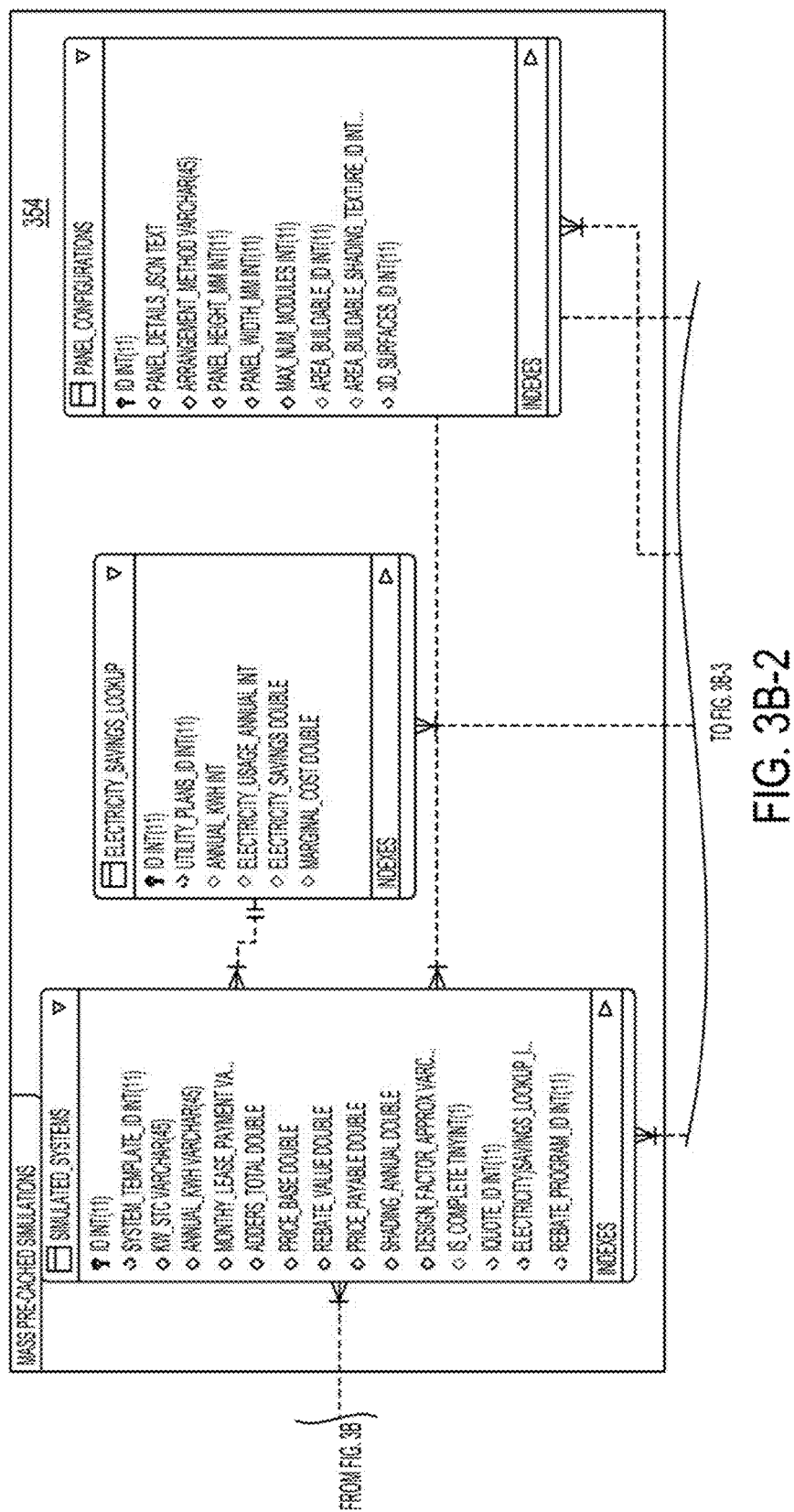
Figures 3, 3B:
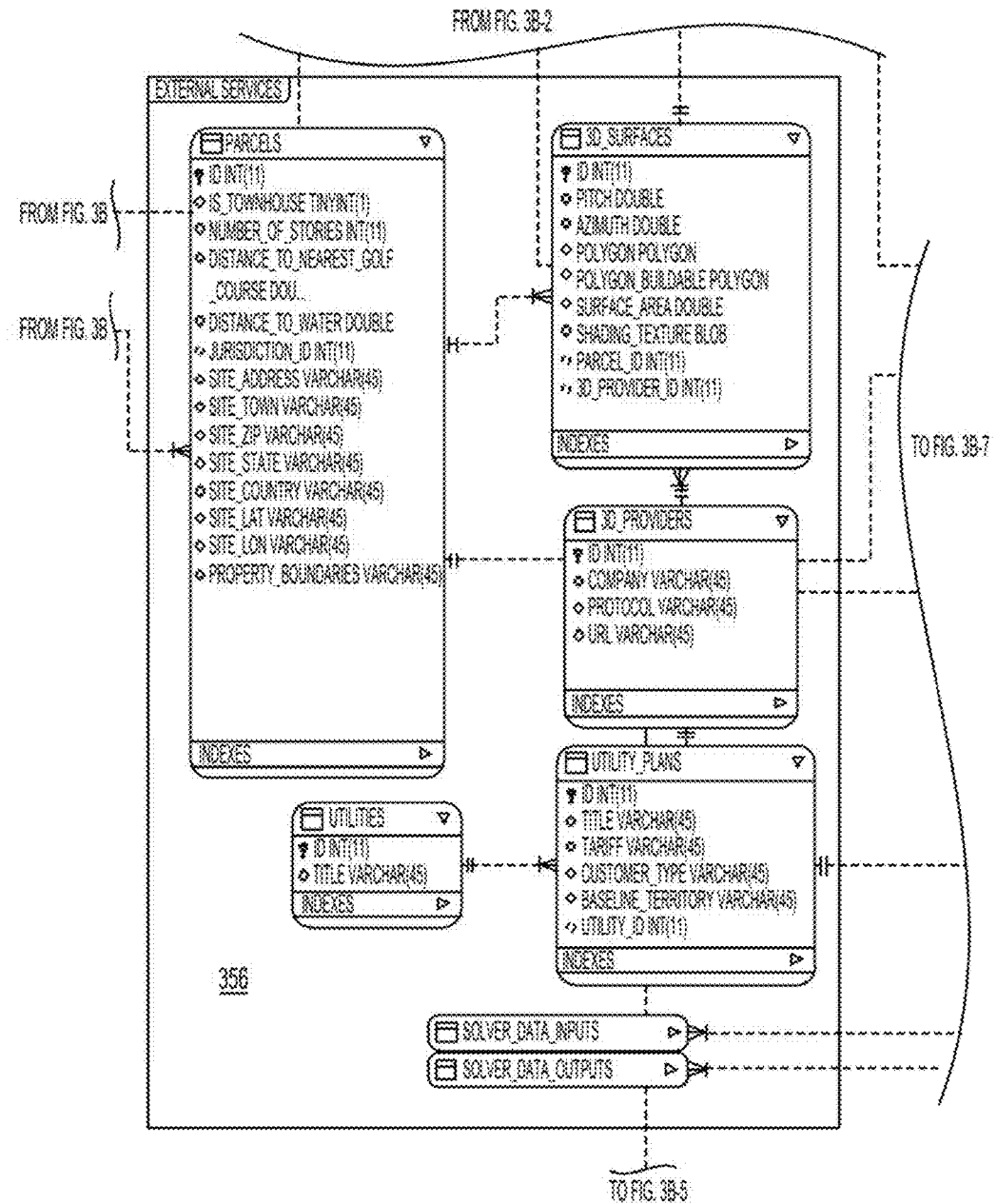
Figures 3, 3B, 4:
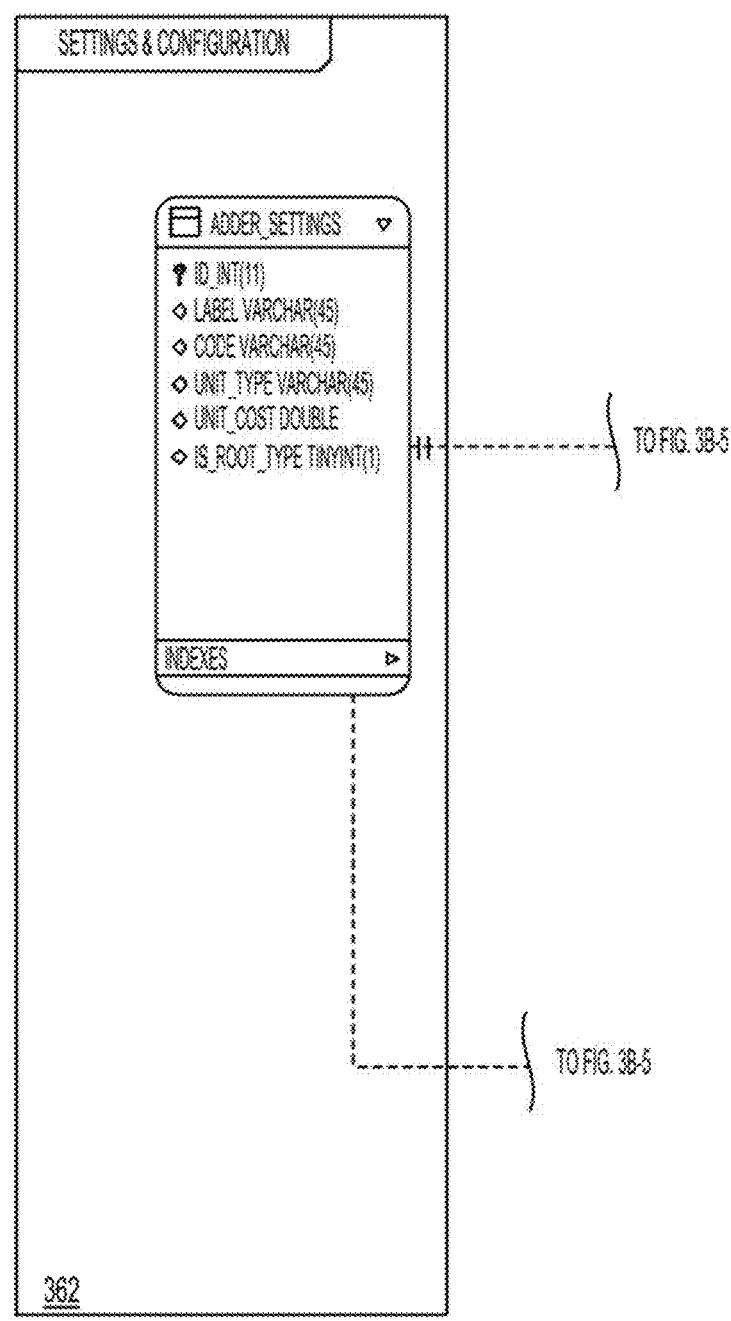
Figures 3, 3B, 4, 5:
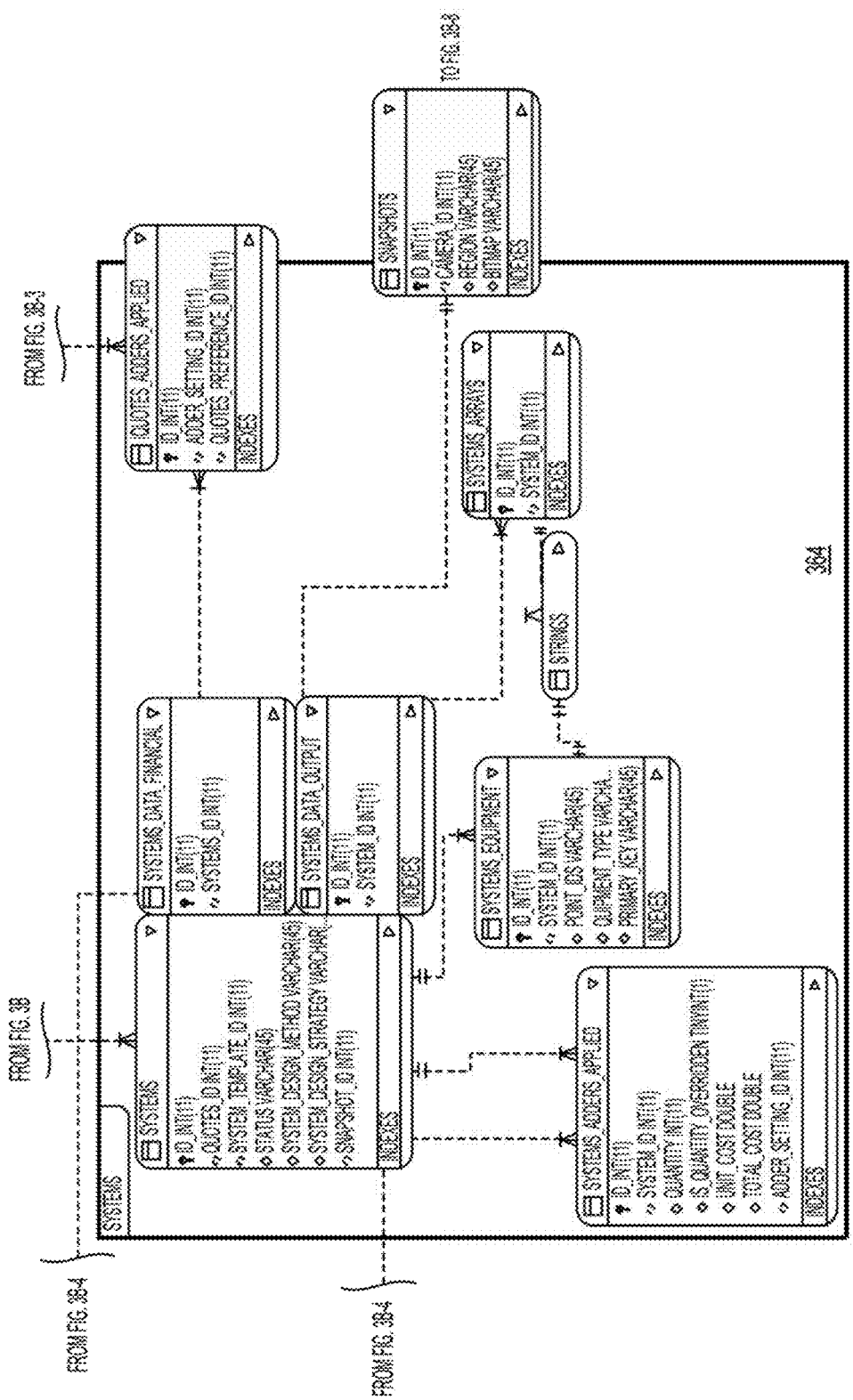

FIG. 5 is a diagram that illustrates an exemplary optimal size evaluation by the solar energy system design computing system when an objectives variable relates to max power consumption for a particular property. The solar energy system design computing system may measure the various solar energy system design constraint sets (e.g., templates, buildable system configurations, etc.) stored in the predefined data based on cost (e.g., monthly payments or upfront cost), size (e.g., annual kWh), and value (e.g., dollars per kWh). The solar energy system design computing system may measure the solar energy system design constraint sets and identify the largest buildable system (or template) that generates less than 100% of consumption (shown as system 'B' in FIG. 5). The solar energy system design computing system may determine threshold values, such as a lowest system size value 504 that corresponds with an annual produced kWh that is 100% consumption, based on real-world data associated with the particular property (e.g., a certain customer's house annually uses a certain kWh of power via traditional electricity utility). In other words, the solar energy system design computing system may not identify solar energy system design constraint sets (e.g., templates) that may have a very high size that exceeds the lowest system size value 504 (such as the system 505 in FIG.

5). In some embodiments, the solar energy system design computing system may further identify solar energy system design constraint sets (e.g., templates) that are near in system size to system 'B' that also do not exceed the lowest system size value 504 but that have a better value (or cheaper in cost) per kWh than system B' (shown as system 'A' in FIG. 5). In some embodiments, the solar energy system design computing device may identify solar energy system design constraint sets (e.g., templates) that have the best value (i.e., dollars per kWh) system from various system size ranges, such as a small range 501, a medium range 502, and a large range 503. For example, the system 'D' may be the best value in the small range 501, the system 'C' may be the best value in the medium range 502, and the system 'A' may be the best value in the large range 503.

Figures 3, 3B, 4, 5, 6:
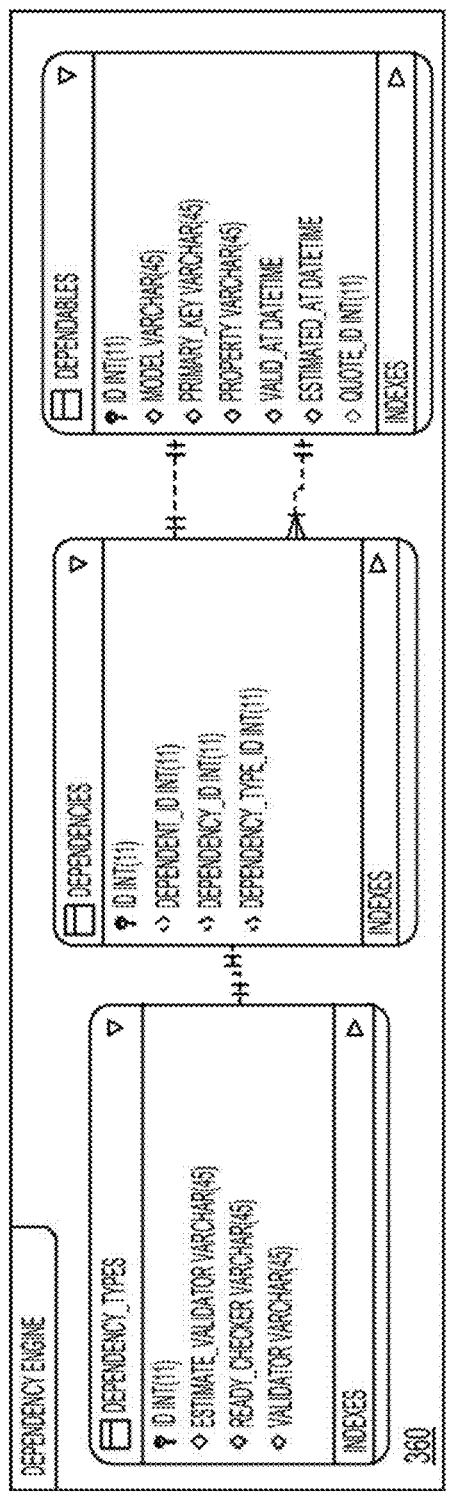
Figures 3, 3B, 4, 5, 6, 7:
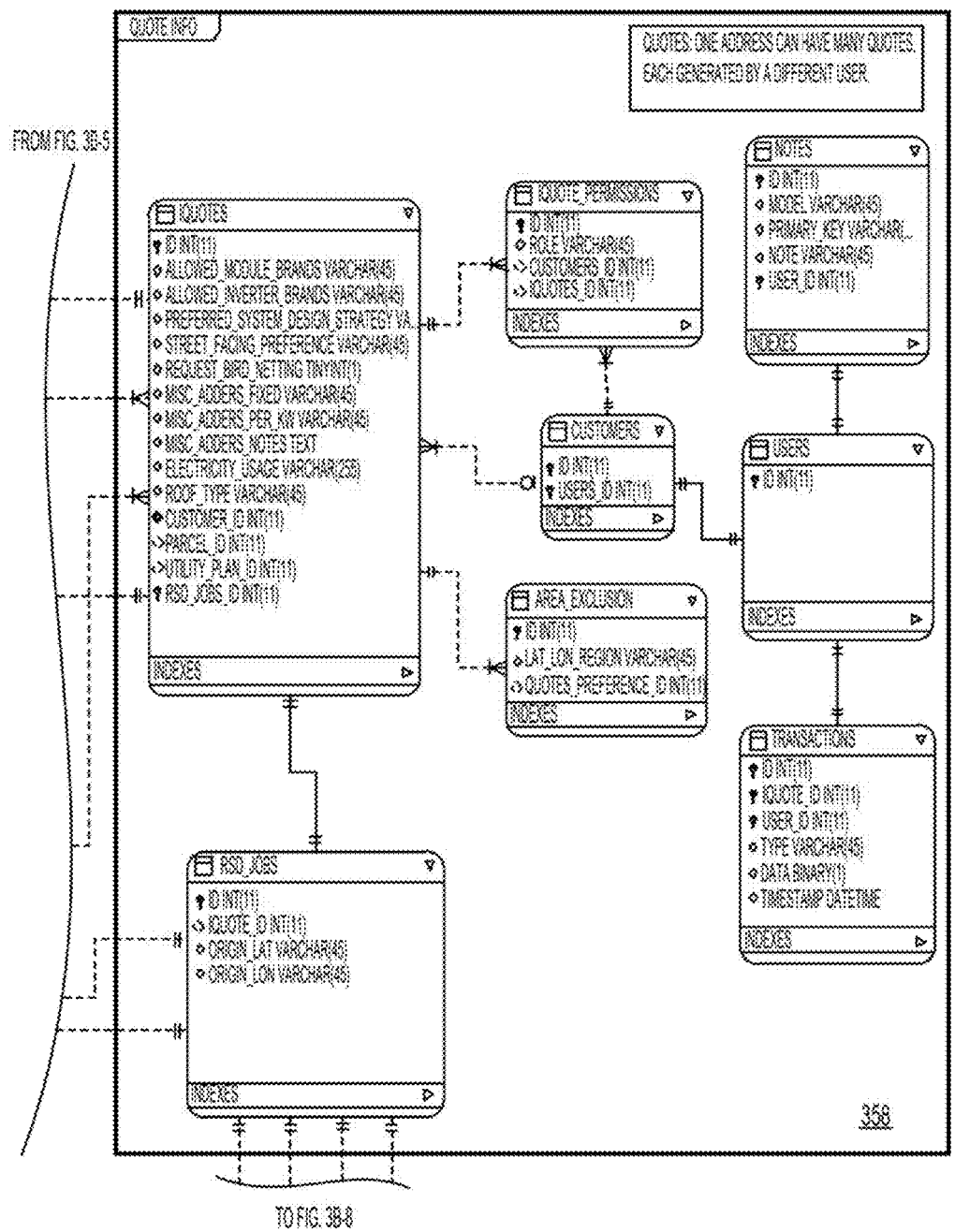

FIG. 6 is a diagram that illustrates an exemplary optimal size evaluation by the solar energy system design computing system when an objectives variable relates to max savings. The solar energy system design computing system may measure the various solar energy system design constraint sets (e.g., templates, buildable system configurations stored in the predefined data, etc.) based on monthly savings (e.g., monthly electricity savings minus lease payments) and size (e.g., kW factory standard test conditions (STC)). The solar energy system design computing system may measure the solar energy system design constraint sets (e.g., templates) and identify the buildable system configuration (or system template) with the highest monthly savings (shown as system 'A' in FIG. 6). In some embodiments, the solar energy system design computing system may identify the solar energy system design constraint sets (e.g., templates) with the highest (or best) monthly savings within certain ranges of energy output (e.g., within each 1 kWh range). For example, in addition to system 'A' in a third range 603, the solar energy system design computing system may identify a set of solar energy system design constraint sets (e.g., templates) that includes system 'C' (i.e., the solar energy system design constraint sets (e.g., templates) with the best savings in the first range 601), system 'B' (i.e., the solar energy system design constraint sets (e.g., templates) with the best savings in the second range 602, and system 'D' (i.e., the solar energy system design constraint sets (e.g., templates) with the best savings in the fourth range 604).

In various embodiments, to generate solar energy system designs based on solar energy system design constraint sets (e.g., templates) identified by the optimal size operations as described above, the processor of the solar energy system design computing system may be configured to perform routines, instructions, or software for arranging solar components within each of the identified optimal solar energy system design constraint sets (e.g., templates) for properties indicated in the predefined data. In other words, the solar energy system design computing system may be configured to perform an algorithm that generates a solar energy system design (or PV system) for each solar energy system design constraint set (e.g., template) identified as applicable (or optimal) for a certain property. The generated solar energy system designs for each solar energy system design constraint set (e.g., template) for a property may be generated based on various assessments of other real-world data associated with the property, and further may be generated using additional feedback (e.g., iterative selection information from a customer at a kiosk) and/or with user preference information in the predefined data. For example, for a property with an identified set of optimal solar energy system design constraint sets (e.g., a first system template having eight modules, a second system template having twelve modules, a third system template with two groups of four modules, etc.), the solar energy system design computing system may perform operations to design a solar energy system for each solar energy system design constraint set (e.g., template) in the set such that each solar energy system design includes the best configuration of solar panels/modules for its respective solar energy system design constraint set (e.g., template). As described above, such solar energy system designs may be stored as potential data of the predefined data.

Figure 7A:
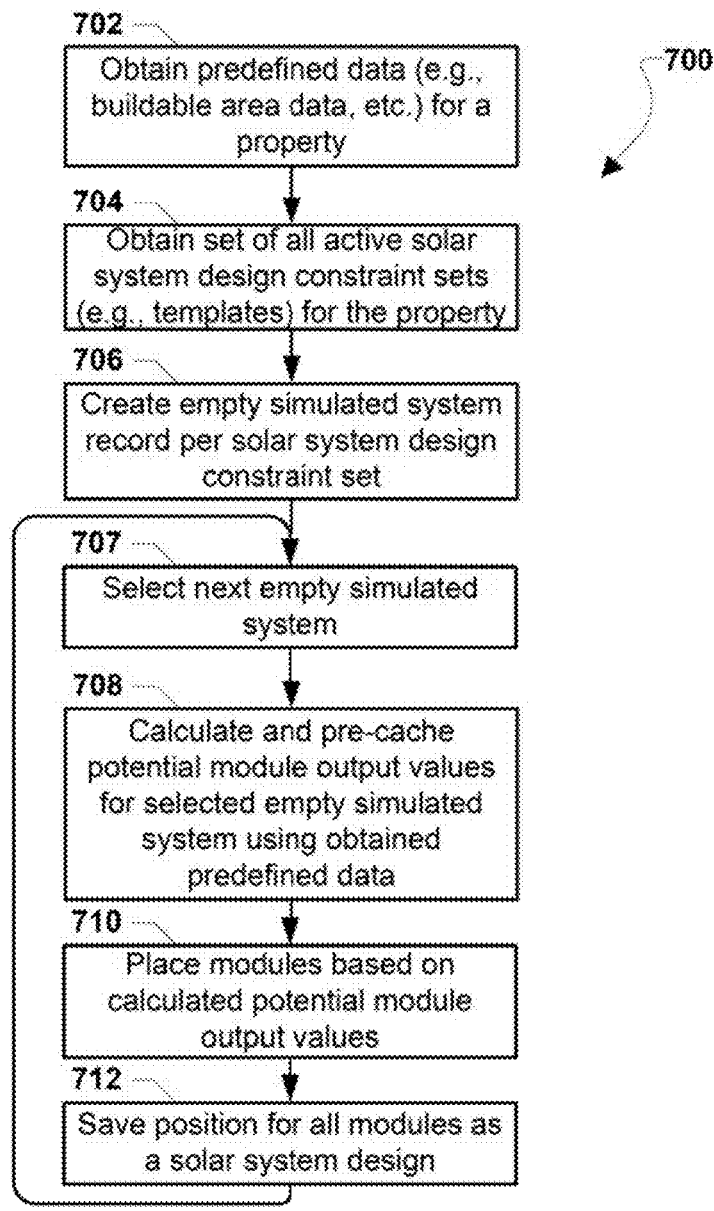
FIG. 7A is a process flow diagram of an embodiment method for the solar energy system design computing system to arrange panels (and equipment) corresponding to various solar energy system design constraint sets (e.g., templates) to generate solar energy system designs for a particular property.

FIG. 7A illustrates an embodiment method 700 for the solar energy system design computing system to arrange panels (and equipment) corresponding to various solar energy system design constraint sets (e.g., templates) to generate solar energy system designs for a particular property. In various embodiments, the solar energy system design computing system may perform the method 700 periodically, such as every day, week, year, or alternatively in response to receiving new real-world data (e.g., new census, customer preference information, parcel data, etc.) via IP communications. In some embodiments, the solar energy system design computing system may perform the method 700 in response to receiving lead data and/or a customer inquiry that includes a property address.

In block 702, a processor of the solar energy system design computing system may obtain predefined data (e.g., buildable area data, etc.) for a property/address. As described above, the property/address may be selected or specified by the solar energy system design computing system as part of an iterative process to select all addresses (or properties) indicated in the predefined data. For example, periodically, the solar energy system design computing system may select each address listed in the address database of the predefined data for use in the operations in block 702. Alternatively, the property/address may be received by the solar energy system design computing system from an inquiry message (e.g., an inquiry from a website, etc.). The obtained data for the property may include information describing the buildable areas of the property, and may include various real-world data within the predefined data of the solar energy system design computing system, such as structure data and buildable area data stored in a database in relation to the property/address. In particular the data for the buildable areas may include information indicating the faces of the roof of the property that are suitable for solar panels, accounting for setbacks, and may further include the pitch, azimuth and shading texture information for each face.

In block 704, the processor of the solar energy system design computing system may obtain a set of all active solar energy system design constraint sets (e.g., templates) for the property. For example, the solar energy system design computing system may retrieve the subset of buildable area configurations determined to be most applicable/viable for the property based on the optimized size calculations described above with reference to FIGS. 5-6. Identifiers, links, codes, or references to the active solar energy system design constraint sets (e.g., templates) (or alternatively copies of the active solar energy system design constraint sets themselves) may be stored within a database in association with other data related to the property, the property's owner, etc. In some embodiments, the solar energy system design computing system may also locally cache the obtained set of solar energy system design constraint sets (e.g., templates). In block 706, the processor of the solar energy system design computing system may create one empty "simulated system" record per obtained solar energy system design constraint set, which may be populated with data once the corresponding system has been designed by the solar energy system design computing system. For example, the solar energy system design computing system may generate a solar energy system design for each of the obtained solar energy system design constraint sets (e.g., templates). In block 707, the processor of the solar energy system design computing system may select a next empty simulated system, such as the first of the created simulated systems. In other words, the solar energy system design computing system may iteratively use the created empty simulated systems in order to generate solar energy system designs for each.

In block 708, the processor of the solar energy system design computing system may calculate and pre-cache potential module output values for the selected empty simulated system using the obtained predefined data. In various embodiments, the solar energy system design computing system may perform an operational loop for each face (e.g., buildable area face or planar section of the property's roof) and each module type (i.e., solar module/component associated with the solar energy system design constraint set).

Figure 7B:
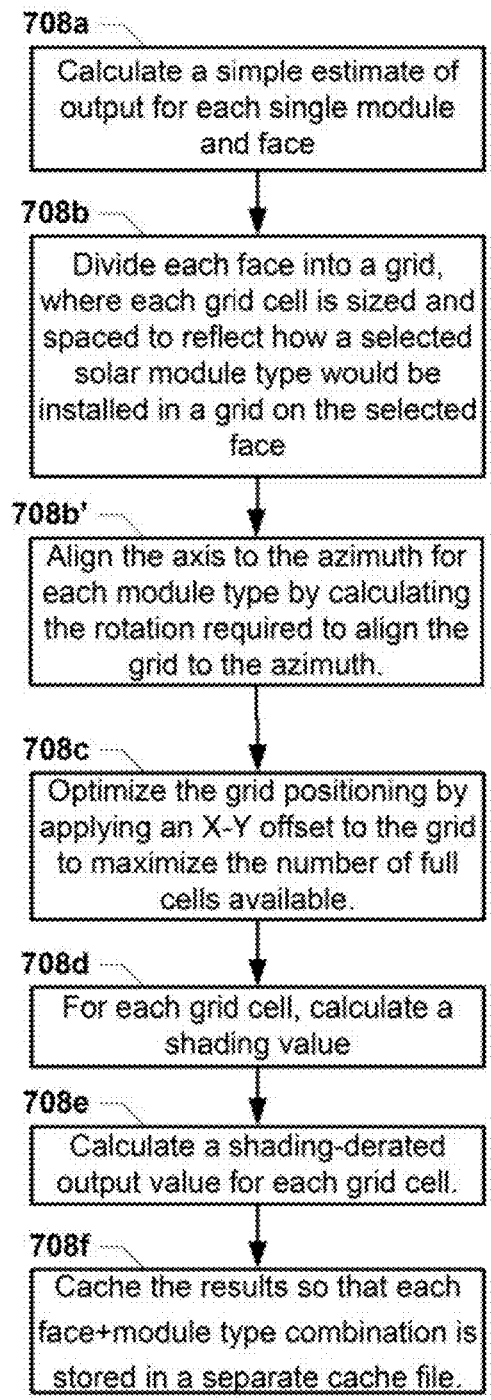
FIG. 7B is a process flow diagram of an embodiment set of operations that may be performed during an embodiment panel arranger process.
Figure 8:
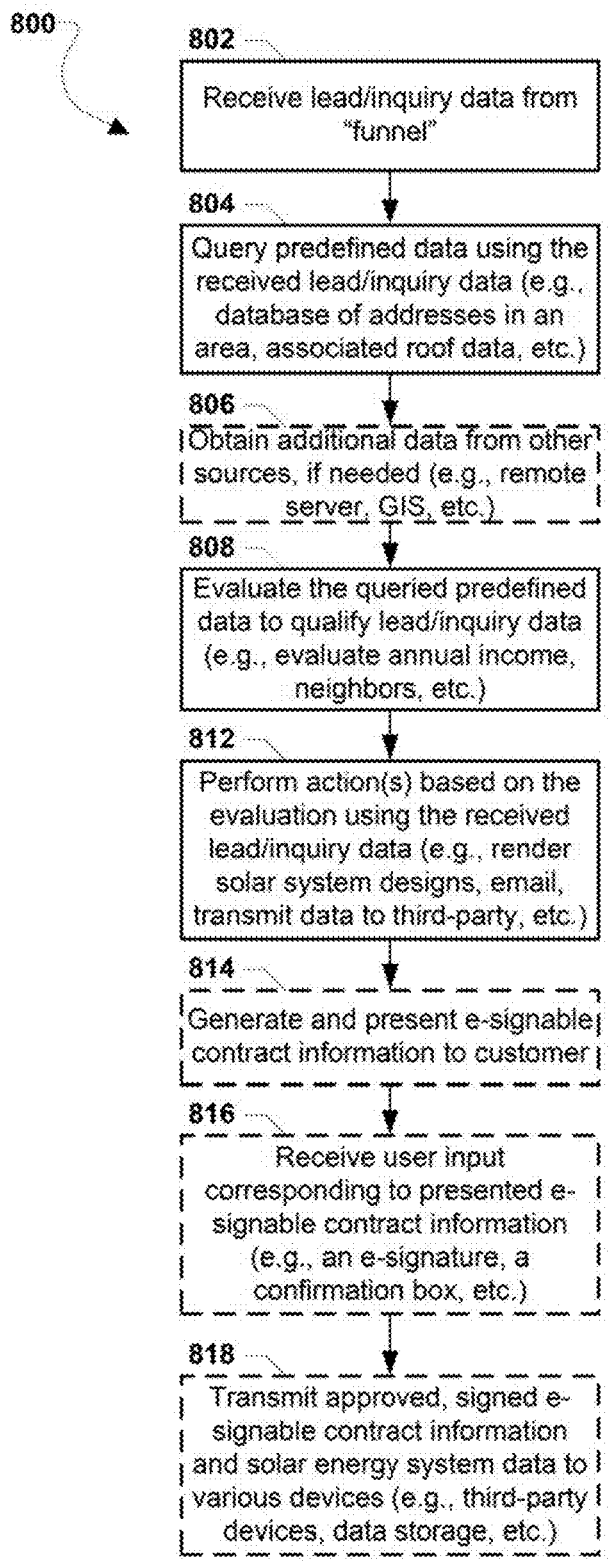

FIG. 7B illustrates an embodiment set of operations that may be performed as part of the operations in block 708 of FIG. 7A. In particular, in block 708*a*, a processor of the solar energy system design computing system may calculate a simple estimate of output for each single module and face, ignoring any shading effects (i.e., this may be equivalent to running PVWatts with nil shading for a single module per face). In block 708*b*, the processor of the solar energy system design computing system may divide each face into a grid, where each grid cell is sized and spaced to reflect how a selected solar module type would be installed in a grid on the selected face. In block 708*b'*, the processor of the solar energy system design computing system may align the axis to the azimuth for each module type (or active module type) by calculating the rotation required to align the grid to the azimuth. In block 708*c*, the processor of the solar energy system design computing system may then optimize the grid positioning by applying an X-Y offset to the grid to maximize the number of full cells available. In some embodiments, the solar energy system design computing system may perform such optimization operations in order to maximize the number of full cells and/or maximize a total output for all full cells.

In block 708*d*, for each grid cell, the processor of the solar energy system design computing system may calculate a shading value. In some embodiments, the shading value may be the average shading for the whole cell. In some embodiments, the solar energy system design computing system may simply use the value of the center pixel for that cell to calculate the shading value. In block 708*e*, the processor of the solar energy system design computing system may calculate a shading-derated output value for each grid cell. A shading-derated output value may correspond to a shading factor has been used to change the effective rating of the cell. For example, a shading derate factor of 87% for a cell would reduce the cell's output to 87% of the output for a cell in the same location with no shading. In block 708*f* the solar energy system design computing system may cache the results so that each face and module type combination is stored in a separate cache file.

Returning to FIG. 7A, in block 710, the processor of the solar energy system design computing system may place modules (e.g., solar panels/modules) based on the calculated potential module output values, and may continually place the modules until the selected empty simulated system is complete (i.e., all modules are placed) or the simulated system may not be completed (i.e., all modules cannot be placed). In other words, the solar energy system design computing system may find the best part of the property's roof for the modules (and other equipment) associated with the solar energy system design constraint sets (e.g., templates). In particular, for each available row of cells (across all available faces), the solar energy system design computing system may calculate a relative value for that row, where the highest value may be the next row to commence adding modules. In some embodiments, to calculate the value of a row, the solar energy system design computing system may assess all possible positions for placement of contiguous groups of modules. For example, when a row has a length of three (3) and no modules placed yet, the solar energy system design computing system may identify that the possible contiguous combinations may be 1, 12, 123, 2, 23, 3. As another example, when a row has a length of four (4) but already has one module placed in a third position, then the possible new contiguous combinations may be 1, 12, 4. In some embodiments, the solar energy system design computing system may utilize various "balancing" constants when determining relative values in certain situations. For example, the solar energy system design computing system may negatively weight a decision (or simply choose not) to start a new row when that row is not adjacent to an existing row, negatively weight a decision (or simply choose not) to place modules on an unused face of the roof, and/or negatively weight a decision (or simply choose not) to place modules on when the modules are part of a new group which cannot complete the next string of possible empty positions.

In some embodiments, after selecting which row to work on next, the solar energy system design computing system may determine how many modules to place, and where, by finding the most contiguous group with the best shading value. The solar energy system design computing system may only consider groups with a length less than an upper limit, where the upper limit may be the number of modules required to fill the next string of solar panels or modules (or next set of solar panels or modules connected in series). In some embodiments, the solar energy system design computing system may pre-calculate all permutations of string sizes to make this faster, however a high certainty may be required when using pre-calculated values to ensure array boundaries are properly observed. For example, when there is a scenario with two arrays (e.g., a first array of two (2) strings of four (4) solar panels or modules and a second array of one (1) string of three (3) solar panels or modules), the solar energy system design computing system may calculate permutations of 3, 4, 7, 8, etc. However, if the solar energy system design computing system has started placing modules on two separate faces, then the permutations for each face may change (e.g., a certain number modules (7) on an array may no longer be possible).

In block 712, the processor of the solar energy system design computing system may save a position for all placed modules as a solar energy system design, such as a design stored within the potential data associated with the property/customer/address. In some embodiments, the stored solar energy system design may include latitude/longitude values, rotation values, and x-axis/y-axis pixel offset values relative to a particular coordinate or reference point (e.g., top-left corner). The solar energy system design computing system may then continue with the operations in block 707, such as by selecting the next empty simulated system for placing modules to generate another solar energy system design. In some embodiments, the method 700 may include operations for generating solar energy system designs that are focused on power generation capabilities of solar energy system designs (e.g., a design emphasizing PVWatts), as well as individual runs of the method 700 that are focused on rebate information of designs.

In various embodiments, for each property and set of parameter assumptions within the predefined data, the solar energy system design computing system may simulate and cache all the various possible solar energy system designs (or configurations). For example, the solar energy system design computing system may perform the method 700 to batch generate a plurality of solar energy system designs for each known property/customer/address. As described above, these generated solar energy system designs (or configurations) may be generated prior to receiving any inquiries or leads for particular properties, enabling other operations that use the solar energy system designs (e.g., custom quotations) to be performed faster. For example, using pre-generated, cached solar energy system designs for a particular house, the solar energy system design computing system may present the designs on a display unit immediately upon receiving an input requesting quote or potential design information for the house. As another example, the solar energy system design computing system may instantly qualify the solar potential for a particular address or area using the pre-calculated designs and other predefined data (e.g., real-world data, receiving customer-supplied data, etc.), instantly presenting personalized, initial system options and quotes for the particular address.

In some embodiments, the solar energy system design computing system may store all possible solar energy system designs (e.g., simulated data regarding module arrangements, etc.) in data warehouses. For example, the solar energy system design computing system may be configured to utilize a mass simulation engine component, logic, circuitry, or other module (or a "Mass Simulation Engine") to generate solar energy system designs for all properties known within the predefined data and then store those generated solar energy system designs in a data warehouse coupled to the solar energy system design computing system and configured to store predefined data (e.g., real-world and/or potential data). In various embodiments, the solar energy system design computing system may manage, update, and organize such data warehouses by executing various software, routines, or instructions, such as operations that shard stored data tables into separate tables.

In various embodiments, the solar energy system design computing system may pre-calculate estimated electricity savings information for each generated solar energy system design for a known property. Such pre-calculated information may be stored in electricity savings lookup tables within the potential data of the predefined data. For example, the solar energy system design computing system may generate data tables within the predefined data (e.g., "electricity_savings_lookup" tables) and that are associated with particular solar energy system designs for a property. The solar energy system design computing device may pre-calculate annual electricity savings information for such lookup tables over regular time intervals. Lookup tables may include pre-calculated information for a combination of "annual kWh" system output and "annual electricity usage." For example, lookup tables may include the estimated power output for a solar energy system design for a year (i.e., annual kWh) as well as an annual power use requirement for the property. In some embodiments, the solar energy system design computing device may also pre-calculate lookup table information corresponding to utility and/or tariff. For example, when a property's solar energy system designs may be affected by two (2) different utilities (e.g., power companies), each having three (3) tariffs associated with their services, the solar energy system design computing system may pre-calculate six (6) lookup table entries, one for each utility and tariff combination, each entries also having a pre-calculated annual electricity savings value based on the utility, tariff, annual output and power requirement/usage for the solar energy system design. Lookup tables may be de-normalized to simplify lookups. In some embodiments, lookup tables may be sharded by the solar energy system design computing system such that electricity savings information related to each utility for a certain property is within a separate data table.

In some embodiments, the total number of rows in a lookup table may be equal to the number of applicable utility and tariff combinations (ut) multiplied by the number of output increments (oi) (e.g., 100 kWh over a range of 0-30,000 kWh) multiplied by the number of usage increments (ui), shown by the following equation:

$$\text{Lookup Table Rows} = ut * oi * ui$$

In various embodiments, pre-calculated lookup tables may include cached marginal savings information used for interpolation operations performed by the solar energy system design computing system. In particular, each data row within a lookup table may include a "marginal savings" data field that includes data to increase accuracy of estimates by interpolation. For example, if a solar energy system design has an estimated output of 1040 kWh, but the lookup table for the solar energy system design only includes data rows related to 1000 kWh and 1100 kWh output values, the solar energy system design computing system may use the marginal savings data field for both data rows to interpolate/estimate data for the output value between the two records. The marginal savings data field for a particular lookup table data row may be calculated by the solar energy system design computing system as the average savings information (e.g., dollar per kWh) between the adjacent higher and lower values of savings for the same usage. The marginal savings value in such data fields of lookup tables may enable interpolation without needing to pull two data records of a lookup table (e.g., the adjacent higher and lower values). Instead the solar energy system design computing system may interpolate an estimated value by using the marginal savings value from a single closest record. In some embodiments, the solar energy system design computing system may calculated marginal savings data field values during a separate pass after all rows of a lookup table have been calculated using utility and tariff considerations as described above.

The predefined data, including obtained real-world data and calculated potential data, may be used by the solar energy system design computing system in various applications, contexts, and manners in order to efficiently and intelligently approach prospective customers of solar energy systems. In general, the solar energy system design computing system may facilitate interactive customer experiences that allow prospective customers to explore their solar energy system options by processing lead or inquiries (i.e., "funneled" data), accessing pre-calculated, personalized data/quotes within a very short period (e.g., seconds), and re-calculating/customizing solar energy system designs based on customer requirements and preferences in real-time, and performing operations for e-signing solar energy system installation contract information (or agreements) with the customer. In various embodiments, the solar energy system design computing system may use predefined data to access pre-calculated designs (e.g., calculated data stored within potential data as described above) or alternatively may be configured to quickly generate solar energy system designs based on lead data and/or inquiry data, such as by generating relevant system designs in real-time when no pre-caching has occurred. Thus, the solar energy system design computing system may use various predefined data, as well as real-time data (e.g., user selection inputs, etc.) to quickly perform calculations and system rankings to minimize wait-time when prospective customers (or system users) are requesting solar energy system price quote information. In some embodiments, the solar energy system design computing system may be configured to permit multiple users associated with a property (e.g., co-owners of a house) to work on an instant quote at the same time and may be configured to "push" individual users' proposed modifications, system specifications, requirements, or preferences to all other users, such as other prospective customers associated with the property who are also requesting or working on similar quotes for solar energy systems.

Figures 3, 3B, 4, 5, 6, 7, 8:
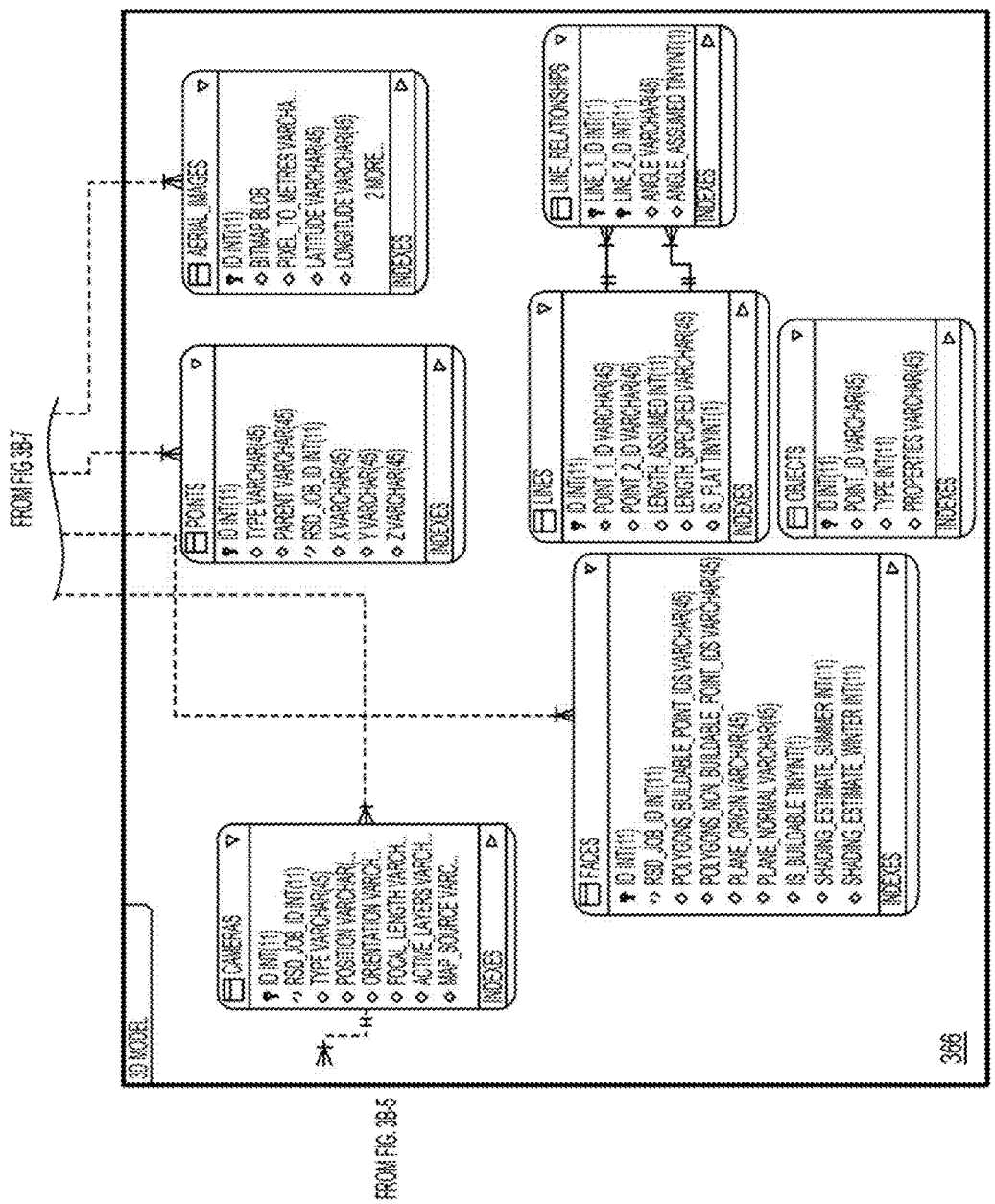

FIG. 8 illustrates a simplified method 800 for the solar energy system design computing system to use data related to solar energy systems. In block 802, a processor of the solar energy system design computing system may receive lead data and/or inquiry data (referred to as lead/inquiry data) from a "funnel." Such a funnel may refer to any method, process, steps, or other operations that are performed in order to elicit information from or about prospective solar energy system customers. For example, the "funnel" may include the solar energy system design computing system receiving information from a third-party device via IP communications, such as customers' address information, utility bill information, and budget information (i.e., lead data). As another example, the "funnel" may also include the solar energy system design computing system receiving an address and selection inputs from customer interacting with a tablet computing device configured to execute a quote application (i.e., inquiry). FIGS. 10A-F below describe such an exemplary funneling technique. In other embodiments, the received lead/inquiry data may be received based on a customer's interactions with a web site in communication with the solar energy system design computing system (e.g., a quote website that transmits address info to the solar energy system design computing system for processing, etc.).

As a non-limiting illustration: a typical lead/inquiry data may include a prospective customer's address (i.e., the address of the property that may have a solar energy system). The lead/inquiry data may further include information indicating the roof type of the property at the address (e.g., tile, ceramic, etc.), which may not be used to design solar energy systems, but instead may be used by the solar energy system design computing system to more accurately calculate quote prices (e.g., labor and equipment costs may be different dependent upon the type of roof). In other embodiments, the lead/inquiry data may also include other relevant details, such as usage estimates for utilities (e.g., power), as well as contact information of the prospective customer (e.g., email address, best time to reach, phone number, etc.). In some embodiments, the lead/inquiry data may be generated in various ways, such as by a customer inputting the information into a web form (i.e., a web inquiry), a third-party providing the solar energy system design computing system information from customer files/databases (e.g., a utility sharing customer databases information), and/or from a sales person (e.g., a representative within a hardware store) entering the data into an application (or app) on a tablet mobile device.

In block 804, the processor of the solar energy system design computing system may query predefined data using the received lead/inquiry data. For example, the solar energy system design computing system may query a data warehouse, database, or other stored and accessible datasets that include real-world and potential data, as described above. As another example, the solar energy system design computing system may perform lookup operations on various data tables to retrieve 3D models data (e.g., roof face pitch, azimuth, etc.), pre-calculated solar energy system designs, solar energy system design constraint sets (e.g., templates), etc. In optional block 806, the processor of the solar energy system design computing system may obtain additional data from other data sources, if needed. In other words, based on the received lead/inquiry and the predefined data already accessible, the solar energy system design computing system may determine that new, updated, additional, supplementary, or different data about the property, prospective customer, third-party info (e.g., utility rates, labor rates, government regulations, tax codes, etc.) should be obtained prior to generating a quotation. This may help ensure accuracy in quotes, provide the minimum data needed to generate solar energy system designs, and/or determine eligibility of an address for a solar energy system (e.g., residential restrictions may indicate a property may not have certain renovations/installations based on code, etc.). Examples of other data sources may include third-party web servers, GIS, social networking services, data warehouses, and utility computing devices.

In block 808, the processor of the solar energy system design computing system may evaluate the queried predefined data to qualify the lead/inquiry data. In other words, the solar energy system design computing system may determine which or how solar energy systems may benefit prospective customers based on the received and predefined data. For example, the solar energy system design computing system may assess stored data and qualify the lead/inquiry data based on the predefined data to determine whether there are any solar energy system designs that may be applicable for a prospective customer or property associated with the received lead/inquiry. The solar energy system design computing system may evaluate various data, such as annual income, neighborhood characteristics, presence of a hybrid car, political affiliations, and other personal or practical data related to the owner of a property or the property itself. In some embodiments, the solar energy system design computing system may compare lead/inquiry data to stored data to authenticate the identity or validity of the lead/inquiry (e.g., spoofed data may be discredited when compared to stored, verified census data, etc.).

In various embodiments, the evaluation may simply include the solar energy system design computing system retrieving pre-calculated data associated with the address, or alternatively may include the solar energy system design computing system calculating solar energy system price quote information (i.e., potential data as described above) in real-time while prospective customers wait. For example, the solar energy system design computing system may evaluate the predefined data in real-time to identify the savings or value to the prospective customer that various solar energy system design may have regarding the customer's property.

In block 812, the processor of the solar energy system design computing system may perform actions based on the evaluation using the received lead/inquiry data (e.g., rendering a solar energy system design, transmitting to third-party devices marketing information related to a solar energy system price, a solar energy system design, and a solar energy system installation, etc.). For example, the solar energy system design computing system may transmit messages to the prospective customer that indicate a set of possible solar energy system designs, savings, power outputs, and other information the customer may use to decide whether to purchase a solar energy system (e.g., a quote). As another example, the solar energy system design computing system may cause renderings of the solar energy system designs and associated data to be displayed for the customer within a store, as described below with reference to FIGS. 10A-10F.

In some embodiments, the actions performed based on the evaluation of the queried predefined data using the received at least one of lead data or inquiry data may include automatically prioritizing leads based on the evaluation of the predefined data, wherein the leads are qualified based information within the predefined data including at least one of house square footage, income level, house style, area regulations, purchasing trends, solar potential output, potential financial impacts of installing solar, shading, and tax incentives. In some embodiments, the action may include transmitting marketing materials (e.g., price quotes, savings information, solar incentives, offers, etc.) based on the prioritized leads. Such materials may be transmitted by the solar energy system design computing system to various devices associated with third-parties, such as mobile devices, servers, point-of-sale devices, and scheduling devices associated with any of a contractor, a solar energy system installing company, a handy-man, a utility company, a roofer, a builder, a power plant owner/manager, an architect, a non-profit organization, and a product delivery service (e.g., pizza, packages, etc.).

In optional block 814, the processor of the solar energy system design computing system may also generate and present e-signable contract information to the customer. E-signable contract information may include all specifications for a particular solar energy system, as well as contractual terms for purchasing and installing the solar energy system at the address associated with the received lead/inquiry data. In various embodiments, e-signable contract information may only be presented when the solar energy system design computing system can design a solar energy system accurately enough to not require additional information (e.g., no manual measuring and/or follow-up procedures by technicians are required), and thus may only be possible with adequate predefined data (e.g., highly accurate LiDAR, etc.).

In some embodiments, in optional block 816, the processor of the solar energy system design computing system may receive user input(s) corresponding to presented e-signable contract information (e.g., an e-signature, a confirmation box, etc.). For example, the solar energy system design computing system (e.g., a tablet mobile device) may receive touch inputs on a touch screen interface corresponding to a confirmation (e.g., "Yes") or a declination (e.g., "No") check boxes or buttons, or alternatively may receive an electronic signature (e-signature) from the customer via a stylus or other input means. In other words, the solar energy system design computing system may obtain an approved, signed agreement to proceed with an installation of a solar energy system based on the solar energy system information presented to the consumer. Further, in optional block 818, the processor of the solar energy system design computing system may transmit approved (or signed) e-signable contract information, as well as the generated solar energy system data (e.g., designs, part information, specifications, etc.) to various devices, such as computing devices of third-party installers/contractors, database units associated with the solar energy system design computing system, etc. For example, the solar energy system design computing system may relay an e-signed contract along with component acquisition instructions and/or installation instructions for contractor parties to install the solar energy system designed for the customer.

Figure 9A:
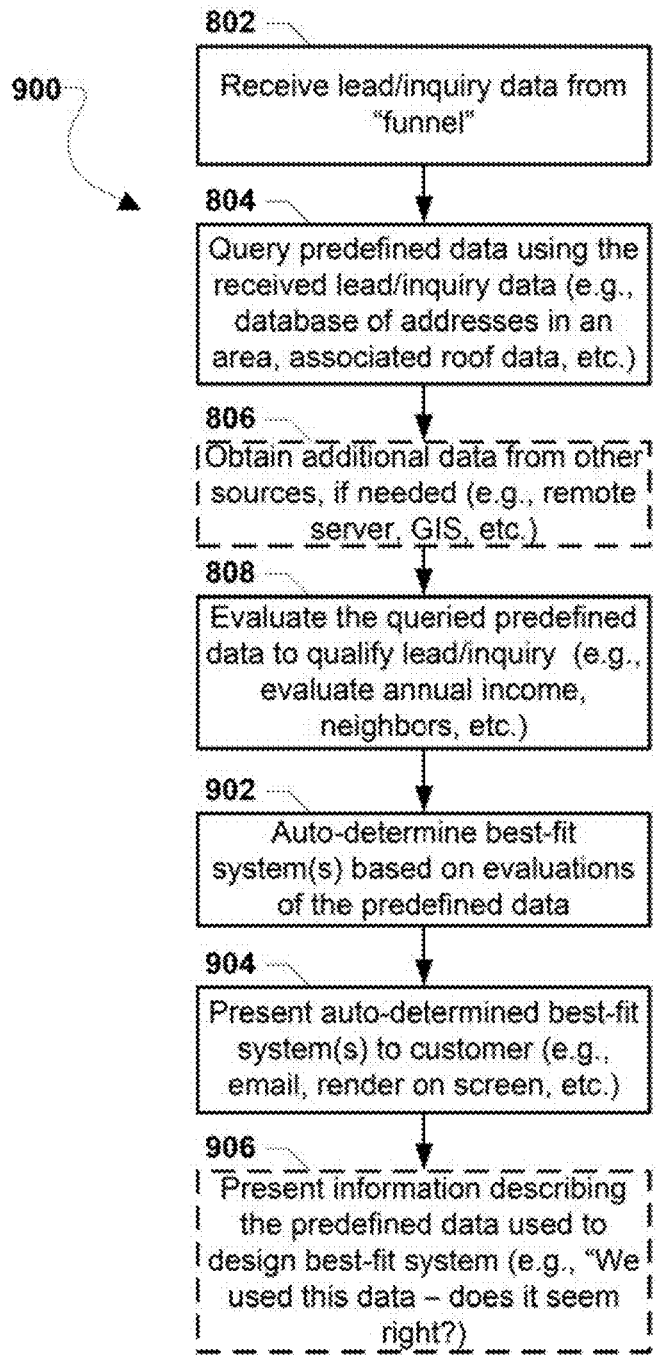
FIG. 9A is a process flow diagram of an embodiment method for a solar energy system design computing system to automatically determine a best-fit solar energy system for a prospective customer based on received lead/inquiry data.

FIG. 9A illustrates an embodiment method 900 for a solar energy system design computing system to automatically determine (or auto-determine) a best-fit solar energy system for a prospective customer based on received lead/inquiry data. The method 900 may be similar to the method 800 described above, except that the solar energy system design computing system may execute the method 900 and use all/any accessible predefined data to determine the best solar energy systems for a customer. In other words, with minimal input from a customer, the solar energy system design computing system may execute the method 900 to interpret/estimate the qualities, characteristics, prices, and functionalities of a solar energy system that likely match the customer's needs and preferences. In some embodiments, the solar energy system design computing system may auto-generate solar energy system price quote information that indicates prepay options based on socio-economical status of an area.

In block 802, a processor of the solar energy system design computing system may receive lead or inquiry data from a "funnel." In block 804, the processor of the solar energy system design computing system may query predefined data using the received lead/inquiry data. In optional block 806, the processor of the solar energy system design computing system may obtain additional data from other sources, if needed. In block 808, the processor of the solar energy system design computing system may evaluate the queried predefined data to qualify the lead/inquiry.

In block 902, the processor of the solar energy system design computing system may auto-determine the best-fit system(s) (or designs) based on the evaluations of the predefined data. The solar energy system design computing system may use various rule sets, calculators, algorithms, applications, equations, logic, weighting schemes, and decision models to identify which solar energy system designs would be the best for the property and the customer associated with the received lead/inquiry data. For example, the solar energy system design computing system may determine that a certain solar energy system is a best-fit for a customer as it saves the most money over a year and the customer likely values savings above all else based on his current credit score, low bank account balance, income level, number of dependents, and other financial information within the predefined data. In another example, the solar energy system design computing device may determine a best-fit solar energy system design for a customer as having U.S.-made modules/inverters/etc. based on the trend of U.S.-made solar energy systems installed within the same area/neighborhood. In some embodiments, the solar energy system design computing system may auto-generate multiple best-fit systems based on different options. For example, the solar energy system design computing system may identify a first solar energy system design that is a best fit for best savings options, and a second solar energy system design that is a best fit for power consumption.

In block 904, the processor of the solar energy system design computing system may present the auto-determined best-fit system(s) to the customer, such as through an email, by rendering the designs on a screen (e.g., a touch screen, a display unit, a web browser module, etc.), etc. In some embodiments, the processor of the solar energy system design computing system may also transmit the information describing the auto-determined best-fit system(s) to various computing devices, such as computing devices utilized by third-party entities (e.g., installers, contractors, etc.). Such transmissions of the data may be performed by the system in response to receiving confirmation inputs from the user, such as authorization inputs to share the data and/or e-signed contracts. In an optional block 906, the processor of the solar energy system design computing system may present information describing the predefined data used to design the best-fit system(s). In other words, the best-fit solar energy system is rendered or transmitted to the customer, the solar energy system design computing system may also render the variables, weights, and other factors used during the evaluations to determine the solar energy system design. For example, the solar energy system design computing system may cause a description to be rendered on a tablet mobile device executing quote software that indicates the best-fit solar energy system design is the best fit based on court records, credit history, or the customer's income level.

Figure 9B:
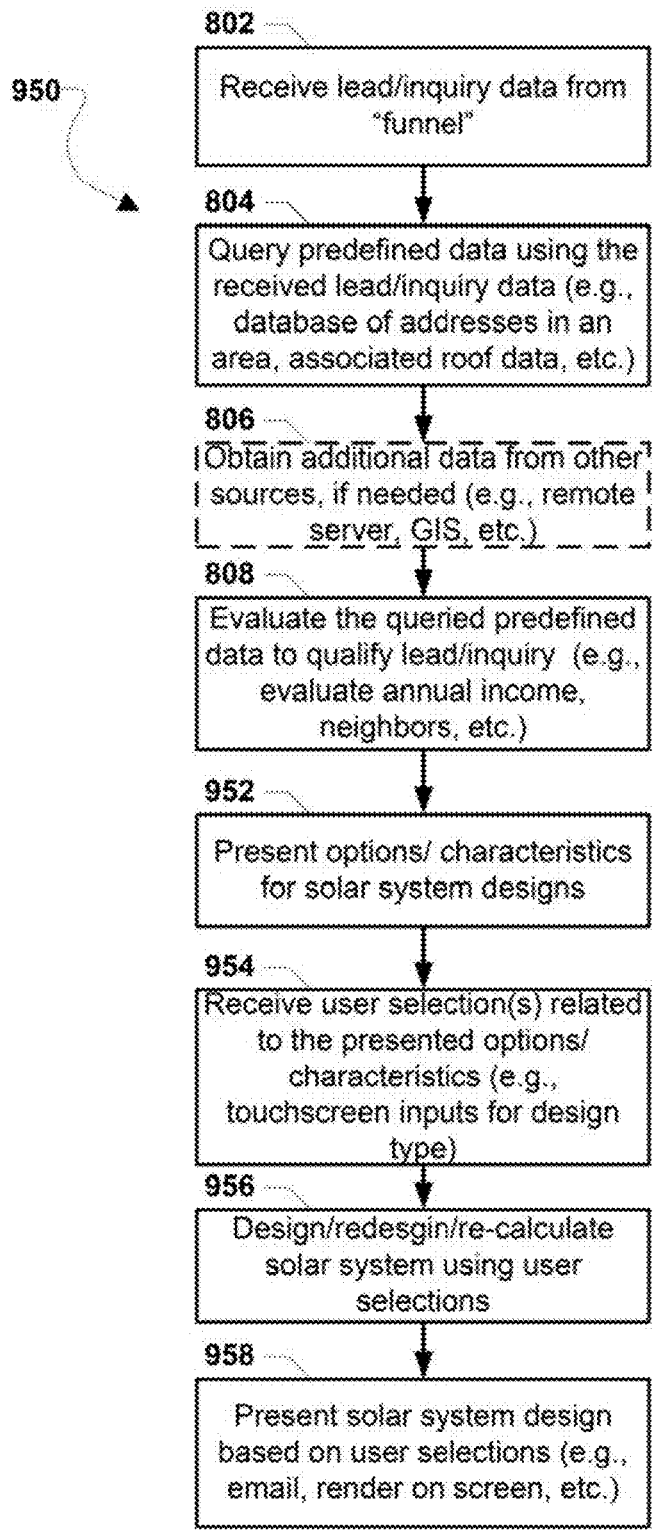
FIG. 9B is a process flow diagram of an embodiment method for a solar energy system design computing system to automatically determine a best-fit solar energy system for a prospective customer based on received lead/inquiry data and customer selections.

FIG. 9B illustrates an embodiment method 950 for a solar energy system design computing system to automatically determine a best-fit solar energy system for a prospective customer based on received lead/inquiry data and customer selections. The method 950 may be similar to the method 800 and/or the method 900 described above, except that the solar energy system design computing system may execute the method 950 to use all/any accessible predefined data to present options from which the customer may select to generate the best solar energy systems for the customer. In other words, the method 950 may be performed by the solar energy system design computing system to provide customers with information so that they may make informed, real-time decisions for identifying best-fit, customized solar energy systems.

In block 802, a processor of the solar energy system design computing system may receive lead or inquiry data from a "funnel." In block 804, the processor of the solar energy system design computing system may query predefined data using the received lead/inquiry data. In optional block 806, the processor of the solar energy system design computing system may obtain additional data from other sources, if needed. In block 808, the processor of the solar energy system design computing system may evaluate the queried predefined data to qualify the lead/inquiry.

In block 952, the processor of the solar energy system design computing system may present options/characteristics for solar energy system designs applicable to the lead/inquiry data. For example, after initial evaluations of the predefined data, the solar energy system design computing system may render the different types of solar energy system sizes and configurations that may be installed on a particular house associated with the lead/inquiry. For example, the solar energy system design computing system may cause a series or set of solar energy system designs to be rendered on a tablet device with prompts indicating user selections must be made to complete the quote. In some embodiments, the solar energy system design computing system may be configured to only present options to a user to guide the design process and may not present actual or pre-generated designs.

In block 954, the processor of the solar energy system design computing system may receive user selections related to the presented options/characteristics. In particular, the solar energy system design computing system may receive touch screen inputs corresponding to a certain type of solar energy system design that maximizes annual savings over power output. As a non-limiting illustration: the solar energy system design computing system (or a device executing quote software) may present the options/characteristics to users in a manner similar to purchasing an airline ticket online by rendering a list of all the configurable parameters that may be used to generate a quote and/or an actual solar energy system design fitting the prospective customer's preferences and specifications. The solar energy system design computing device may receive one or many choices for options that the customer may like (e.g., power output is more important than savings, panels may only cover a certain portion of the roof, fabrication/manufacturer characteristics must be met, etc.) and may adjust evaluation rule sets to identify solar energy systems that conform to those chosen options. In various embodiments, the selections may indicate various user customizations, such as manufacturer preferences (e.g., use equipment from Company X, etc.), country-of-manufacture (e.g., equipment made in the United States of America), system size (e.g., large, small, etc.), preferred installation areas of a roof (e.g., sections of a roof to keep clear of solar cells/equipment, etc.), and updates of source data (e.g., indicate that a certain tree has been chopped down or grown taller, a new building is now at an address, an old building has been demolished from an address, etc.).

In block 956, the processor of the solar energy system design computing system may design, redesign, or re-calculate a solar energy system based on the received user selections. The solar energy system design computing system may perform evaluations, as described in block 808, in order to apply real-world data, such as roof dimensions, utility costs, labor costs, etc., to the selected solar energy system design and calculate new potential data related to the selection. For example, the solar energy system design computing system may determine new solar panel arrangements and may project a new annual savings amount based on the selected solar energy system design or other options indicated by the selections. The solar energy system design computing system may also filter systems based on user inputs, such as a received user selection input that indicates the prospective customer associated with the lead/inquiry data may only consider solar energy systems fitting certain criteria (e.g., U.S.-made, a certain color, a certain installation data, etc.). In various embodiments, the solar energy system design computing system may or may not perform operations to design initial designs prior to receiving the user selections (or customer's input).

In block 958, the processor of the solar energy system design computing system may present the solar energy system design based on the user selections, such as by emailing, rendering on a screen, or transmitting a document (e.g., portable document format file or "pdf", etc.) to the customer. In some embodiments, the solar energy system design computing system may provide prepay and other payment options related to presented solar energy system designs.

Using the above described methods, the solar energy system design computing system may generate solar energy system quotes and stored data for use in various business applications. In some embodiments, the solar energy system design computing system may use the evaluations and usage of predefined data to enhance remote solar design (RSD) processes that utilize aerial photos (and other raw data) to make simple roof models and estimate shading. Such an enhancement of RSD processes may be valuable as the solar energy system design computing system may use predefined data to immediately reducing cycle time and costs. In particular, executing method 900, the solar energy system design computing system may automatically generate optimized solar energy system designs for particular prospective customers. For example, the solar energy system design computing system may be configured to use predesigned solar energy system data (e.g., solar energy system designs within the predefined data) to load roof representation data into an RSD tool to get the azimuth, pitch, etc. and more accurate shading for each plane/face of roof, etc. In other words, the solar energy system design computing system may generate more accurate quotes as each square foot of a property's roof, including accurate shading data, may be known. In some embodiments, the solar energy system design computing system may be configured to automate "zero effort" shading estimates as well.

In some embodiments, the solar energy system design computing system may improve RSD processes by calculating monthly shade estimates for individual points and for entire system configurations, such as for various properties within a certain zip code. Further, the solar energy system design computing system may evaluate pre-calculated or pre-designed solar energy systems in combination with and outputs/financials stored within the predefined data and may perform operations to select systems for use in RSD tools for tweaking and publishing (e.g., a certain system may be automatically loaded into an RSD tool). In some embodiments, the solar energy system design computing system may provide parcel outline data within the predefined data to RSD tools, applications, and associated devices in order to improve identification processes (e.g., help identify property and roof) and avoid issues, such as additional costs or installation logistical issues with duplexes, condos, etc. Additionally, the solar energy system design computing system may utilize 3D models (or data representing 3D objects) created with RSD or computer aided-drafting (CAD) tools as a basis for automatically designing solar energy systems. For example, the solar energy system design computing system may utilize received exported data of a roof with installable areas identified to auto-design systems. In various embodiments, the solar energy system design computing system may improve RSD tools by compiling datasets within the predefined data to support feedback loops as well as machine learning operations that improve 3D roof detection.

In some embodiments, the solar energy system design computing system may use predefined data to improve CAD designs, such as by providing obtained parcel data within the predefined data to assist design and engineering department (DAE) operations or teams. Improvements to CAD designs may include: addition of shading information for installation surfaces, addition of shading obstacles as objects in the scene, correction and/or annotation of dimensions, angles, areas, positions, and identifying installation areas for solar modules, etc. . . .

In some embodiments, the solar energy system design computing system may use the evaluations and usage of predefined data to support an instant estimate website/widget (e.g., "Instant IQuote Widget"), such as an app that may be executed on a prospective customer's smartphone or laptop. The instant estimate website/widget may be configured to deliver quick solar energy system price quote information (e.g., for a free "Mini iQuote" for solar energy systems). In some embodiments, the solar energy system design computing system may support such interactive software that receives prospective customer input data (e.g., an input address) and immediately render system options based on the pre-calculated predefined data. Such immediate feedback to customers may include information and descriptions of solar energy system designs (e.g., where solar modules may or may not be placed, the number of modules allowable for the property, etc.), as well as customer service messaging (e.g., rendered messages indicating that solar energy system providers "will get back to you with a full quote soon!"). The instant estimate website/widget may respond to customer inputs, and further may be configured to generate solar energy system estimates generate estimates for friends and/or to utilize social network platforms. The instant estimate website/widget may utilize the rich customer data of the predefined data supported by the solar energy system design computing system in order to feed standard funnels.

In some embodiments, the solar energy system design computing system may be configured to generate full quotes with highly accurate data by utilizing all available data when calculating solar energy system designs (e.g., "full Instant iQuotes" for solar energy systems). In other words, using the predefined data described above, the solar energy system design computing system may generate accurate "buyable" instant quoting that includes all needed data to actually implement or install a solar energy system. For example, unlike the website/widget functionality described above, the full instant iQuote for solar energy system functionality embodied by the solar energy system design computing system and its processes may be an end-to-end, self-service solar energy system process that has the functionality to allow the transmission of e-signable documents (i.e., the users may be able to finish purchasing a system without human intervention.) The full instant iQuotes for solar energy system functionality may be free and highly scalable, enabling ubiquitous marketing.

In some embodiments, the solar energy system design computing system may use the evaluations and usage of predefined data to support funnel improvements, such as enhanced manners of processing received lead/inquiry data. In particular, the solar energy system design computing system may use predefined data to automatically prioritize leads based on a qualification process. For example, the solar energy system design computing system may identify certain prospective customers as being high or low priority based on their associated roofs as defined within the real-world data of the predefined data (e.g., a high priority roof may have enough square footage and other characteristics that would make a solar energy system installation easy and/or a high profit margin potential, etc.). Such funnel improvements may include identifying prospective customers that may not be eligible for solar energy systems, such as based on income level, house style, area regulations, etc., and thus may be used by the solar energy system design computing system to transmit messages discounting or prohibiting such customers from submitting applications or furthering a quote process. For example, in response to determining a prospective customer's roof is too small for even the smallest solar energy system design based on stored 3D model data, the solar energy system design computing system may simply transmit a message in response to a web inquiry indicating "We can't help you, sorry!" In addition, with the pre-calculated data available to the solar energy system design computing system, quotes may be more accurate, having more data to interpret in order to more closely factor usage information, power consumption requirements, and savings potential. In short, the solar energy system design computing system may use the predefined data and processing to remove steps for customers.

In some embodiments, the solar energy system design computing system may use the evaluations and usage of predefined data in combination with marketing or prospecting tools, software, routines, or instructions. In particular, the solar energy system design computing system may be configured to periodically identify the best properties within areas (e.g., towns, cities, states, etc.) based on obtained data, such as 3D models, purchasing trends, tax incentives, and income levels. With automated prospecting, the solar energy system design computing system may cheaply generate its own leads (i.e., prospective customers that may be approached with email marketing, door-to-door marketing, etc.). In additional embodiments, the solar energy system design computing system may be configured to authorize or permit access to prospecting tools, software, routines, and or pre-generated prospecting tool data to third-parties, such as prospective customers, equipment merchants/vendors, service providers, etc. With the prospecting tools, the solar energy system design computing system may generate information that tells people where good solar energy system areas are. For example, the solar energy system design computing system may find houses ranked by solar grade within a certain number of meters of a particular location (e.g., house address) and that have a solar grade better than a defined threshold value. In some embodiments, the solar energy system design computing system may be configured to perform the prospecting tools/routines in order to identify leads data on a certain set of "best prospects" in an area, as well as corresponding solar energy system price quote information for each of the identified prospects in the area. For example, based on processing predefined data associated with a certain city, the solar energy system design computing system may generate marketing materials for the most promising prospective customers, including custom solar energy system price quote information for each (e.g., possible savings per year, the possible types of system designs that may be installed, contractors and equipment that may be used, the number of neighbors that have similar systems, financial options, etc.).

In some embodiments, the solar energy system design computing system may use the evaluations and usage of predefined data to generate information that may be presented (or transmitted) to prospective customers via third-parties (e.g., channel partners). In particular, channel partners may be integrated into the solar energy system quote process by providing automatically pre-calculated solar energy system price quote information to various devices associated with businesses. The solar energy system design computing system may generate solar energy system price quote information for an area and transmit the solar energy system price quote information to a device associated with a vendor or service provider that does business in the area so that the vendor may distribute the solar energy system price quote information during the course of its business. For example, solar energy system price quote information may be generated and provided to servers/mobile devices of contractors, solar energy system installing companies, handy-men, utility companies, non-profit organizations, roofers, builders, architects, and other entities that may interact with the subjects of the solar energy system price quote information (e.g., prospective customer homeowners). As another example, the solar energy system design computing system may generate and transmit solar energy system price quote information to a product delivery device in response to the device being programmed for delivering a product (e.g., a pizza, a package, etc.) to the address (e.g., the device may be a store scheduler device, a GPS device within a delivery vehicle, a website order server, etc.), so that the solar energy system price quote information may be delivered along with the product. In some embodiments, the solar energy system design computing system may transmit solar energy system price quote information to point-of-sale devices of channel partners. For example, the solar energy system design computing system may transmit solar energy system price quote information for a certain prospective customer in response to receiving a message from a register or check-out device within a store indicating that the customer is there. As another example, the solar energy system design computing system may transmit abbreviated information about quotes so that channel partners may entice prospective customers into investigating solar energy systems. For example, the solar energy system design computing system may transmit a teaser message (e.g., "did you know you are within the top 10% of homeowners with the best type of roofs for solar power in your city?) in response to detecting that homeowner is checking out at a channel partner point-of-sale device. In some embodiments, such messages may be scripts to be recited, enacted, or presented by devices and/or human employees within channel partner locations. In various embodiments, the solar energy system design computing system may transmit solar energy system price quote information to any partner devices that interact with prospective customers and that have access to address information associated with the prospective customers. For example, the solar energy system design computing system may transmit solar energy system price quote information for a certain prospective customer based on a credit card transaction within a big box store device, as the big box store may access the customer's address via the transaction. Solar energy system price quote information may be distributed attached to, within, or on a receipt. Such channel partner integration operations may be performed by the solar energy system design computing system in combination with the prospecting tools described above. In various embodiments, channel partners that perform installations of solar energy systems may access the predefined data of the solar energy system design computing system in order to identify the solar potential, number of viable customers, typical savings & output, etc. corresponding to certain geographic areas (or zip codes). Additionally, partners may access metrics for density and proportion of each solar grading, per square mile, as well as reports of average shading.

In yet another embodiment, the solar energy system design computing system may use the evaluations and usage of predefined data to generate information that may be used for grid planning by power plants. Often, as communities grow, power stations, such as electrical power substations, become overburdened by the increase in demand for power from the communities. As a result, municipalities and/or utility companies must spend vast amounts of energy, time, and money to build additional facilities, costs which often are eventually shared by customers of the utility. However, the more solar energy system users there are in such an overburdened area, the less likely new facilities may be needed. Accordingly, power plants (or similar facilities) may utilize calculated data transmitted by the solar energy system design computing system that indicate how likely certain customers within the area serviced by the power plants are to convert (partially or fully) to solar power. This information would be invaluable to power plants (or power plant owners/manager/operators) as they determine whether to upgrade or build new facilities, upgrade substations, and/or optimize infrastructure deployment, upgrades and maintenance related to the power plant, a substation, or transmission equipment. For example, based on calculations of the number of people in an area likely to convert or likely to be susceptible to converting based on predefined data (e.g., purchase habits, neighborhood trends, political affiliations, savings projections, etc.), the solar energy system design computing system may transmit information to a power plant device indicating how much power capacity may be recovered if a certain percentage of people are incentivized into converting to solar power. As another example: the solar energy system design computing system may calculate the number of homes in an area that have roofs well-suited for solar energy systems as well as the likely energy savings in the area if a certain percentage of these home converted at least partially to solar power. In some embodiments, the solar energy system design computing system may generate and transmit marketing materials to a power plant owner/manager (or alternatively a utility company), such as solar incentives or offers to customers, related to the calculations for optimizing infrastructure deployment, upgrades, and maintenance related to a power plant, substation, or transmission equipment. For example, when a power plant owner/manager may not directly undertake sales, marketing, or strategic steps to incentivize customer actions, the solar energy system design computing system may provide data and marketing materials (e.g., solar incentives or offers) to utility companies to address the potential optimization of infrastructure deployment, upgrades, or maintenance related to a power plant, substation, or transmission equipment.

In some embodiments, the solar energy system design computing system may use the evaluations and usage of predefined data to generate information that may be used in promotional content, such as advanced banner ads associated with particular websites. With real-estate websites (e.g., Zillow®, Google® maps, etc.), users may view imagery of their homes, their friends/family homes, and/or homes they would like to purchase. When partnered with such websites, the solar energy system design computing system may receive reports/messages indicating addresses that various users are researching on the websites. In response, the solar energy system design computing system may generate solar energy system price quote information related to the addresses reported by partner sites, which can be structured or programmed in formats that may be rendered as underlying information on the websites. For example, the solar energy system design computing system may generate and transmit digital banner ad content that describes information and/or includes a visualization of solar energy system designs, as well as shows statistics or financial data regarding potential savings if a particular address had such solar energy systems installed. In some embodiments, when the solar energy system design computing system receives information indicating that the website user is the owner of the property being investigated via the website (e.g., account information transmitted by the website entity to the solar energy system design computing system), the transmitted information for the promotional content (e.g., banner ad) may include more information (e.g., "based on your last few utility bills, a solar energy system may help you by a $X!", "here are some potential monthly payments you may be able to enjoy," etc.). In another example, the solar energy system design computing system may generate information enabling users to send links and/or solar energy system price quote information to others (e.g., a generated and transmitted banner ad data may include hyperlinks to a quote site, a download page for instant quote apps/applications, and/or a contact address or number for solar energy system sales agents, etc.). In some embodiments, the solar energy system design computing system may generate promotional content (e.g., banner ads, etc.) based on predefined data or alternatively may transmit data based on the predefined data that may be used to generate and render such content. For example, the solar design system may package solar energy system marketing information for a certain address and transmit that packaged data to a web server for use in generating and rendering marketing information to users of a webpage.

In some embodiments, the solar energy system design computing system may use the evaluations and usage of predefined data (e.g., solar potential/savings, owner occupier status, whether an address is associated with a single family residence, etc.) to pre-qualify leads (or prospective customers) that may be approached for sales opportunities. For example, sales team information may be generated by the solar energy system design computing system that indicates pre-qualified leads that are VIP, or alternatively those address/customers that are low priority based on their solar potential being calculated as below a certain threshold value.

FIGS. 10A-F illustrate another embodiment application for using the solar energy system design computing system to funnel user information and generate solar energy system design information in an interactive, fast manner. In particular, a tablet mobile device 102 may be configured to execute software (with a processor) that generates solar energy system price quote information (and solar energy system designs) for presentation to prospective customers in person. For example, the tablet mobile device 102 may be carried by a sales representative within a hardware store and may be used to receive prospective customer information for generating the solar energy system price quote information. As another example, the tablet mobile device 102 may be stationed within a kiosk within a store.

In various embodiments, a processor of the tablet mobile device 102 may be configured to execute operations, instructions, software, applications, or other routines such as the website/widget described above for generating instant quotes having minimal information, or alternatively an application configured to generate a complete quote (e.g., full Instant iQuote for solar energy systems). In some embodiments, the processor of the tablet mobile device 102 may be configured to execute a client application (or app) for receiving solar energy system price quote information (and solar energy system designs) from an associated server via IP communications, presenting solar energy system designs (e.g., render on a touch screen), as well as relaying contact information of prospective customers to an associated server for subsequent follow-up operations (e.g., generate more complete solar energy system price quote information, transmit contracts, etc.). In some embodiments, the processor of the tablet mobile device 102 may execute a client app or application that is configured to generate solar energy system price quote information and solar energy system design information locally. For example, the tablet mobile device 102 may store locally predefined data that may be used by the client app to identify applicable solar energy system designs and other related information for a particular address/property. In other words, the solar energy system design computing system as described above may be implemented in the tablet mobile device 102 alone, a server alone, or a combination of devices or processors performing various software.

For the non-limiting purposes of illustration with FIGS. 10A-10F, the tablet mobile device 102 should be considered to be configured to perform with its processor software that utilizes generates an instant estimate of solar energy system price quote information and/or solar energy system designs for a customer in response to receiving an input address. For example, the tablet mobile device 102 may be configured to execute the instant estimate widget as described above. The software may be a conversation aid and data collection tool, having simple screens that are easy to use and understand. In general, such instant quote software executing on the processor of the tablet mobile device 102 may receive address inputs (e.g., a property's street address), receive data messages from an associated server (e.g., a server within the solar energy system design computing system), render interactive screens with personalized instant solar energy system price quote information, and perform operations for promoting sale conversions (e.g., render options for "call-me back," "send by email," "request full quote," "share with a friend," "print hardcopy in-store," etc,). For example, the tablet mobile device 102 may receive information for sharing with social networking data sources, such as Facebook®. In various embodiments, such software performed by the processor of the tablet mobile device 102 may also be performed by processors of smartphones, such as for accessing and viewing a related solar energy system quote website, sharing solar energy system price quote information and/or referrals. Additionally, the software performed by the processor of the tablet mobile device 102 may also be configured to be performed by any other computing device, such as a laptop computer accessing a website via standard web browser after leaving the store.

In some embodiments, the tablet mobile device 102 may be configured to export data for benchmarking processes, such as by uploading received data from prospective customers for storage, processing, and evaluation by an associated server within the solar energy system design computing system. In various embodiments, the tablet mobile device 102 may be configured to automatically apply jurisdictional design requirements (e.g., building code limits, required setbacks from roof features, etc.). In various embodiments, the tablet mobile device 102 may transmit data received via the software executed on its processor such that the data may be used by third-party devices (e.g., sales-related computing devices/servers, such as related to Salesforce® CRM services).

Figure 10A:
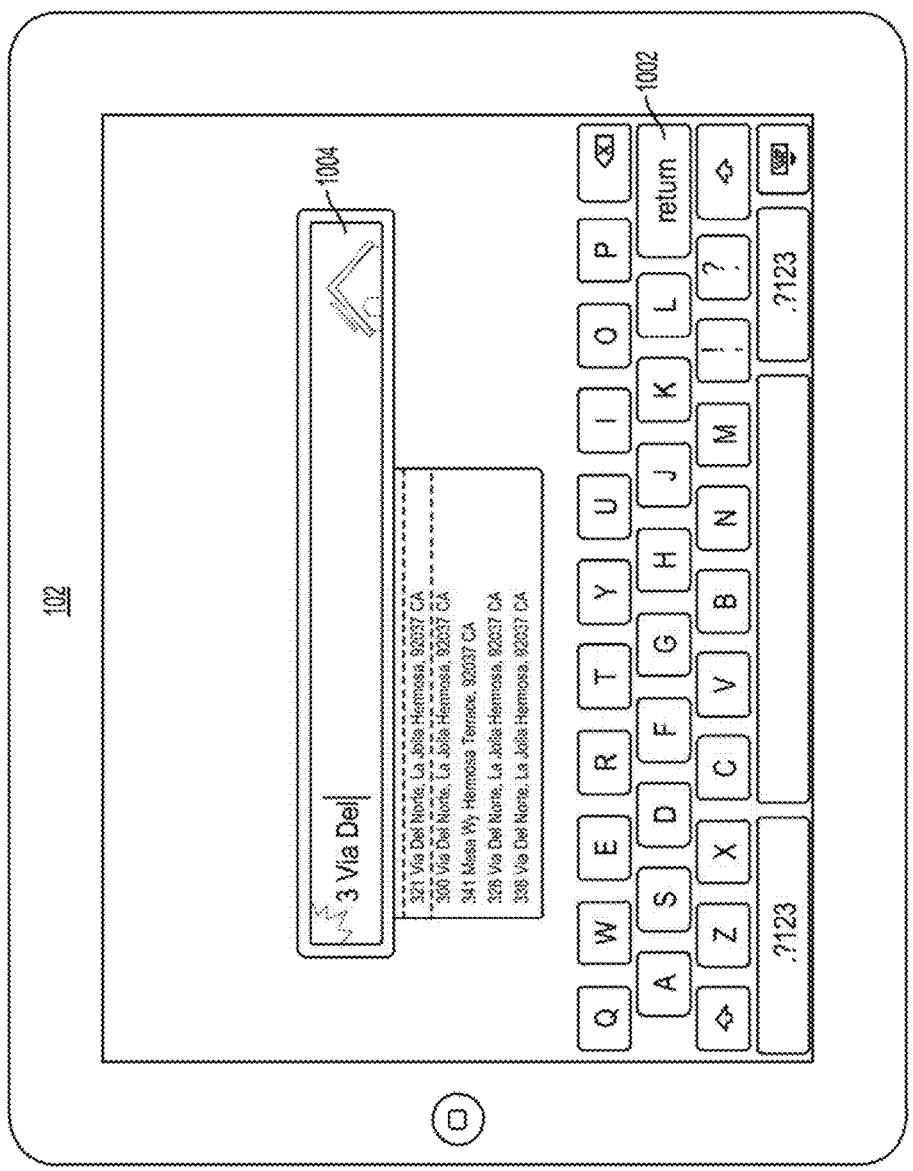

FIG. 10A shows the tablet mobile device 102 rendering a text field element 1004 capable of receiving an address input, such as an address typed into the device via a soft keyboard 1002 on the touch screen. In some embodiments, the text field element 1004 may be configured to pulsate to draw attention, and touch inputs on any portion of the screen may cause a subsequent frame to be rendered. In various embodiments, the text field element 1004 and/or the keyboard 1002 may be configured to glow or blink (i.e., with cursors, etc.). In some embodiments, the tablet mobile device 102 may execute auto-complete routines (or "type ahead auto-complete) to help quickly complete the address input. Auto-complete routines may only be performed after a certain number of words or letters has been entered (e.g., two words).

In some embodiments, after the address input is entered, the tablet mobile device 102 may render a load screen (not shown), during which time various messaging may be executed by the tablet mobile device 102, such as Ajax requests to receive various data from a server associated with the solar energy system design computing system (e.g., images and data from a server may be received during the load screen). In some embodiments, such a load screen may enable a representative to skip to a personalization screen or functionality that receives prospective customer selections for solar energy system options. Of course, sales representatives may use the time corresponding with the load screen to discuss solar energy system options, benefits, and potentials with prospective customers (e.g., the representative may explain that an instant quote may be based on neighborhood averages and that a full quote may be required to get the best accuracy, etc.). In some embodiments, the loading screen may be rendered by the tablet mobile device 102 until all needed data is received from the server and/or after a certain time period elapses (e.g., 5 seconds). In various embodiments, assets to be rendered (e.g., images, text, etc.) may be downloaded by the tablet mobile device 102 from the associated server before display solar energy system designs to ensure a fast experience regardless of Internet speeds at a given time.

Figure 10B:
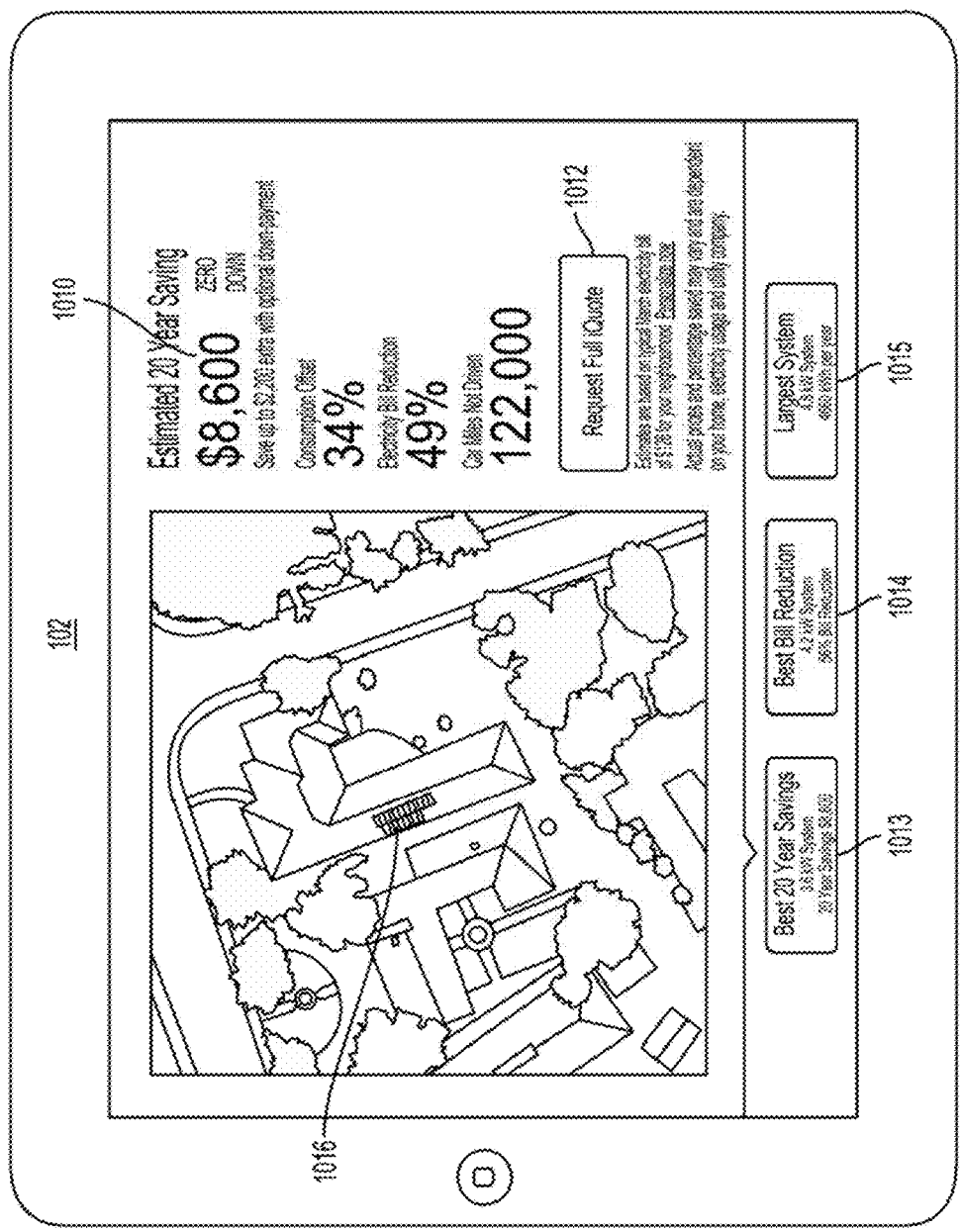

FIG. 10B shows the tablet mobile device 102 rendering a response screen with an image of a solar energy system design 1016 related to the address input. The tablet mobile device 102 may render estimated savings information 1010 related to the rendered solar energy system design. For example, the savings information 1010 may be related to the solar energy system design that corresponds to a best 20-year savings configuration for the address input. In some embodiments, the tablet mobile device 102 may render typical monthly electricity bill data in the savings information 1010. The tablet mobile device 102 may render a button element 1012 that is configured to cause the tablet mobile device 102 to initiate operations for transmitting a request for full solar energy system price quote information. At the bottom of the rendered display, the tablet mobile device 102 may render settings elements 1013, 1014, 1015 that may be selected to change (or toggle between) the displayed solar energy system design (i.e., there may be several possible solar energy system designs for the address input). The designs associated with the elements 1013-1015 may be optimal solar energy system designs for the address input. Such optimal systems may each highlight a certain objective or goal, such as "best savings," "maximum output, "maximum offset," and "all American," etc. For example, the first element 1013 may be configured to cause the tablet mobile device 102 to render a best 20-year savings design (shown in FIG. 10B), the second element 1014 may be configured to cause the tablet mobile device 102 to render a best bill reduction design, and the third element 1015 may be configured to cause the tablet mobile device 102 to render a largest system design. In some embodiments, the tablet mobile device 102 may be configured to display a certain (or recommended) solar energy system design as the default (or first after receiving the address input) based on automated operations such as described above with reference to FIG. 9A. In some embodiments, the tablet mobile device 102 may also render links to screens for personalizing or otherwise enabling prospective customers to select additional objectives, criteria, or options for rendering potential solar energy system designs.

Figure 10C:
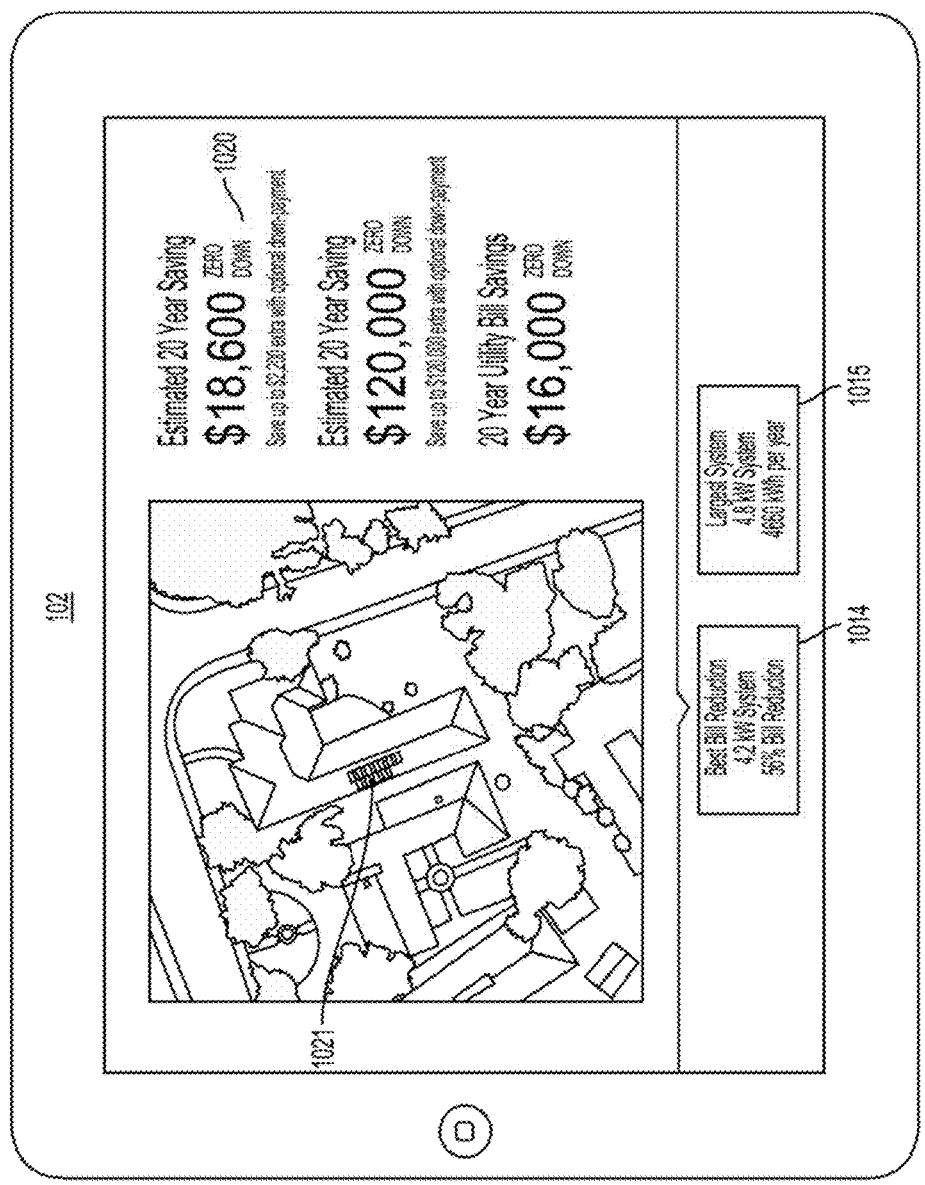

FIG. 10C shows the tablet mobile device 102 rendering another response screen with an image of another solar energy system design 1021 related to the address input. For example, the tablet mobile device 102 may render variation solar energy system designs in response to detecting selection inputs on the elements 1013-1015. Additionally, the tablet mobile device 102 may render different estimated savings information 1020 related to the rendered solar energy system design. For example, the savings information 1020 may be related to the solar energy system design that corresponds to a best bill reduction configuration for the address input. Such estimated savings information 1020 may include different savings amounts based on different payment (or pre-payment) plans available to prospective customers. In some embodiments, the tablet mobile device 102 may be configured to only render savings information 1020 that is positive and encouraging to prospective customers (e.g., net savings are positive), or may render alternative positive information when net savings may be negative for particular solar energy system designs. Additionally, the tablet mobile device 102 may hide (or fail to render) certain image elements (e.g., the element 1013) when associated with negative savings information. For example, the "best 20-Year Savings" element 1013 may be hidden when the 20-year savings for the solar energy system design are negative.

Figure 10D:
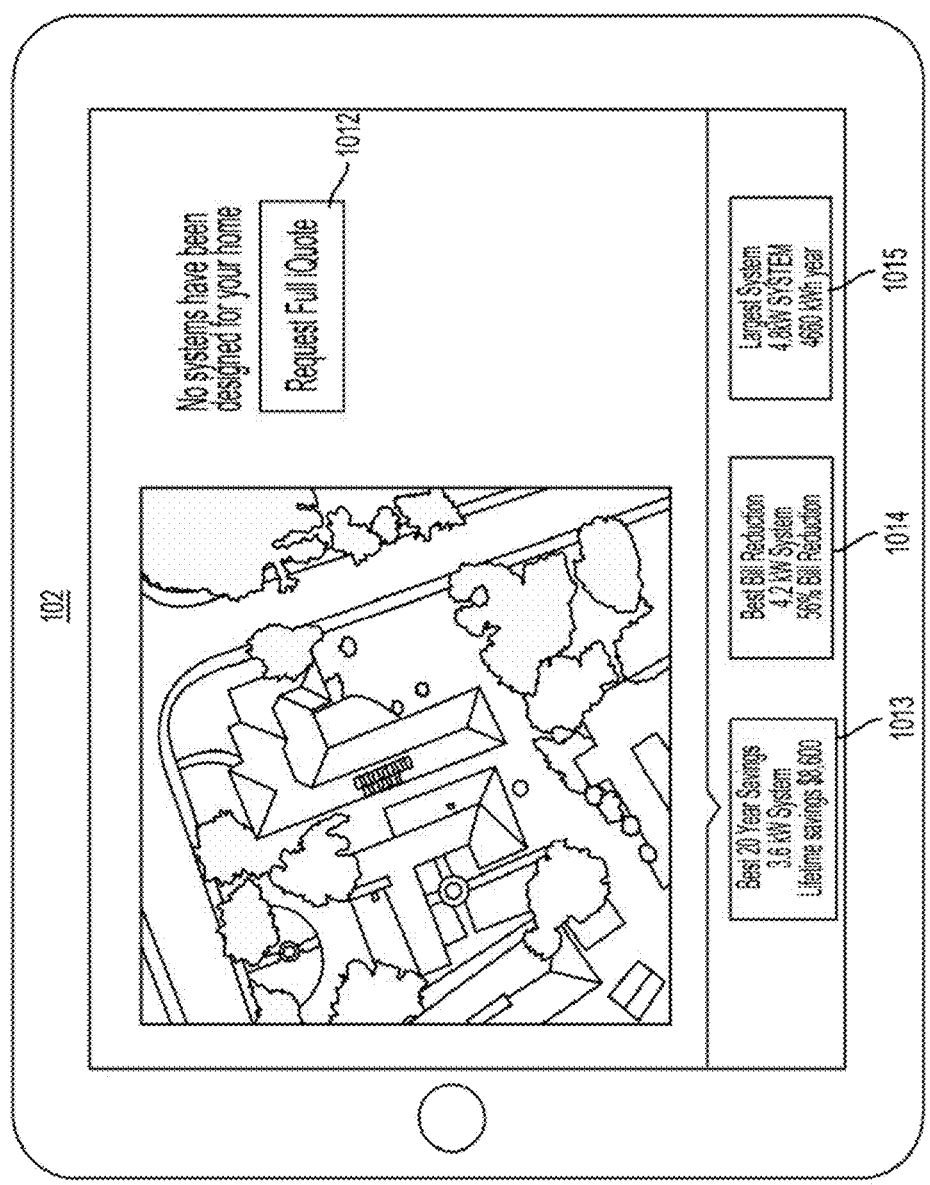

FIG. 10D shows the tablet mobile device 102 rendering another response screen in response to not being able to generate or otherwise render any solar energy system design information (or images) for the address input. For example, the tablet mobile device 102 may render a message that indicates that no systems are available for instant solar energy system price quote information, but that a full quote may be possible, thus the tablet mobile device 102 may render the button element 1012 configured to trigger a full quote request message. The tablet mobile device 102 may not be able to render solar energy system designs or solar energy system price quote information for various reasons, such as failure to receive data from the associated server, errors in performing design operations, the roof of the house associated with the address input is too small or shaded to build even a smallest system, the building/house did not exist when predefined data was calculated by the solar energy system design computing system, etc.

In various embodiments, the various rendered data shown in FIGS. 10B-D may be received from a server in response to the tablet mobile device 102 transmitting the address input.

Figure 10E:
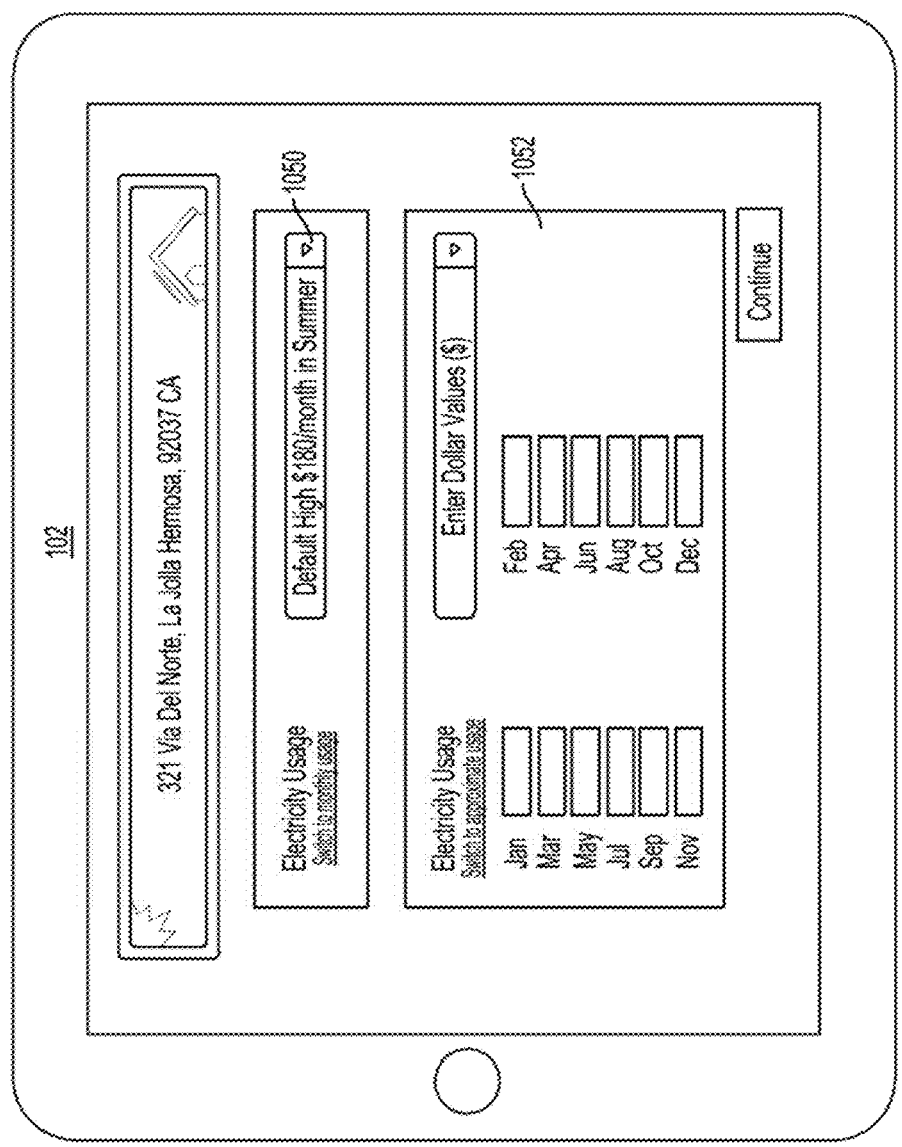

FIG. 10E shows the tablet mobile device 102 rendering a user input screen for personalizing solar energy system designs. In other words, the tablet mobile device 102 may accept more detailed customer information to improve the accuracy of solar energy system price quote information. The screen may include a drop-down element 1050 that allow the selection of approximate electricity usage values that may correspond to the address input. In some embodiments, the default value on the drop-down element 1050 may be based on predefined data related to the address input (e.g., the customer's average utility bill may be known and used to set the value). The screen may also include a data input section 1052 that allows for data entry for monthly usage information (e.g., electricity usage for January, February, etc.). In other embodiments, only one of the approximate usage and monthly usage modes may be rendered at a given time. In various embodiments, data entered into the various graphical user interface elements may be remembered by the tablet mobile device and auto-populated into a request full quote form, shown below. Other drop-down elements and/or data entry fields may be rendered in various embodiments (e.g., utility selections, etc.).

Figure 10F:
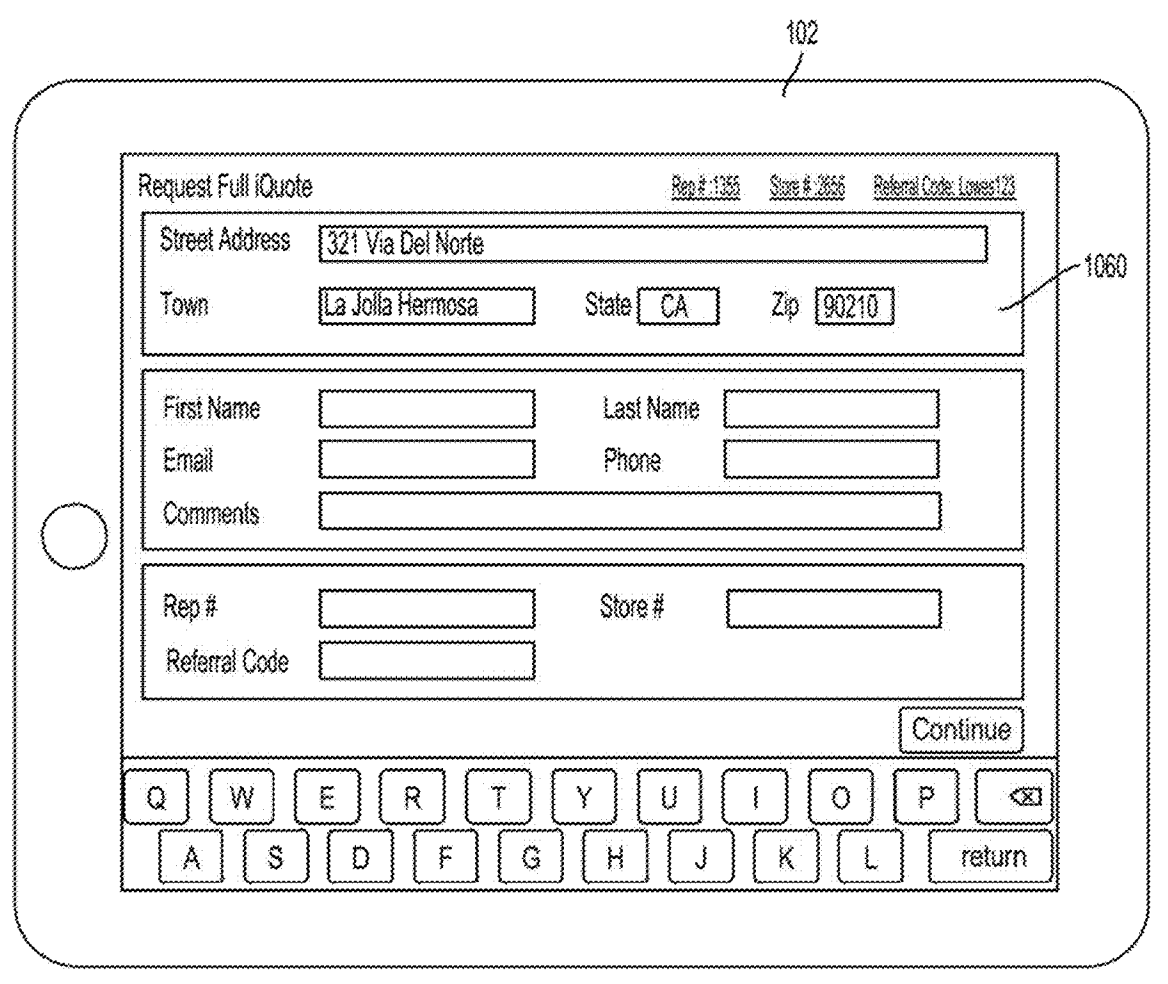

FIG. 10F shows the tablet mobile device 102 rendering a user input screen for requesting a full quote. The tablet mobile device 102 may render various elements 1060, such as data fields for street address, town, state, zip code, name, email, phone, comments, as well as information about the store in which the tablet mobile device 102 is located (e.g., store number, sales representative identity, referral code, etc.). In some embodiments, certain values (e.g., sales reps identity, store number, etc.) may be auto-filled (and possibly hidden) by the tablet mobile device 102 based on stored information. In some embodiments, the tablet mobile device 102 may also render summary information indicating any user inputs detected throughout the instant quote process (e.g., summary of electricity usage information provided in FIG. 10E).

In some embodiments, the tablet mobile device 102 may also be configured to present contract information for completing a purchase transaction. For example, the tablet mobile device 102 may render e-signing information/screens and receive digital signature inputs from the customer. Alternatively, the tablet mobile device 102 may perform operations to print contract documents for customer review/signing.

Figure 10G:
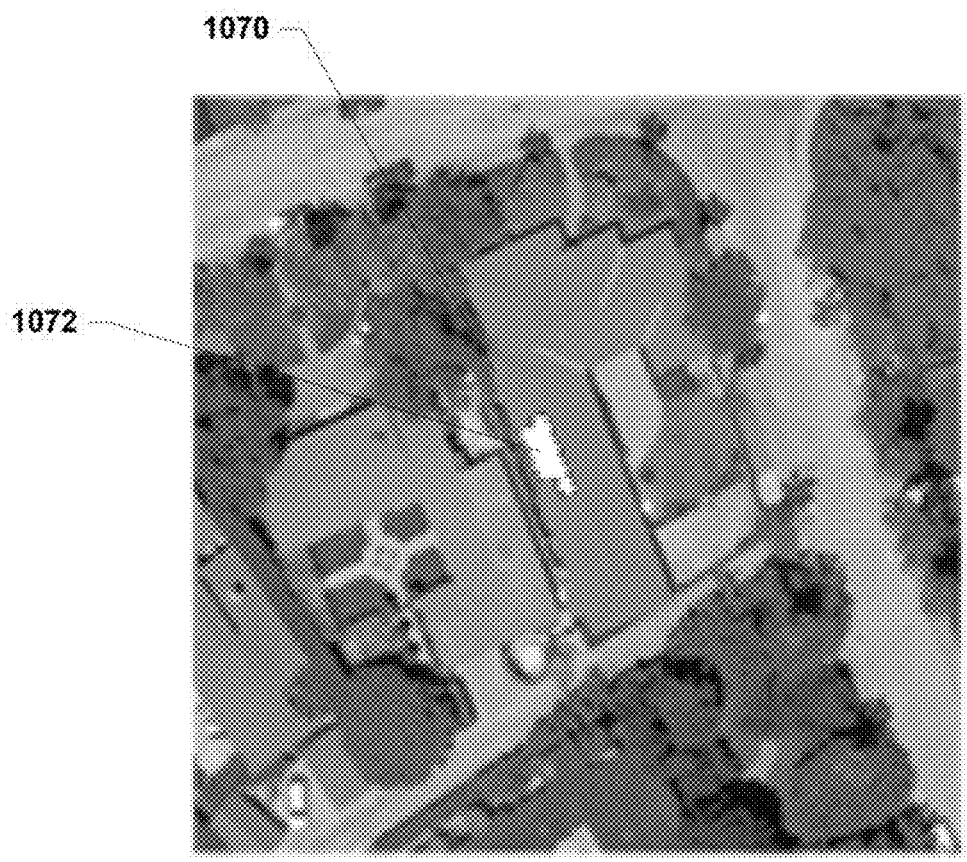
FIG. 10G is a top view of a building structure (e.g., a house, etc.) with a solar energy system (e.g., solar panels, etc.) installed by a third-party entity (e.g., a solar panel installation contractor, a builder, a handyman, a private individual, etc.) in response to receiving data, such as solar energy system designs, part lists, and/or contract information, etc., from a solar system design computing device or system (e.g., a solar system design server).

FIG. 10G shows a building structure 1070 (e.g., a house, etc.) with a solar energy system 1072 (e.g., solar panels, etc.) installed by a third-party entity (e.g., a solar panel installation contractor, a builder, a handyman, a private individual, etc.) in response to receiving data, such as solar energy system designs, part lists, and/or contract information, etc., from a solar system design computing device or system (e.g., a solar system design server). In other words, based on the techniques described above for generating best-fit and/or user-preferred solar system designs, a third-party, such as a solar system installer, may receive the data from a solar energy system design computing system, render the data (or transmit to devices capable of rendering or otherwise presenting the data), and physically install a solar energy system 1072 on a building structure 1070 based on the received data. In various embodiments, such data used for installing the solar energy system 1072 may be received, processed, re-transmitted, and/or rendered via a mobile device (e.g., a contractor's tablet or smartphone), or other computing device (e.g., a personal computer, a laptop, a server, etc.) utilized by the third-party entity.

In some embodiments, a method may include operations for improving installations of solar energy systems on building structures that include receiving, at a computing device from a solar energy system design computing system, data corresponding to a solar energy system design for a building structure, wherein the received data is generated by the solar energy system design computing system based on at least one of lead data and inquiry data related to the building structure used to query predefined data related to the property that is in turn evaluated by the solar energy system design computing system to qualify the received at least one of lead data or inquiry data, determining whether the received data includes an agreement for an installation of a solar energy system based on the solar energy system design, rendering instructions for acquiring components of the solar energy system based on the solar energy system design in response to determining the received data includes the agreement, and rendering instructions for installing the components at the building structure. Other actions performed by third-party entities (e.g., installers, contractors, laborers, etc.) may include acquiring (or selecting) the components of the solar energy system based on the rendered instructions by the computing device, such as locating and purchasing components/parts from suppliers, and installing the acquired components on the building structure based on the rendered instructions for installing the acquired components.

In some embodiments, a building structure may include a solar energy system comprising at least a solar panel, wherein the solar energy system is installed by a third-party entity in response to a computing device associated with the third-party entity performing a method that comprises receiving, at a computing device from a solar energy system design computing system, data corresponding to a solar energy system design for a building structure, wherein the received data is generated by the solar energy system design computing system based on at least one of lead data and inquiry data related to the building structure used to query predefined data related to the property that is in turn evaluated by the solar energy system design computing system to qualify the received at least one of lead data or inquiry data, determining whether the received data includes an agreement for an installation of a solar energy system based on the solar energy system design, rendering instructions for acquiring components of the solar energy system based on the solar energy system design in response to determining the received data includes the agreement, and rendering instructions for installing the components at the building structure.

In various embodiments, a processor of the solar energy system design computing system may be configured to perform a method for determining components to comprise an energy system, the method including establishing a plurality of parameters defining performance of the energy system, assigning a value to at least one of the parameters, storing specifications for the components including component dimensions and component energy rating, and receiving by an energy provider system a model of a component supporting structure, the energy provider system automatically determining the components by comparing the stored specifications to the model and the assigned value. In some embodiments, automatically determining the components may include automatically determining sets of energy system components, each set defining a corresponding candidate energy system, the energy provider system providing a signal representing at least one of the candidate energy systems to a consumer system, the energy provider system receiving in response, a signal from the consumer system indicating a consumer selected one of the candidate energy systems. In some embodiments, receiving a model of a component supporting structure may include receiving by the energy provider system from a consumer system, a structure location, the energy provider system providing the structure location to a geographic survey system, receiving by the energy provider system from the geographic survey system a model of the supporting structure corresponding to the structure location. In some embodiments, assigning a value may include receiving by the energy provider system from a consumer system, a signal indicating a consumer-assigned value, the energy provider system assigning the value based at least in part on the received consumer-assigned value. In some embodiments, the method may further include the energy provider system determining dimensions of the supporting structure by analyzing the model, the energy provider system automatically determining energy system components to comprise the system based at least in part on the stored component dimensions and the dimensions of the supporting structure. In some embodiments, the method may further include the energy provider system determining shading characteristics of the supporting structure by analyzing the model, the energy provider system automatically determining energy system components to comprise the system based at least in part on the stored component specifications and the shading characteristics of the supporting structure. In some embodiments, the specifications include component cost and the method may further include the energy provider system automatically determining components including the energy system by comparing the stored specifications to the model and the assigned parameter value, the energy provider system receiving information related to energy rebates, the energy provider system estimating a system cost based on the components including the energy system and the information related to energy rebates, the energy provider system providing a signal representing a description of the energy system including the components including the energy system the estimated system cost. In some embodiments, the method may further include receiving a structure image including the supporting structure, storing component images, automatically associating at least one of the stored component images with at least one of the candidate energy systems, registering the at least one stored component image with the structure image to provide a registered image, and providing a signal representing the registered image to a display system such that the system is observable on the display system as it would appear installed on the supporting structure. In some embodiments, the method may further include storing component images, automatically associating at least one of the component images with the energy system to provide a system image, registering the system image with the model to provide a registered image, and providing the registered image to a display system.

In various embodiments, the solar energy system design computing system may be configured to perform a method for determining components to comprise an energy system, the method including storing characteristics associated with the components, receiving by an energy provider system from a consumer system, a signal indicating a consumer-assigned value for a characteristic of the energy system, receiving by the energy provider system from a geographic system, a model of a component supporting structure, the energy provider system automatically determining the energy system components based on the model, the stored component characteristics and the received indication of consumer-assigned value for a characteristic of the energy system, the energy provider system providing to the consumer system, a description of the energy system including the determined components. In some embodiments, providing a description of the energy system may include providing an image representing at least one of the determined components on the supporting structure. In some embodiments, the method may further include in response to providing the description of the energy system, receiving by the energy provider system from the consumer system an adjusted value for the at least one characteristic, the energy provider system repeating the step of automatically determining the components based on the model, the stored characteristics and the adjusted value, the energy provider system providing a description of the energy system including the components determined by the repeating step. In some embodiments, analyzing the model may include representing portions of the modeled structure by generally polygonal surface portions, estimating a supporting structure area by removing surface portions unsuitable to support components from the generally polygonal surface portions. In some embodiments, analyzing the model may further include determining pitch of the supporting structure, determining azimuth of the supporting structure, increasing the accuracy of the estimating step by adjusting the estimated are based on the pitch and the azimuth to compensate for foreshortening of surfaces including the model.

Figure 11:
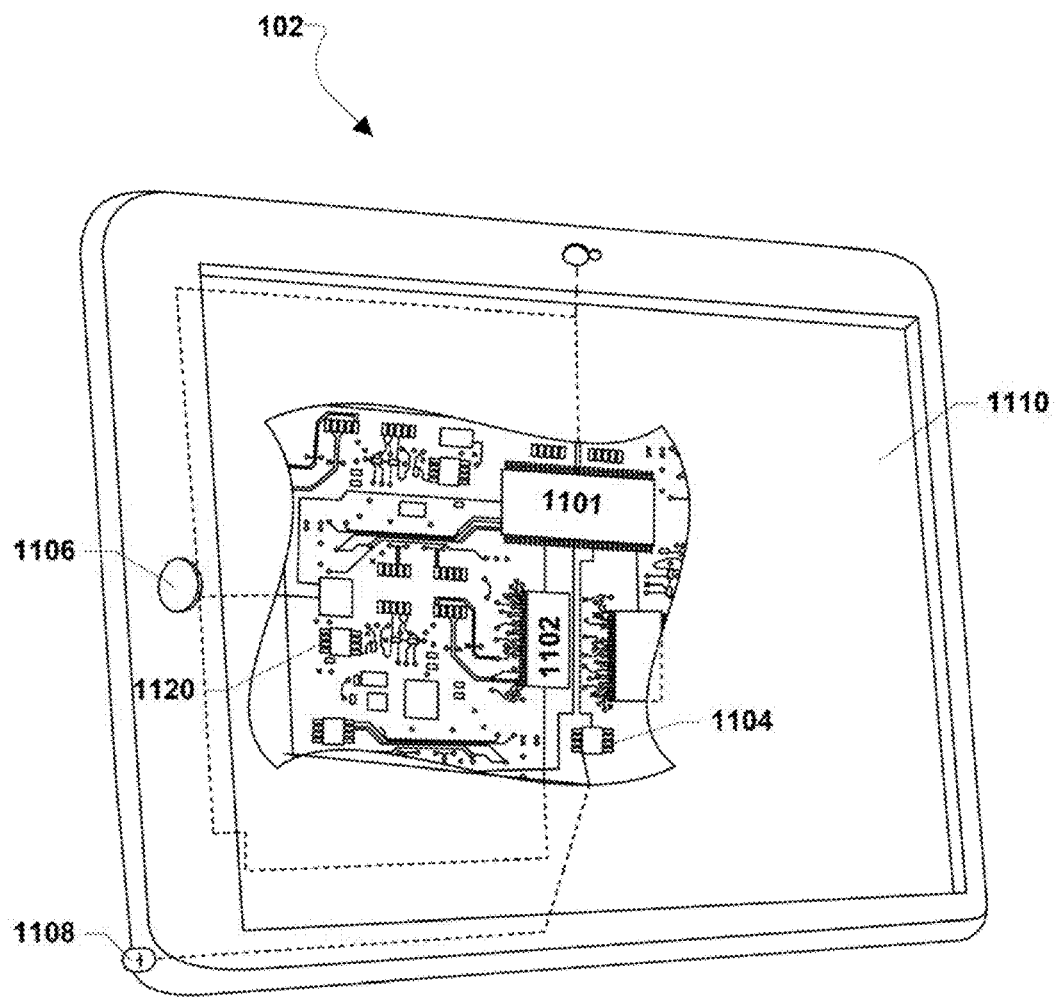
FIG. 11 is a component block diagram of a mobile computing device suitable for use in various embodiments.

The various embodiments may be implemented in any of a variety of tablet devices, an example of which is illustrated in FIG. 11. For example, the tablet mobile device 102 may include a processor 1101 coupled to internal memory 1102. The internal memory 1102 may be volatile or non-volatile memory, and may also be secure and/or encrypted memory, or unsecure and/or unencrypted memory, or any combination thereof. The processor 1101 may also be coupled to a touch screen display 1110, such as a resistive-sensing touch screen, capacitive-sensing touch screen infrared sensing touch screen, etc. The tablet mobile device 102 may have one or more radio signal transceivers 1104 (e.g., Peanut, Bluetooth®, Zigbee®, Wi-Fi, RF radio) and antennas 1108 for sending and receiving wireless signals as described herein. The transceivers 1104 and antennas 1108 may be used with the above-mentioned circuitry to implement the various wireless transmission protocol stacks and interfaces. The tablet mobile device 102 may include a cellular network wireless modem chip 1120 that enables communication via a cellular network(s). The tablet mobile device 102 may also include a physical button 1106 for receiving user inputs.

Figure 12:
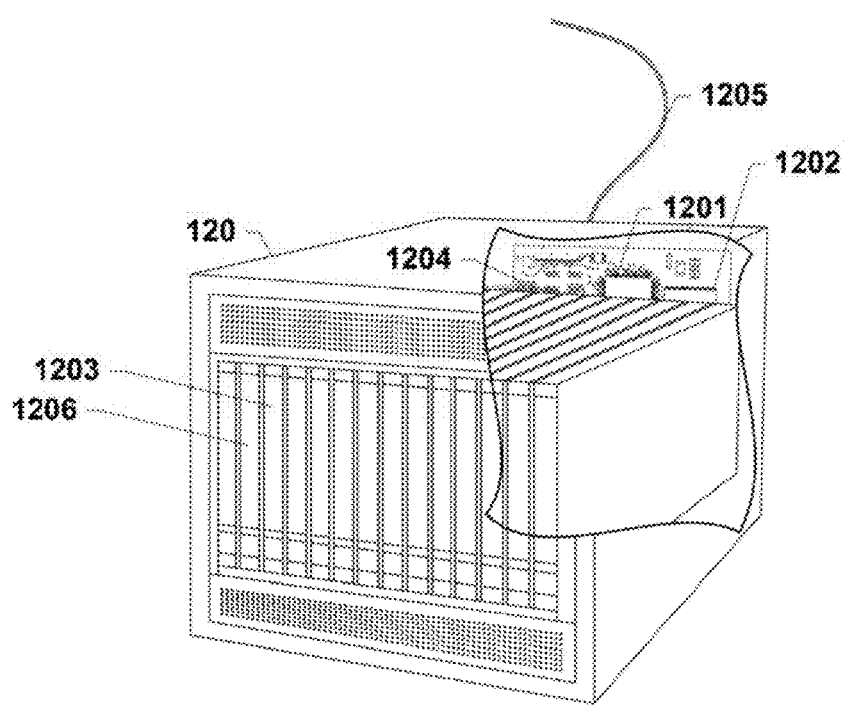
FIG. 12 is a component block diagram of a server computing device suitable for use in various embodiments.

The various embodiments may be implemented on any of a variety of commercially available server devices, such as the server computing device 140 illustrated in FIG. 12. Such a server computing device 140 typically includes a processor 1201 coupled to volatile memory 1202 and a large capacity nonvolatile memory, such as a disk drive 1203. The server computing device 140 may also include a floppy disc drive, compact disc (CD) or DVD disc drive 1206 coupled to the processor 1201. The server computing device 140 may also include network access ports 1204 (or network interfaces) coupled to the processor 1201 for establishing data connections with a network 1205, such as a local area network coupled to other broadcast system computers and servers.

The various processors referenced herein may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory and before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

As described above, embodiment methods, devices, and systems may provide instant, automated, and interactive experiences for receiving solar energy system design quotes from a solar energy system design computing system. The solar energy system design computing system may perform various operations to generate accurate, personalized quotes for buildable solar energy systems in response to receiving lead data (e.g., an address of a prospective customer). Such quotes may be presented, rendered, and/or transmitted to various devices by the solar energy system design computing system. For example, the solar energy system design computing system may be a tablet mobile device that renders best-fit solar energy system designs and related information for consumption by sales people and other parties using the tablet mobile device. In some embodiments, the solar energy system design computing system may auto-generate solar energy system designs for various properties based on predefined data (e.g., measurements, data obtained from various data sources, etc.). In some embodiments, the solar energy system design computing system may generate solar energy system designs and solar energy system price quote information on-the-fly based on customer selection inputs and predefined data. In various embodiments, the solar energy system design computing system may be configured to perform operations for qualifying lead data with the predefined data, generate promotional content (e.g., advertising banner ads, etc.), transmit data to third-parties, improve RSD tools, and other business applications.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory computer-readable or server-readable medium or a non-transitory processor-readable storage medium. The steps of a method or algorithm disclosed herein may be embodied in a processor-executable software module or processor-executable instructions which may reside on a non-transitory computer-readable (or processor-readable) storage medium. Tangible, non-transitory computer-readable (or processor-readable) storage media may be any available media that may be accessed by a computer. By way of example, and not limitation, such non-transitory computer-readable (or processor-readable) media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for improving the designing of solar energy systems by a computing system, comprising:
    calculating and pre-caching, by a processor of a solar energy system design computing system, a plurality of solar energy system designs for a group of properties:
    receiving, by the processor of the solar energy system design computing system, at least one of lead data or inquiry data related to a property of the group of properties;
    querying, by the processor of the solar energy system design computing system, predefined data related to the property using the received at least one of lead data or inquiry data;
    evaluating, by the processor of the solar energy system design computing system, the queried predefined data and one or more of the plurality of solar energy system designs to qualify the received at least one of lead data or inquiry data; and
    performing, by the processor of the solar energy system design computing system, at least one action related to the solar energy systems based on the evaluation of the queried predefined data and the one or more of the plurality of solar energy system designs using the received at least one of lead data or inquiry data.

2. The method of claim 1, further comprising obtaining, by the processor of the solar energy system design computing system, additional data from at least one additional data source relevant to the property, wherein the at least one additional data source includes third-party web servers, GIS, social networking services, data warehouses, and utility computing devices.

3. The method of claim 1, wherein performing, by the processor of the solar energy system design computing system, at least one action related to the solar energy systems based on the evaluation of the queried predefined data and the one or more of the plurality of solar energy system designs includes at least one of:
    rendering, by the processor of the solar energy system design computing system, a solar energy system design selected from the plurality of solar energy systems designs, and
    transmitting, by the processor of the solar energy system design computing system, to third-party devices marketing information related to at least one of a solar energy system price, a design, and installation.

4. The method of claim 1, further comprising presenting, by the processor of the solar energy system design computing system, e-signable solar energy system installation contract information to a customer associated with the property based on performing the at least one action.

5. The method of claim 1, further comprising auto-determining, by the processor of the solar energy system design computing system, a best-fit solar energy system for the property based on the evaluating of the queried predefined data, and
    wherein performing, by the processor of the solar energy system design computing system, at least one action related to the solar energy systems based on the evaluation of the queried predefined data and the one or more of the plurality of solar energy system designs using the received at least one of lead data or inquiry data comprises presenting, by the processor of the solar energy system design computing system, the auto-determined best-fit solar energy system to a customer by rendering the auto-determined best-fit solar energy system on a screen.

6. The method of claim 5, further comprising presenting, by the processor of the solar energy system design computing system, information describing the predefined data used to design the best-fit solar energy system.

7. The method of claim 1, further comprising:
    presenting, by the processor of the solar energy system design computing system, a plurality of options or characteristics for designs of a solar energy system relevant to the property;
    receiving, by the processor of the solar energy system design computing system, user selection inputs related to the presented plurality of options or characteristics; and
    designing, by the processor of the solar energy system design computing system, the solar energy system for the property using the received user selection inputs, and
    wherein performing, by the processor of the solar energy system design computing system, at least one action related to the solar energy systems based on the evaluating of the queried predefined data and the one or more of the plurality of solar energy system designs using the received at least one of lead data or inquiry data comprises presenting, by the processor of the solar energy system design computing system, the designed solar energy system by rendering the designed solar energy system on a screen.

8. The method of claim 1, wherein the predefined data includes real-world data related to the property obtained from a plurality of data sources, wherein the real-world data includes at least one of parcel data, aerial imagery, LiDAR data, pitch, azimuth, longitude/latitude, buildable area data, electricity usage data, utility rates, tariff rates, structural data corresponding to the property, and characteristics of an area related to the property.

9. The method of claim 1, wherein calculating and pre-caching, by the processor of the solar energy system design computing system, the plurality of solar energy system designs for the group of properties comprises:
  identifying, by the processor of the solar energy system design computing system, an optimal size set of solar energy system design constraint sets for the group of properties;
  arranging, by the processor of the solar energy system design computing system, solar panels for each solar energy system design constraint set in the identified optimal size set to generate the plurality of solar energy system designs; and
  storing, by the processor of the solar energy system design computing system, the generated plurality of solar energy system designs.

10. The method of claim 1, further comprising:
  iteratively placing, by the processor of the solar energy system design computing system, modules on a roof indicated in the predefined data to generate a solar energy system design, wherein placing comprises placing the modules in regions of the roof with a next-best solar generation potential based on at least one of shading and orientation;
  determining, by the processor of the solar energy system design computing system, whether the generated solar energy system design is buildable based on electrical engineering rules; and
  storing, by the processor of the solar energy system design computing system, the generated solar energy system design.

11. The method of claim 1, wherein the at least one of lead data or inquiry data is received via a website or an app associated with the solar energy system design computing system.

12. The method of claim 11, wherein the app associated with the solar energy system design computing system is executed on a tablet mobile device within a store.

13. The method of claim 1, wherein performing, by the processor of the solar energy system design computing system, at least one action related to the solar energy systems based on the evaluation of the queried predefined data and the one or more of the plurality of solar energy system designs using the received at least one of lead data or inquiry data comprises using, by the processor of the solar energy system design computing system, the predefined data with remote solar design (RSD) processes that utilize aerial photos and other raw data to generate roof models and estimate shading.

14. The method of claim 1, wherein performing, by the processor of the solar energy system design computing system, at least one action related to the solar energy systems based on the evaluation of the queried predefined data and the one or more of the plurality of solar energy system designs using the received at least one of lead data or inquiry data comprises automatically prioritizing, by the processor of the solar energy system design computing system, leads based on the evaluation of the predefined data, wherein the leads are qualified based on information within the predefined data including at least one of house square footage, income level, house style, area regulations, purchasing trends, savings information, solar potential output, potential financial impacts of installing solar, shading, and tax incentives.

15. The method of claim 14, further comprising transmitting, by the processor of the solar energy system design computing system, marketing materials based on the prioritized leads, wherein the marketing materials include solar energy system price quote information based on the evaluation of the predefined data that includes savings information.

16. The method of claim 15, wherein the marketing materials are transmitted to a device associated with a third-party that includes at least one of a mobile device, a server, a point-of-sale device, and a scheduling device, and
  wherein the third-party is at least one of a contractor, a solar energy system installing company, a handy-man, a utility company, a roofer, a builder, a power plant owner/manager, an architect, a non-profit organization, and a product delivery service.

17. The method of claim 16, wherein the third-party is at least one of the utility company or the power plant owner/manager, and the marketing materials include at least one of solar incentives or offers to customers calculated to optimize infrastructure deployment, upgrades, and maintenance related to at least one of a power plant, a substation, or transmission equipment.

18. The method of claim 1, wherein performing, by the processor of the solar energy system design computing system, actions based on the evaluation of the queried predefined data and the one or more of the plurality of solar energy system designs using the received at least one of lead data or inquiry data comprises one of:
  generating, by the processor of the solar energy system design computing system, promotional content that include solar energy system price quote information related to the property; or
  generating, by the processor of the solar energy system design computing system, data which can be used to generate the promotional content.

19. The method of claim 1, wherein the solar energy system design computing system comprises at least one of a server and a mobile device.

20. A method for installation of solar energy systems, comprising:
  receiving, at a computing device from a solar energy system design computing system, data corresponding to a solar energy system design for a building structure, wherein the received data is generated by the solar energy system design computing system based on at least one of lead data and inquiry data related to the building structure used to query predefined data related to the property that is in turn evaluated by the solar energy system design computing system along with pre-cached solar energy system designs for a group of properties to qualify the received at least one of lead data or inquiry data;
  determining whether the received data includes an agreement for an installation of a solar energy system based on the solar energy system design;
  rendering instructions for acquiring components of the solar energy system based on the solar energy system design in response to determining the received data includes the agreement;

rendering instructions for installing the components at the building structure;
acquiring the components of the solar energy system based on the rendered instructions by the computing device; and
installing the acquired components on the building structure based on the rendered instructions for installing the acquired components.

21. A solar energy system, comprising:
at least a solar panel mounted on a building structure, wherein the solar energy system is installed by a third-party entity in response to a computing device associated with the third-party entity performing a method that comprises:
receiving, at the computing device from a solar energy system design computing system, data corresponding to a solar energy system design for the building structure, wherein the received data is generated by the solar energy system design computing system based on at least one of lead data and inquiry data related to the building structure used to query pre-defined data related to the property that is in turn evaluated by the solar energy system design computing system along with pre-cached solar energy system designs for a group of properties to qualify the received at least one of lead data or inquiry data;
determining whether the received data includes an agreement for an installation of a solar energy system based on the solar energy system design;
rendering instructions for acquiring components of the solar energy system based on the solar energy system design in response to determining the received data includes the agreement; and
rendering instructions for installing the components at the building structure.

* * * * *